US007480669B2

(12) United States Patent
Lo et al.

(10) Patent No.: US 7,480,669 B2
(45) Date of Patent: Jan. 20, 2009

(54) CROSSLINK DATA STRUCTURE, CROSSLINK DATABASE, AND SYSTEM AND METHOD OF ORGANIZING AND RETRIEVING INFORMATION

(75) Inventors: Wayne Chiwoei Lo, Campbell, CA (US); Ru Tso Luo-Hsu, Gilroy, CA (US)

(73) Assignee: infoMato, Campbell, CA (US)

( * ) Notice: Subject to any disclaimer, the term of this patent is extended or adjusted under 35 U.S.C. 154(b) by 319 days.

(21) Appl. No.: 11/294,969

(22) Filed: Dec. 5, 2005

(65) Prior Publication Data

US 2006/0184566 A1 Aug. 17, 2006

Related U.S. Application Data

(60) Provisional application No. 60/652,751, filed on Feb. 15, 2005, provisional application No. 60/669,086, filed on Apr. 6, 2005, provisional application No. 60/694,530, filed on Jun. 27, 2005, provisional application No. 60/699,713, filed on Jul. 15, 2005.

(51) Int. Cl.
*G06F 17/30* (2006.01)

(52) U.S. Cl. ....................................... 707/101; 707/102

(58) Field of Classification Search ................. 707/1-5, 707/101-102
See application file for complete search history.

(56) References Cited

U.S. PATENT DOCUMENTS

| | | | | |
|---|---|---|---|---|
| 6,154,213 | A | 11/2000 | Rennison et al. | |
| 6,349,307 | B1 | 2/2002 | Chen | |
| 6,772,165 | B2 * | 8/2004 | O'Carroll | 707/101 |
| 2002/0167538 | A1 | 11/2002 | Bhetanabhotla | |

OTHER PUBLICATIONS

Martin S. Lacher & Stefan Decker, "RDF, Topic Maps, and the Semantic Web," Markup Languages: Theory & Practice, 2001, pp. 313-331, vol. 3, No. 3, MIT Press, Cambridge, USA.

* cited by examiner

*Primary Examiner*—Yicun Wu
(74) *Attorney, Agent, or Firm*—Sughrue Mion, PLLC

(57) ABSTRACT

A system and a method for organizing and retrieving information are provided. The system is running on a computer system accessible for interactive communication with users. The computer system runs a crosslink database stored therein. The crosslink database includes a crosslink data structure comprising at least a connecting node and at least a first element and a second element connected to the connecting node by a link; and a browser for interactively communicating with the users for organizing and retrieving/revising information in the cross link database. The first element is related to the second element and can be traced via the connecting node. The second element is related to the first element and can be traced via the connecting node. The connecting node may correspond to a context of information, and wherein the first element and the second element constitute different topics of information related to the context of information.

30 Claims, 65 Drawing Sheets

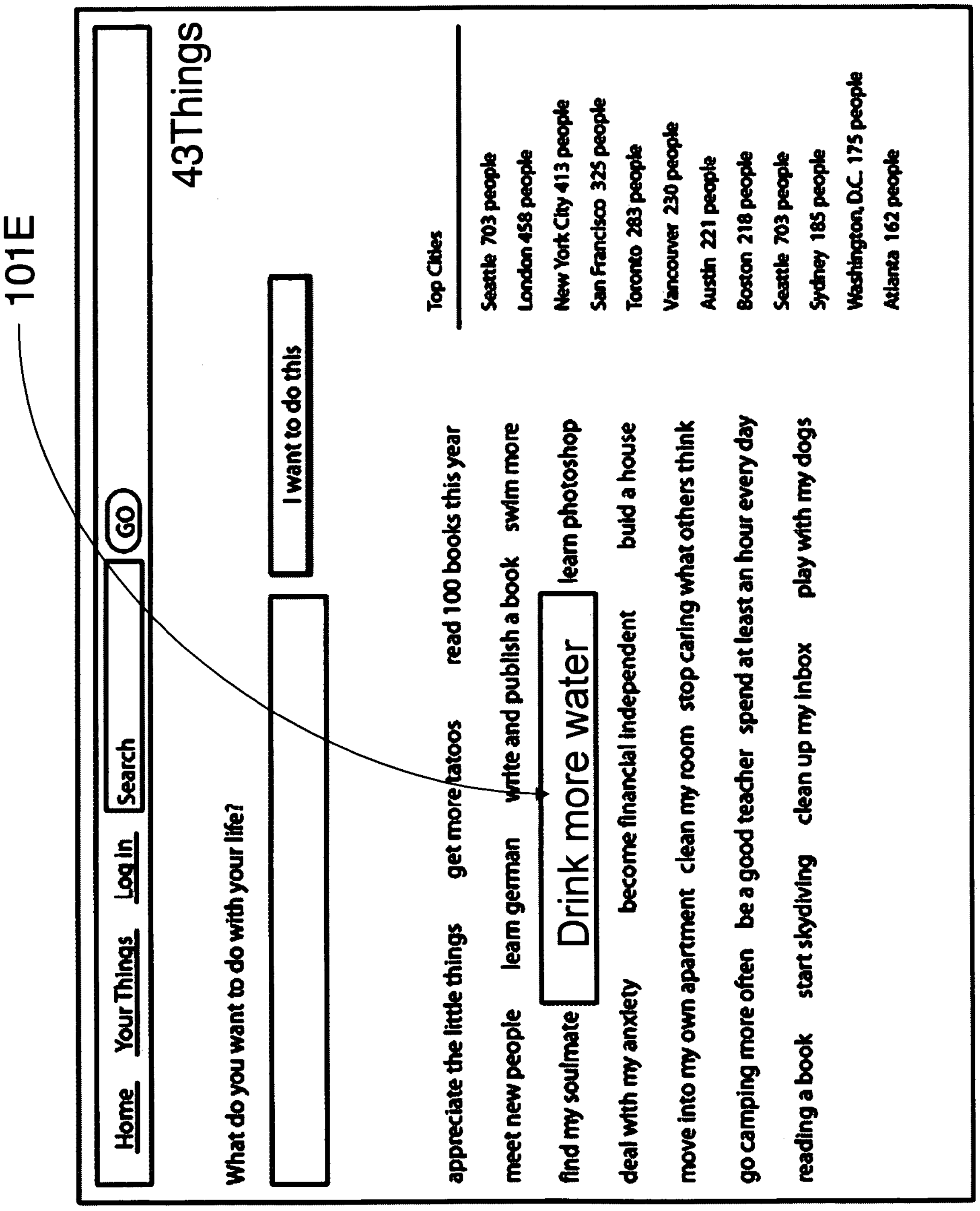

Fig. 1F

43Things

Home  Your Things  Log In  Search [    ] GO

What do you want to do with your life?

[          ]  [ I want to do this ]

101E appreciate the little things   get more tatoos   read 100 books this year
meet new people   learn german   write and publish a book   swim more
find my soulmate   Drink more water   learn photoshop
deal with my anxiety   become financial independent   build a house
move into my own apartment   clean my room   stop caring what others think
go camping more often   be a good teacher   spend at least an hour every day
reading a book   start skydiving   clean up my inbox   play with my dogs Top Cities
Seattle 703 people
London 458 people
New York City 413 people
San Francisco 325 people
Toronto 283 people
Vancouver 230 people
Austin 221 people
Boston 218 people
Seattle 703 people
Sydney 185 people
Washington, D.C. 175 people
Atlanta 162 people Choose the folder you wish to jump to:

Jump to:
- ○ My Bookmarks
- ☐ Channels
- ☐ Finance
- ☐ Links
- ☐ Family
- ☐ Media
- ☐ Yahoo
- ☐ Communication
- ☐ Community
- ☐ Entertainment
- ☐ Home & Living
- ☐ Information Management
- ☐ News
- ☐ Personal Finance
- ☐ Personal Publishing
- ☐ Shopping
- ☐ Sports & Outdoors
- ☐ Tools for Business
- ☐ Travel & Transportation

8020

| Topic Table | | | |
|---|---|---|---|
| Primary Key | Connecting Node ID | Keyword ID | Sequence |
| .... | .... | .... | .... |
| Ks | T1 | w1 | 1 |
| .... | .... | .... | .... |
| Kt | T1 | w2 | 2 |
| .... | .... | .... | .... |

8030

| Keyword Table | | |
|---|---|---|
| Primary Key | Keyword ID | Keyword |
| .... | .... | .... |
| Kn | w1 | ice |
| .... | .... | .... |
| Km | w2 | cream |
| .... | .... | .... |

110
Connection table
Connection ID
From (Connecting node)
To
sequence
...
A
B
C
D
i2
i3
i4
i5
115-A
120-A
130-A
140-A
141
142
143
111
Universal ID table
Universal ID
Data type
Local ID
Access time
Connect Node
topic
Type N
J1
2/15/05 6:05 AM
120-B
130-B
140-B
150
160
170
180
112
topic table
Ice cream
recipe
120-C
130-C

130

<Context>
<topic value= “ice cream” /> 131
<topic value= “recipe” /> 132
<topic value= “cheese cake” /> 133
<object type=“type 1”>
<connectionstring=“
Persist Security Info = False;Integrated Security = SSPI;database =
databaseABC;sever = server123;Connect Timeout=30” /> 134
<table= “table456” />
<localID= “id101”> 1341
<localID= “id 202”> 1342
</object>
<file path=“http://fileseverEFG/folder1/folder2/file3.jpg” /> 135
</Context>

Figure 11

| Keywords ☐ | Add New Topics | | View My Topics |
|---|---|---|---|
| 1. Keywords | 2. Related Topics | ▶ 3. Info Contents  4. My Interests | 5. Most Recent |

Related Topics (1) cheese cakes (1) strawberry

Inquiries ice cream recipes

~~Chocolate~~

Related Categories: 3 categories  10 info contents

☒ (5) strawberry

☒ (2) cheese cakes

| | Search Engine | Hyperlink | Tree structure/ Tagging | Database | Notebook | The invention |
|---|---|---|---|---|---|---|
| Find unique, hard to find information | X | | | | | X |
| Personalize information | | X | X | | X | X |
| Organize unstructured information | | X | X | | | X |
| Show interrelated relationship | | | | X | | X |
| Relation information with time | | | | | X | X |
| See the big picture | | | X | X | | X |
| Give dynamic, perspective view | | | | X | | X |
| Handle any type of information | X | | | | | X |
| Retrieve information by impression | | X | | | | X |
| Easily update information & structure | | | | | | X |

| Record number | File | Tags |
| --- | --- | --- |
| n1 | File 1 | Ice cream |
| n2 | File 1 | Recipe |
| n3 | File 2 | Recipe |
| n4 | File 2 | Sushi |
| n5 | File 2 | Japanese cooking |
| n6 | File 3 | Recipe |
| n7 | File 3 | Chemical database |

Fig. 45B

CROSSLINK DATA STRUCTURE, CROSSLINK DATABASE, AND SYSTEM AND METHOD OF ORGANIZING AND RETRIEVING INFORMATION

CROSS-REFERENCE TO RELATED APPLICATIONS

This Application claims priority from U.S. Provisional Application Ser. No. 60/652,751 filed Feb. 15, 2005, from U.S. Provisional Application Ser. No. 60/669,086 filed Apr. 6, 2005, from U.S. Provisional Application Ser. No. 60/694,530 filed Jun. 27, 2005, and from U.S. Provisional Application Ser. No. 60/699,713 filed Jul. 15, 2005; the disclosures of which are incorporated herein by reference.

BACKGROUND OF THE INVENTION

1. Field of the Invention

The present invention generally relates to organization and retrieval of stored digital content (such as, but not limited to, records in database, documents, web pages, merchandise, people contact information, to-do, task, book information, audio files, video files, emails, instant messages, maps, graphic/picture files, photo files, folders, machine codes or machine scripts, an application specific files, application scripts, etc.) and human motives (such as, but not limited to, thoughts, meanings, preferences, priorities, objectives, goals, project structures, planning ideas, intentions, wishes, action items, decisions, conclusions, moods, motivations, sequences, questions, etc ), e.g., on personal computers, on computer networks, on the web, on central databases, in the notebook, etc. The present invention also generally relates to integration of human motives with the stored digital content. The present invention also generally relates to processes that enable systematical and easy update stored information organization to cope with the fast evolving and diversified human motives and digital content collection. The present invention also generally relates to processes that enable viewing and retrieving the organization of stored information from different perspectives that driven by user's circumstantial needs. More particularly, the present invention is related to a crosslink data structure, crosslink database, and systems and methods of organizing and retrieving digital content and human motives.

2. Description of Related Art

There are five basic platforms that we generally used in the prior art to retrieve and/or store information (that includes digital content and motives). Each platform has its strengths in meeting certain basic needs of storing and retrieving information:

1. Search engine: desktop and internet: Google, Yahoo, MSN, Ask Jeeves, Corpenic, etc.
2. Tree structure and tagging: Microsoft folder structure, organization chart, build of materials, merchandise lookup for tree structure and tagging for Flikr.com and del.icio.us.
3. Hyperlink: Web pages, MS documents, PDF documents.
4. Conventional database: Email tools, files in a folder, customer records in SQL server, etc.
5. Chronicle notebooks/diary: Emails, hard bound paper notebook, etc.

To accomplish various objectives, users need to integrate their motives (projects/thoughts/objectives/tasks/do-to, etc.) with their digital content. Because of the use of various platforms, users need to hop between these platforms to access various pieces of information. It is very difficult to efficiently manage this task because the digital content and the motives tend to be unstructured, fast changing, out of synchronization and scattered over time. Currently most people do this integration function in their heads. Additionally, the increasing demands in efficiency and effectiveness of processing large volume of information in the Internet era have become the root cause of information overload for individuals at work and at home. Therefore, a solution is needed to help users integrate the stored digital data with individual motives.

The examples of basic human needs for efficient integration and process of motives with the stored digital content are as follows:

1. Find specific, unique digital content in the mass volume of information: When the information is specific, unique, and unexpected for its purpose, the ability to search is critical. The search engine is very useful in this aspect.
2. Personalize digital content to fit personal perspective: Each person views information from a different perspective and value.
3. Organize unstructured information that arrives at the wrong sequence: The daily information that people encounter is often random, disorganized, and arriving at the wrong sequence. It is often broad and versatile. It is difficult to organize information under such circumstances.
4. Show interrelationship between information: The same piece of information can be useful for many different motives and can relate to other information. It is a daunting job to manage the complex, cross-related information while the collection of digital content and human motives constantly evolve.
5. Relate information to time: Many motives are more urgent than others. More recent information is more likely to be more relevant and need to be taken with a higher priority than an old piece of information. Sometimes people remember information by time, but cannot remember the specific subjects. Sometimes people remember things to follow up by reviewing notebooks but otherwise can not remember.
6. Integrate information into a big picture: When information relates and integrates, we gain better perspective and vision of our motives. It is also easier to identify the right information if we have a clear picture of what is available from a bigger scope surrounding our scope of interests.
7. Give dynamic perspective view of information based on the needs of specific motives or digital content: The chance of being right in the early beginning is small because the collection of digital content and motives often evolve constantly, rapidly, and unpredictably. But the prior art system requires us to fix the perspective based on current available digital content and motives.
8. Handle different types of information: In the Internet era, we often need to combine digital content from the web, emails, documents, notebook, etc with our motives so we can perceive or act effectively and efficiently. Today we often record motives separately from the organization of information and we rely on our memory to cross-relate them. But our memory is not reliable and we are neither efficient nor effective in drawing the complex relationship.
9. Retrieve information by impression: Since our memory is often not reliable, we need to be reminded what is available. Sometimes we may not recall the intended topic but can trace it from other related topics. Sometimes we may remember only the major topic and cannot recall the details of sub topics.

10. Easily update information and its structure: Information and structure needs to be constantly up dated to be meaningful because information may evolve quickly and unpredictably. Our collection of digital content and our motives form a close feedback loop (influential of each other). We acquire digital content based on our motives whereas our motives could alter by what we learn from the collection of digital content. This makes information data structure unpredictable. The solution is not to acquire the fortune telling ability but the ability to easily revise information and information data structure.

A comparison chart of how each platform's strength in meeting these needs is show in FIG. 44. It points out that how each platform affectively meets part of these requirements but none of them meets all the requirements. It is one of the invention's objectives to integrate these platforms by providing an interface between the users and these platforms.

Personal Computers—File Folders

Computers generally interface to one or more storage devices, including for example, removable or non-removable storage media such as floppy disks, hard drives, CD ROMs, digital versatile or video disks (DVD) and the like. These storage media may be local or on a network accessed by the computer, and used to store and retrieve various types of information, generally under a file folder format. For example, when a user creates a document with an application program, the document can be saved as a data file on the storage media. A request is sent from the application program to an operating system executing in the computer, and the operating system in turn sends a request to the storage device to store the data under a given specific file name. The storage device then stores the data as part of a file on the storage media at a specific location under the given specific file path (file name, folder names and file server name). The user may then, on a later stage, retrieve the data via the operating system and/or network file sharing/transmitting protocols; further manipulate the document, and then update/resave the data. However, in order to be able to retrieve the file, the user needs to decide on where to store the document and decide what name to give the document. Then, when the document needs to be retrieved, the user needs to recall where the document was stored and under what name it was stored. Consequently, when the number of files and folders increases, the user may experience difficulty in locating a specific document and may make several searching efforts in an attempt to locate the document.

As users amass more files, it becomes difficult to decide where and how to store the unstructured information. To illustrate, let's look at an instant where a father wishes to store a picture showing his daughter, Melody, in a recent ski trip to Lake Tahoe. Consider a folder tree shown in FIG. 1 is in a computer or in a photo application. In which folder should that particular photo be stored in order to facilitate easy retrieval at a later date? The picture shows Lake Tahoe, so maybe it should be stored under the "Lake Tahoe" folder 1020. On the other hand, there's a family member in the picture that was taken during a trip, so maybe it should be stored under "family album" folder 1040 or "2004 trips" folder 1050, and so on. Of course, a new folder, e.g., 1010, may also be created under a new name, say "Melody" (shown in broken line). If it is decided to create a new folder, then it is required to consider how to associate this new folder with existing tree folder structure and anticipate future files and folders. For example, "Melody" folder can be placed under "family album" to collect pictures of Melody, or it can be placed under the "2004 Trips" to collect all pictures of Melody taken during 2004 trips, or under "Ski Trip", to collect all Melody's pictures taken during ski trips, etc. Furthermore, there may be a need to predict the folder structure accommodating future folders and future photos. For example, create "School" and "Birthday Party" folders in the future.

Thus, reviewing of the existing folder structure requires additional efforts and predicting folder structure for storing future information requires experience and foresight; it is tough to organize the information in a tree structure because information is often interrelated. Additionally, occasionally new data is received that may necessitate reorganizing the entire or part of the existing tree structure. This can be very disruptive. On the other hand, some newly received data simply doesn't fit into any of the existing folders and remains in a "loose" manner in some existing folder, which makes it very difficult to retrieve at a future date. In the end, despite having invested a lot of efforts to stay organized, the various files may still end up in a somewhat disorganized manner and provide a challenge trying to find certain information, as is currently experienced by even casual users of computers.

To address the issue of interrelationship between photos, some photo applications let the users to tag a photo with personal text strings. Tagging is like a virtual folder. In a tagging environment, the single version of a file can be simultaneously tagged by several tags. This function is equivalent to placing the file alias into multiple virtual folders without the need of duplicating the file. Therefore, this file is accessible within all the virtual folders where the alias resides. In other words, the tagging technology saves user's effort for creating a virtual folder named, creating the file alias and placing the alias inside the folder. The user simply points to the file and assigns a tag, and it is done. However, fundamentally it inherits the same issues as a tree structure. Tagging provides the user a more convenience way of implementing the old scheme. When implements too many tags, it becomes scattered like too many loose folders of very shallow depth.

A notebook that records information in a chronicle order is widely adopted to log events that arrive chronically. This form of information is useful for review of what has happened in the near term, follow-up, and to-do. It also servers handy for the user to temporary store the information and convert it to other forms when time is adequate. This type of information is rigidly organized by chronicle order, otherwise lacks of structure. It is important for the user to remember the approximate date when the information is recorded in order to retrieve the information.

Email system is a combination of all information platforms. On one hand it is similar to a notebook that by default, stores information in chronicle order. On the other hand it provides a simple database that let the users sort information by the sending/receiving party, date, and subject. In addition, it let users organize the information by folder tree structure and tags. Email system, however, merely gives its user to view the information in different information form. It still inherits the same problems from each individual platform. When organize emails in folders, it suffers the same issue of not addressing interrelated relationship. When view it in chronicle order, it lacks logical and human motive information.

Remote Access—Internet

Computers also generally access data stored on remote locations, such as via the Internet. Due to the proliferation of the Internet, an overwhelmingly large volume of information is available to computer users. However, finding, processing, organizing and storing the influx of this large volume of information is problematic. One approach is to store the information in a conventional database in a desired structure form where information is required to fit a set of prescribed parameters. For example, bank accounts websites are normally organized in a conventional database manner, so that information can be presented in the form of related tables (each similar to a spreadsheet). Another approach is to use a tree type structure. Retail merchant websites are normally organized in such a manner. For example, car-parts retail websites make the user follow a decision tree by asking the user to chose a model year, car maker, car model, etc, leading the user through a decision tree to the appropriate part for purchase.

Most of the web pages are interrelated by hyperlink. But from a user's view, much of the data available on the Internet is organized in a structure that is not always compatible with what they have in mind. In such a case, a conventional search engine may be used to search the files, or the user may find the files by following hyperlinks from other files. However, search tools tend to bring in large volume of information that requires the user to elaborately filter through them. If in the future the user wishes to return to a particular webpage, the user must recall the exact location of that webpage or the user must bookmark it when first viewing it in order to be able to use the bookmark for a return visit. Still, because of the large number of web pages available on the Internet, if the user bookmarks every page the user may wish to return in the future, the user will find it difficult to find a particular bookmark among the large number of bookmarks created. Consequently, users find it necessary to create a filing scheme even for bookmarks, which results in the same problem as with saving a document, i.e., in which folder to store a bookmark and under what name. For instance, Yahoo!Bookmarks uses a folder structure (1H) to organize their subscribers' personal web bookmarks. Some websites like Amazon.com have a "wish list" mechanism that allows their customers to store their favorite merchandise items on site. This mechanism has a few drawbacks from the consumers' view: (1) When the wish list grows, it becomes hard to manage and (2) when a purchase is to be made, it is difficult to compare related merchandise items stored in different websites.

Furthermore, conventional searching, using search engines such as Google.com, Yahoo.com and the likes, is not very efficient due to the large volume of returned results which has very little relevance to the subject matter sought after. That is, in order to perform an efficient search, the user needs to become proficient and structuring efficient searches. Looking at a casual user, for example, assume the user would like to purchase a sweater. If a user simply enters the term "sweater" on a conventional search engine, more than a million matches for "sweater" keyword would be returned. Consequently, the user needs to invest efforts to further narrow down the search result to, perhaps, less than a hundred. Understanding this problem, certain Internet providers, such as Info.com for example, try to help the user brain-storm by providing suggestions for the search terms; however, the suggestions are often not related to what the user is searching. For instance, for "sweater", it suggests "jacket", "Bathrobe", "Shirt", etc. to the user, which are not relevant to a user looking to find a sweater for purchase.

Libraries—Loose Data

Another utility made available by the advent of computers and the Internet is the ability to make collections of information, such as electronic libraries. For example, many publishers have their printed collections also available electronically online. Similarly, PC users may store their own collection of data files, e.g., articles, recipes, letters, etc. Again, in order to facilitate retrieval of the stored information from such collections, a storage scheme needs to be developed. So, for example, publishers of journals may utilize publication date storage scheme, where each volume is stored under its publication date. On the other hand, many journals have the journals broken down to articles written by different departments, in which case, the various articles will be saved under the department's subject matter—separately from the particular issue date of the journal. Therefore, in order to retrieve a particular article, the user needs to understand the storage structure and have some knowledge about the article, e.g., on what date it was published? In what journal volume? Under which department? Etc.

A similar problem exists when PC users try to create their own collection of data on their own system. Consider for example an engineer who collects published technical articles. These can be stored according to subject matter, according to the name of the journal, according to the author, according to publication date, according to the conference in which the paper was published, and so on. The user has to select a storage strategy at the onset, and then have some information about each article in order to be able to retrieve it. So, for example, assuming that the user chose to store the articles under subject matter. The user at a later time tries to retrieve an article of which he knows the author and the conference in which the author presented the paper, but he is unsure of the exact subject matter. This will present a challenge to the user to retrieve the article—the user will have to either comb through articles of various subject matters, or perform a global search and hope that the number of returned results is not too large.

Moreover, the engineers after reviewing the information may gain some thoughts regarding the technical articles. These thoughts can be related to tasks or projects. These thoughts are often written in a notebook for future reference. Since this type of events come random and out of synchronization in life, its relevancy to the tasks and projects may not be clear to the engineer at the point of conception. While the task or project has their own set of objectives, deliveries, milestones, deadlines, etc. It is very difficult for the engineers to keep track and integrate their accumulated thoughts to their tasks or projects. Similar issues for project managers who receive unstructured information (emails, reports, customers feedbacks, business activities/events) daily and try to tie the information with their project objectives, tasks, milestones, deadlines, etc.

Human Motives

To make information interesting, meaningful, and valuable to the user, it has to integrate the user's personal motives, such as but not limited to thoughts, meanings, preferences, priorities, objectives, goals, project structures, planning ideas, intentions, wishes, action items, decisions, conclusions, moods, motivations, processing sequences, questions, etc. A digital content may not contain the user's personal motives, for instance, a public web page, someone else's emails or documents, merchandise information, commercial music and videos, photos, books, etc. The user's motives are often personal, diversified, unstructured. To reflect the user's personal motives, the user may constantly rewrite the motives in documents, in emails, in the digital content name and folder structures, data in an application, paper notebook, yellow stickers, napkins, or loose papers. When the project makes progress and evolves, much of the information becomes obsolete and irrelevant to the present date motives. When the motives reflect in folder structures, it works best when used for a hierarchical tree structure. This may in conflicts with personal motives that tent to be interrelated and not structured. During the early development of human motives, it is often not well thought out. It is premature for the user to forecast a well thought out tree structure. Once the folder structure is articulated, other digital content are filled into the folders and become inflexible to be updated. The structure becomes inadequate when the motives and the collection of digital data evolve.

Conventional (desktop or web) search engines are often brought in to search the digital content and motives that have become scattered and massy. But it is ineffective and time consuming to achieve the objectives of this invention. The issues are that the user needs to intelligently drive the search engine in order to retrieve relevant and meaningful motives. Search engine can bring in information containing the keywords. But many of the relevant information does not containing the motive keywords. For instance, the vendor's standard part specification may be used for a specific engineering task but it is not mentioned in the document because the specification is for general purpose. Because many digital content does not contain the user's personal meanings, the user often do not remember what keywords to use to retrieve the data. Search engine often brings in too many irrelevant or obsolete data; it cannot help to construct the structure and interrelationship between motives and digital content. It relies on the user to have the pre-knowledge of this interrelationship and painstakingly review pieces of search results and manually construct the information structure.

Some application like Microsoft Project tie deliveries, and tasks/to-do, milestones together with resources and time for a project. It provides an effective mean for drawing interdependency between tasks, deadlines/milestones and available resources. However, it is limited when used to address complex interrelationship between tasks, to-do (human motives) and digital content. For instance, an engineering task may need to consider the marketing requirements from several customers, preliminary experimental data and research reports from literatures. A marketing milestone may involve feeding back engineering progress to the customers and it may involve multiple emails exchange with the engineering departments, business decision makers, and several customers. A manufacture task may require an engineering change order (ECO) and multiple follow up with vendors, while an engineering task may be related to multiple emails exchange with manufacture engineers who express concerns on phasing out existing inventory parts, availability of the parts and tight schedule. The complexity glows with the size of the projects and the number of people/departments involved in the project.

Prior Art Interrelated/Crosslink Data Structure

The complex cross relationship between data has been used in several applications to address none hierarchical (tree) type data structure. ThinkPad.com's technology was utilized by Visualthesaurus.com to express the complex relationship between related words and topics (a multiple word text string). For instance, when one looks up keyword "legal" (101B, FIG. 1B), it shows related words like "law", "illegal", "judicial", etc. When the user clicks on the keyword "judicial" (102B), the system shows related words like "justice", "judge", "discriminative", etc (FIG. 1C). When a keyword is inquired, the dictionary meaning of the keyword is also shown (102D, FIG. 1D). TheBrain.com employs a similar technology for a user to manage their complex interrelated digital content and thoughts. Topics and digital content can be cross-linked. Like the dictionary words, when inquire about a topic (101F, FIG. 1F), it shows the related topics (102F) and digital content (103F) in a visual map. When clicks on a content member, the details of the data content is displayed. Both companies demonstrate the applications of a none-hierarchical data structure and present this structure using a visual map. To avoid cluttering the visual map, related topics and digital content needs to be group into a layer tree branches. So the user has a limited vision of the branch; in contrast, the user of a tree structure can see how the current folder (topic equivalent) branches off from the main. Therefore, this technology gains flexibility to be able to interrelate digital content and motives, but at the expense of seeing the main data structure.

Many issues need to be addressed if this data structure is to be adopted to accomplish such an objective. First of all, it may create multiple similar topics or keywords that are difficult for the user to keep track of. When type in a topic, it suggests other topics that share the same first word. If a user first enters a second word of a topic, this topic will not be suggested. In addition, topics by itself lacks context. Unlike a folder in a tree structure, the user may grasp the meaning of a folder with the help of the folder tree. Try to stay on the track of thought or gain an integrative view of the information would have been much more difficult when compares to a tree structure. A user may easily get lost after following a few leads in this type of data structure. An example is shown in FIG. 1E when "true" is inquired. Moreover, it lacks of priority or weight between related elements because of no hierarchy. When compares to a tree data structure, it suffers many short comings in exchange for the ability to crosslink.

Similar data structure as that used by Visualthesaurus called tagging has been widely adopted for organizing web content but expressed in words by the search engine info.com or for web blogs technorati.com. For instance, when one searches for keyword "grill" in info.com it suggests related topics like gas grills, barbeque grills, grilling BBQ, Weber grill, grilling recipes, barbecue, charcoal grills and outdoor gas grill. In this case, the keyword "grill" is connecting to the above topics in a similar way that "legal" connects to other related keywords in FIG. 1B. It is not clear whether the data structure allows the user to compose this relationship. Nevertheless, it inherits the same problem as that of the Visualthesaurus data structure. Other examples are web site like del.icio.us where a group of related "tags" is presented when a tag is inquired. Each tag may be a plurality of words just like that in Visulathesaurus. For instance, when one selects the tag "tech," it returns "blog", "technology", "news, web", "software", "geek", "tools", "reference", "programming", "blogs", and "daily". Similarly, web site 43things.com relates activities (each described by a topic) together like the dictionary words in Visualthesaurus. To emphasize a topic, it increases its font size, for instance, see 101E, FIG. 1E. Flikr.com uses similar scheme for their users to relate a topic to a group of photos. Google "GMail" and Apple "Mail" let their users to relate a topic (tag) with a group of emails.

The tagging technology and its limitation are summarized in an example as shown in FIGS. 45A and 45B. Tagging technology allows a file to be associating with a plurality of tags: File 1 is associating with ice cream and recipe via the "connections" 4510, and 4520; file 2 is associating recipe, sushi and Japanese cooking via the "connections" 4530, 4540 and 4550; file 3 is associating with recipe and chemical database via the "connections" of 4560 and 4570. On the other hand, the recipe tag 4500 is associating with file 1, file 2 and file 3 via the "connections" of 4520, 4530 and 4560. The recipe tag is also associating with other tags that are associating with these three files via the associations with file 1, file 3 and file 3: ice cream, sushi, Japanese cooking, and chemical database. In this example, only three files are involved. But it may have confused the user why ice cream and chemical database are related at all. This drawbacks may be seen in del.ico.us, 43things.com, and flickr.com where webpage bookmarks, blogs, or photos are tagged, when the number of digital contents are involved, the association of tags are in large number and often are confusing and incomprehensible. The other issue with tagging is that it allows one to inquire about one digital content or one tag in a time. It does not allow progressively narrowing the tags like following a tree structure. These two drawbacks are the main flaw that prevent tagging technology to be applied in applications that require organizing complex structure of information that currently dominated by tree structures and conventional database structures.

The simplified version of how tagging technology is implemented is described next. The database table 4510B contains a plurality of records; each record represents a "connection" between the files and the tags in FIG. 45A. For instance, record n1 represents the connection 4510 between File 1 and ice cream. To find the tags associating with File 1, a filter is applied to find any records that containing the File 1 file; in this case records n1 and n2, therefore, the tags of ice cream and recipe. On the other hand, to find the files associating with the tag recipe, a filter is applied to find any records containing the recipe tag; in this case, records n2, n3, n6, therefore, file 1, file 2 and file 3 are retrieved; name the outcome as table A. To find the association of other tags with the recipe tag, retrieve any records that containing in table A: file 1, file 2 and file 3. This step is a common operation in database by joint table between the file data field of table A and the file data field of original table.

FIG. 44 briefly summarizes the deficiency of all existing systems and methods for integrating digital content and motives that store in different platforms:

Search Engines:

1. Deliver an overwhelming amount of data that is often overbroad and irrelevant.
2. Lack organization structure. The user lacks a grand plot of thought; tend to narrowly focus on each individual information when it is needed.
3. Cannot find information that you completely do not remember. When things are organized, we can be reminded of important information that escapes our mind. Since organization is not part of the search engine, it relies on the user to initiate a search. One cannot initiate a search if not aware of the proper keywords Hyperlink/Prior Art Crosslink/Tagging Data Structure:

1. When compares to a tree structure, it is unable to clearly present a clear relationship for a complex data structure. The strength of hyperlink and tagging provide a user friendly reference to other information.
2. Quickly loss track of thought when jump between hyperlinks and tags. Because this platform lacks clear structure, it relies on the user to draw the overall information structure by reviewing related information. But when information is cross-referenced, one can quickly lose track.
3. When compares to a tree structure, it lacks priority or weight between related elements in the structure.

File Folders/Tree Structure:

1. Cannot organize interrelated information. Tree structure has a rigid hierarchy. When information is interrelated, hierarchy logic breaks down.
2. The rigid hierarchy makes it impossible to view information from a different perspective.
3. In creating a tree folder structure, one must predict future files and future requirements based on today's perspective, which makes it very difficult to construct the structure and leads to revisions and inefficiencies.
4. Re-structuring of a tree is time consuming and often disruptive, especially if various files emails or web pages contain hyperlinks to other files. These hyperlinks must also be changed to reflect the revise structure, or they will not function properly. It is impossible to keep tracks of these hyperlinks that imbedded in files and web pages.

Conventional Databases:

1. All input information must be structured according to the rigid requirements (format) of the database. It is not suitable to handle diversified information and information that evolves and needs constant restructuring.
2. Creation of a conventional database requires high level of technical skill and familiarity with the architecture of the database software.

Chronicle Logger (Notebook/Conventional Emails):

1. Poor data structure. Notebook stores information in a rigid chronicle sequence.
2. Time consuming to gather information that scatters in the notebook/emails over a period of time when information becomes versatile.

Thus, there is a continuing and growing need for systems and methods for organizing digital content and motives in a meaningful, integral, and timely manner that allows the scope of content, motives and available information to be quickly ascertained and that enables quick access to information of particular interest.

SUMMARY OF THE INVENTION

The present invention is directed to a crosslink data structure, crosslink database, systems and methods for meaningfully and timely organizing information (including digital content and human motives) so that any specific data and the scope of other data related to the specific data may be easily retrieved for reviewing and/or updating/revising purpose.

The present invention is directed to a crosslink data structure, crosslink database, systems and methods for meaningfully and timely organizing data so that data structure do not need to be articulated to predict future incoming data and can self adjust the data structure based on the evolution of the data.

The invention is directed to a method of meaningfully organizing unstructured data to form a cross linked database that would enable quick and progressive grasp of data structure, and search of information of interest.

The invention is directed to a method of meaningfully and timely organizing unstructured data to relate to structure data and search engine data that would enable quick and progressive grasp of data structure, and search of information of interest.

The invention may be implemented in a system that is convenient to use, that presents the information in a readily accessible way via one or more display devices.

The present invention enables acquisition of various information of interest for subsequent review.

According to an aspect of the present invention, the information may be organized in a system comprising of keywords, topics, Context, connecting nodes, linking members, and content members.

According to an aspect of the present invention, a crosslink data structure is provided, in which information (that includes human motives) may be meaningfully cross-linked for facilitating easy and quick retrieval of a particular information of interest stored in the crosslink database, and for facilitating easy and quick retrieval of the overall information surrounding or adjacent to the scope of interest. The crosslink data structure, according to an embodiment of the present invention comprises at least a connecting node and at least a first element and a second element, connected to the connecting node by a connection. The first element is related to the second element and can be traced via the connection and the connecting node. The second element is related to the first element and can be traced via the connection and the connecting node. The connecting node may correspond to a topic, wherein the first element and the second element constitute different keywords related to the topic. Alternatively, the connecting node may correspond to a Context, wherein the first element and the second element constitute different topics, content members, or combination of thereof. Each content member may comprise a link (computer or web application function call, database record, URL, hyperlink or file path, etc.) and its associate parameters to a digital content such as but not limited to a text string, a record in database, a Context in a crosslink database, an inquiry to a server application, a document, a web page, a text file, a blog, an audio file, a video file, a graphic/picture file, a photo file, a map, a folder, a machine code or script file (for instance, exe, dll, bat, cmd, script files, etc.), an application specific file (Microsoft office, setup file, programming tool, etc), a merchandise information (for instance, books, clothing, electronics, drugs, DVD, audio CD, etc.), a manufacture part information, an inventory information, a process information, a record in filing information, an email, etc., or combination of thereof.

According to an aspect of the present invention, a system for organizing and retrieving digital content information and motives is provided. The system may comprise a local computer comprising a GUI application (for instance, a browser, or a computer application, or a browser like application); at least a first database server comprising a crosslink database; and at least an information agent where information is handled. A user may interact with the web browser to communicate with the first database server and the information agent. The crosslink database may reside in the local computer or in a computer network or over the internet; the information agent may be a conventional database server, an application server, a local computer application, a search engine, a web server, or another crosslink database server, etc.

According to another aspect of the present invention, a system for organizing and retrieving information is provided. The system comprises a computer system accessible for interactive communication with users. The computer system may comprise a crosslink database stored therein. The crosslink database comprises a crosslink data structure comprising at least a connecting node and at least a first element and a second element connected to the connecting node by a connection; and a GUI application (for instance, a browser, or a computer application, or a browser like application) for interactively communicating with the users for organizing and retrieving/revising information in the crosslink database. The first element is related to the second element and can be traced via the connecting node. The second element is related to the first element and can be traced via the connecting node. The connecting node may correspond to a topic or a Context of information, and wherein the first element and the second element constitute different keywords, topics, content members, Contexts or the combination of thereof of information related to the topic or Context of information.

Alternatively, the first element and/or the second element constitute a topic of information related to two different Contexts of information. One or more content member related to a topic may be connected to the node or the topic. Each content member may comprise a link (application function call, database record, URL, hyperlink or file path, etc.) and its associate parameters to digital content such as but not limited to a record in database, a Context in a crosslink database, an inquiry to a server application, a document, a web page, a text file, a web blog, an audio file, a video file, a graphic/picture file, a photo file, a folder, a machine code or script file (for instance, exe, dll, bat, cmd, script files, etc.), an application specific file (Microsoft office, setup file, programming tool, etc), merchandise information, emails, or combination of thereof.

According to an aspect of the present invention, commercial information including merchandise, product information, forms, audio/video products, books, photos, electronics, resume, contact information, services, electronics, and the like, may be cross-linked with related merchandise links/IDs/files according to the method of the present invention, and then stored in the crosslink database and associated with the web site host. Thus, one or more users may link to the web site host for inquiring and progressively searching the products of interest for shopping over the internet so that the disadvantages of conventional keyword search leading to many irrelevant topics may be effectively reduced. The crosslink database server may monitor the frequency of sites/information visited by the users and accordingly rank their priority and present them to the users.

According to another embodiment of the present invention, the crosslink database associated with the web site server may allow the subscribers to customize the Contexts associating with web pages and merchandises.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 1A-H illustrates and example of prior art data structure.

FIG. 11 illustrates a transmission of a cross link database according to an embodiment of the present invention.

FIG. 44 illustrates how each existing information platform meets requirements.

DETAILED DESCRIPTION OF THE INVENTION

Figure 1A:
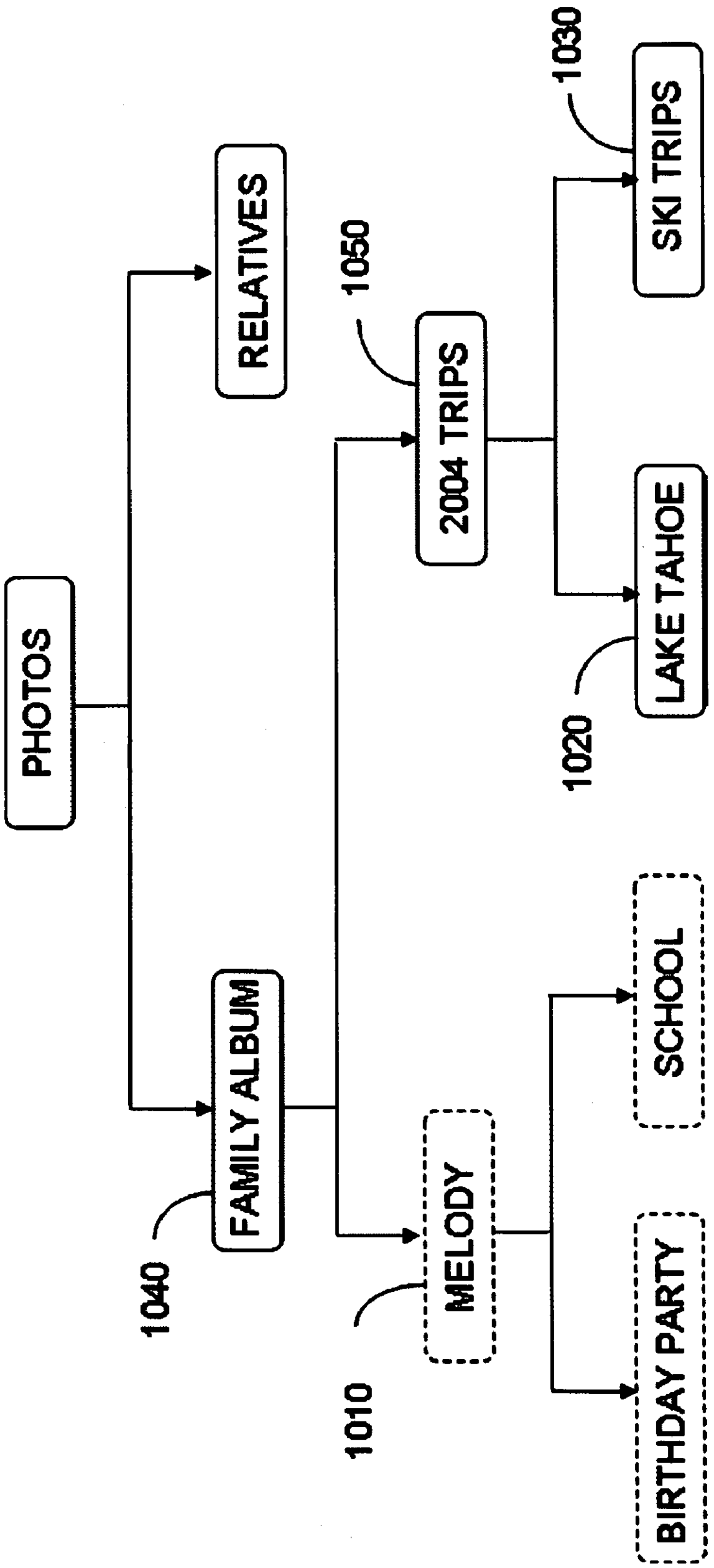
Figure 1B:
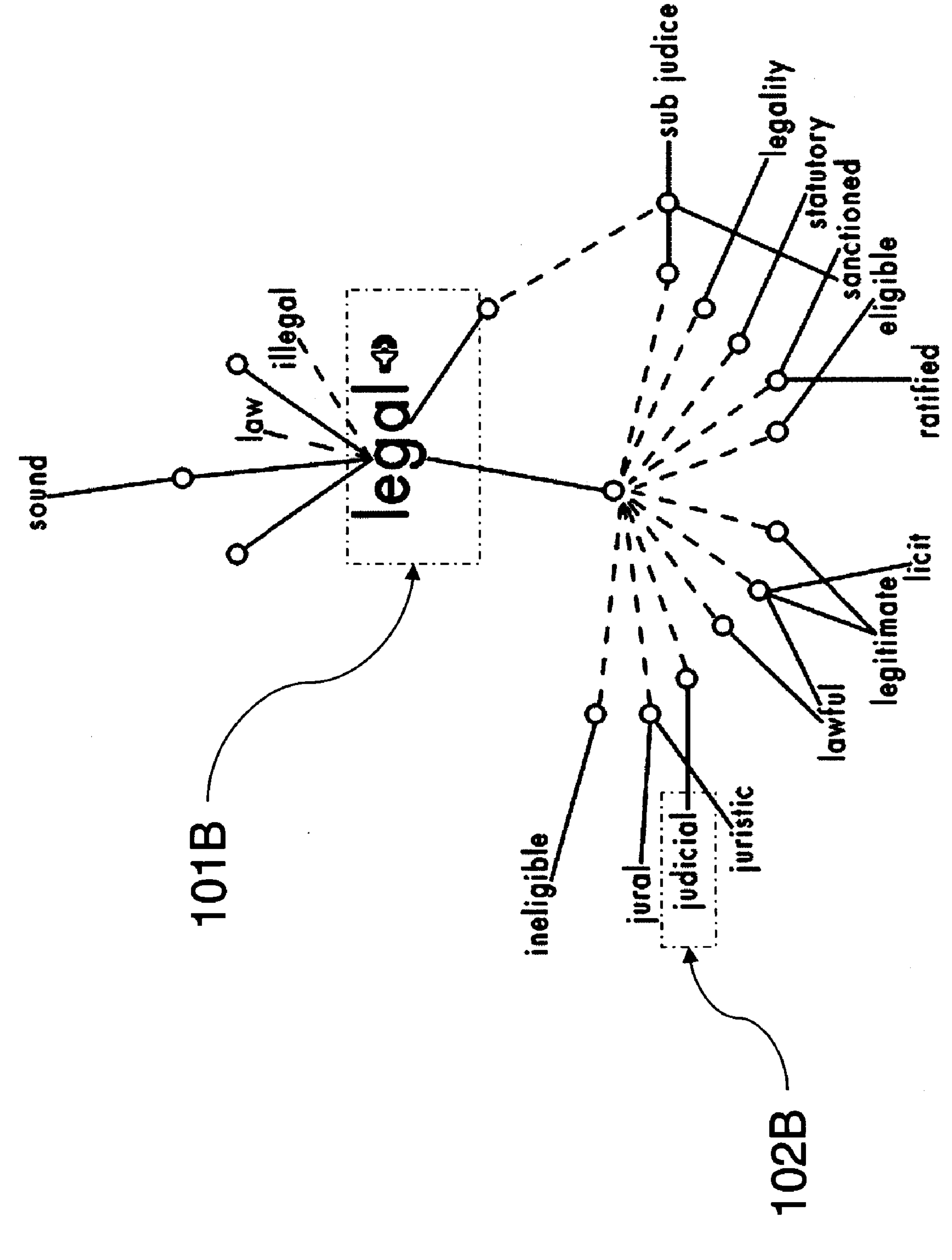
Figure 1C:
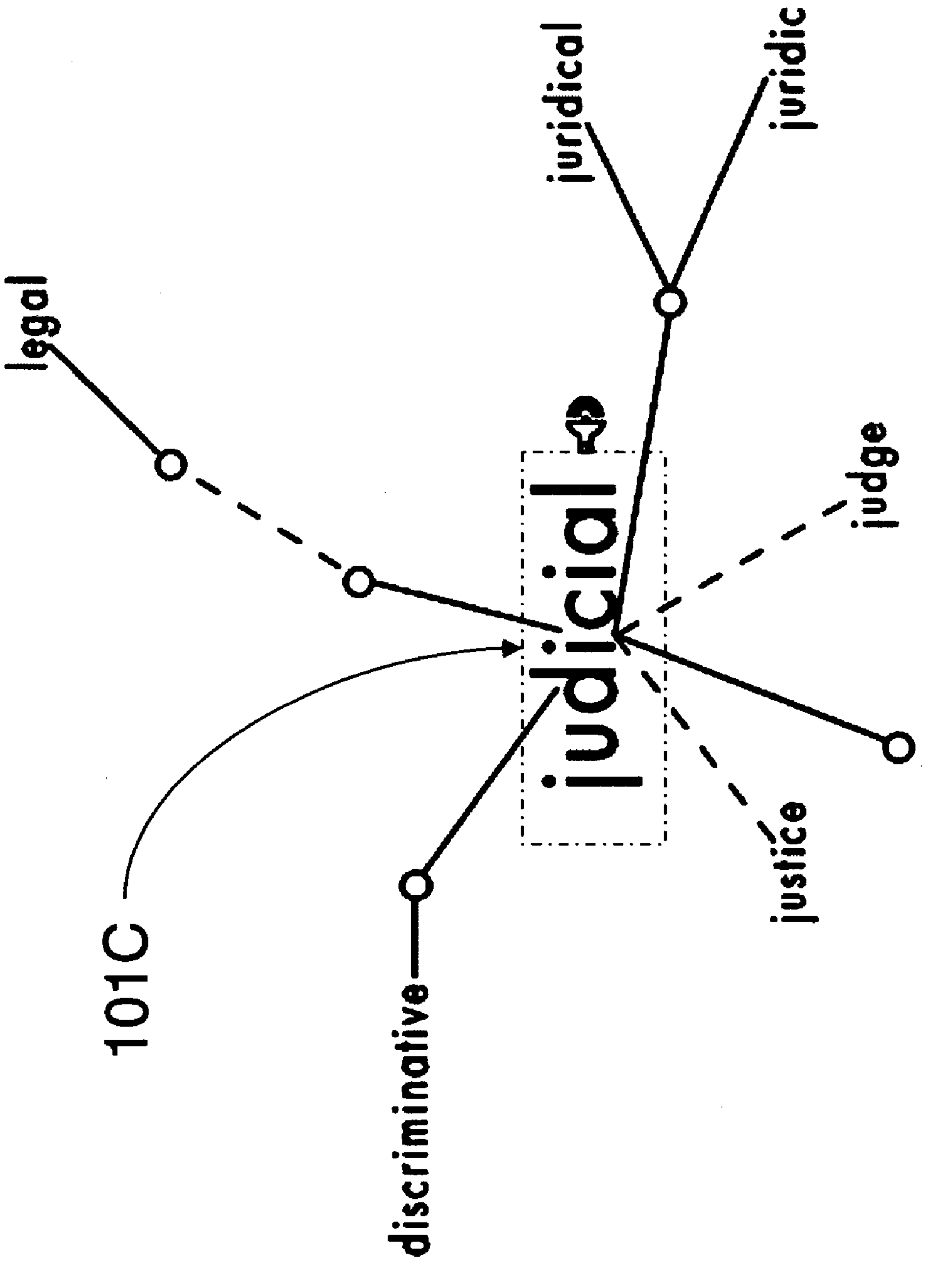
Figure 1D:
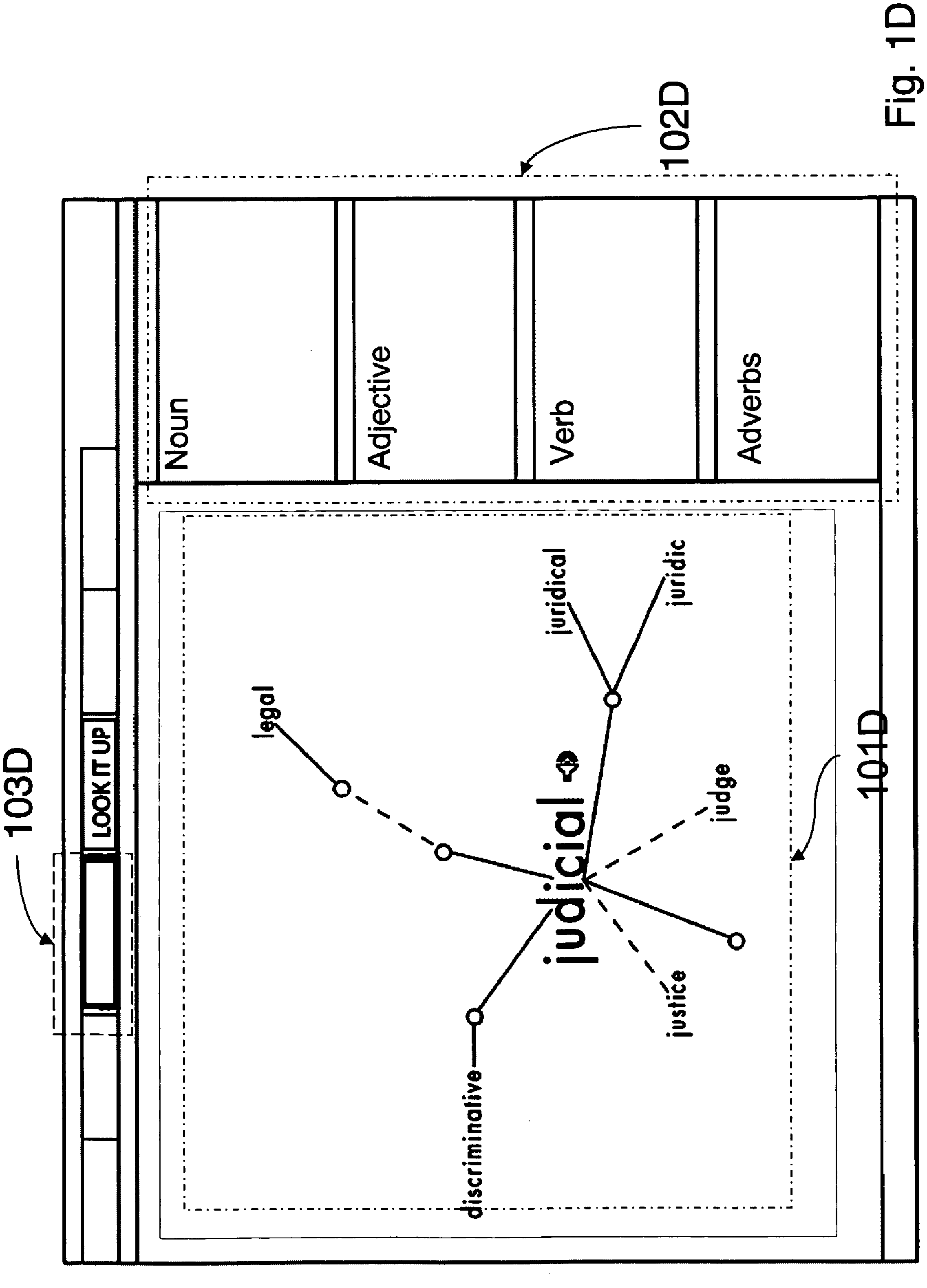
Figure 1E:
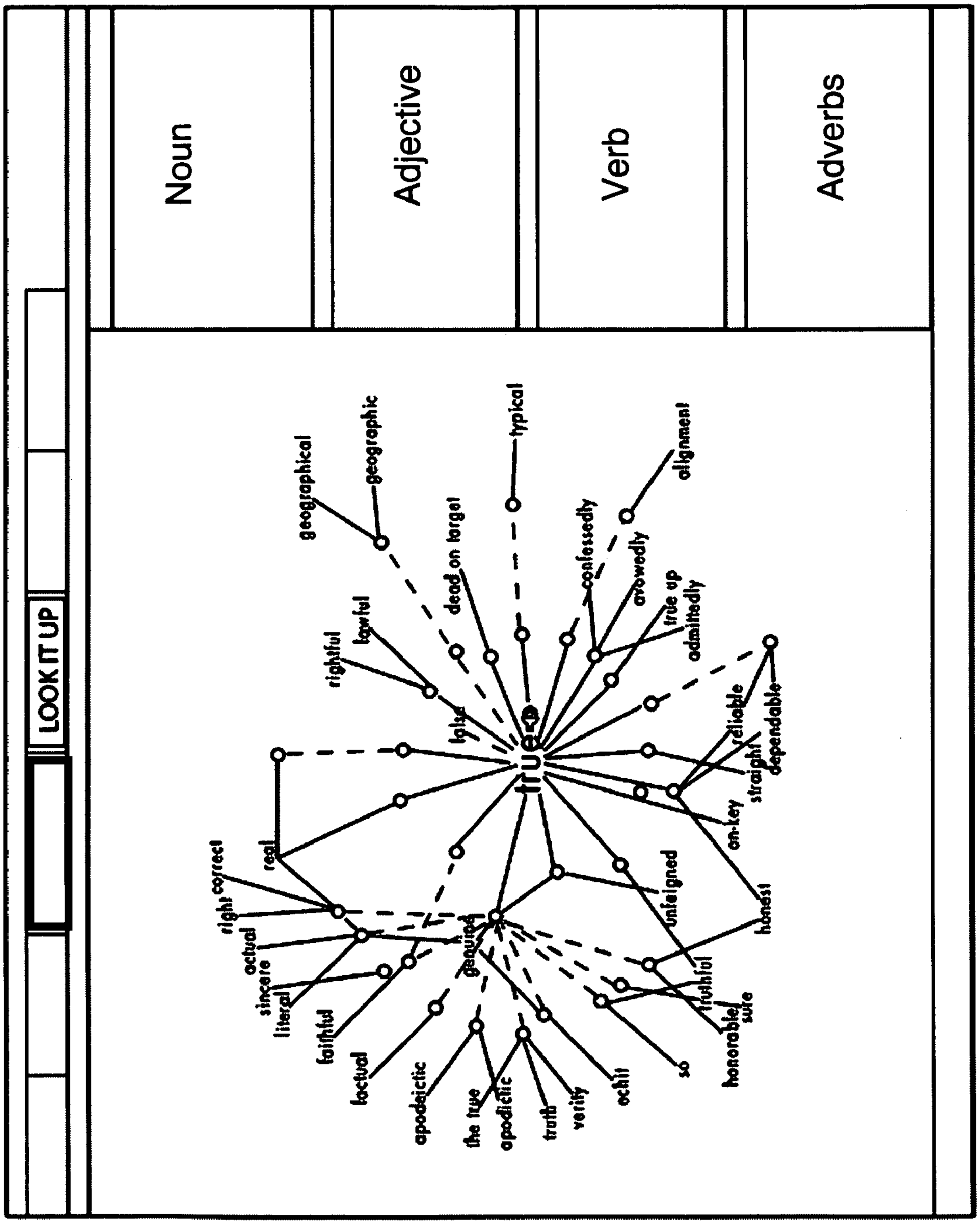
Figure 1G:
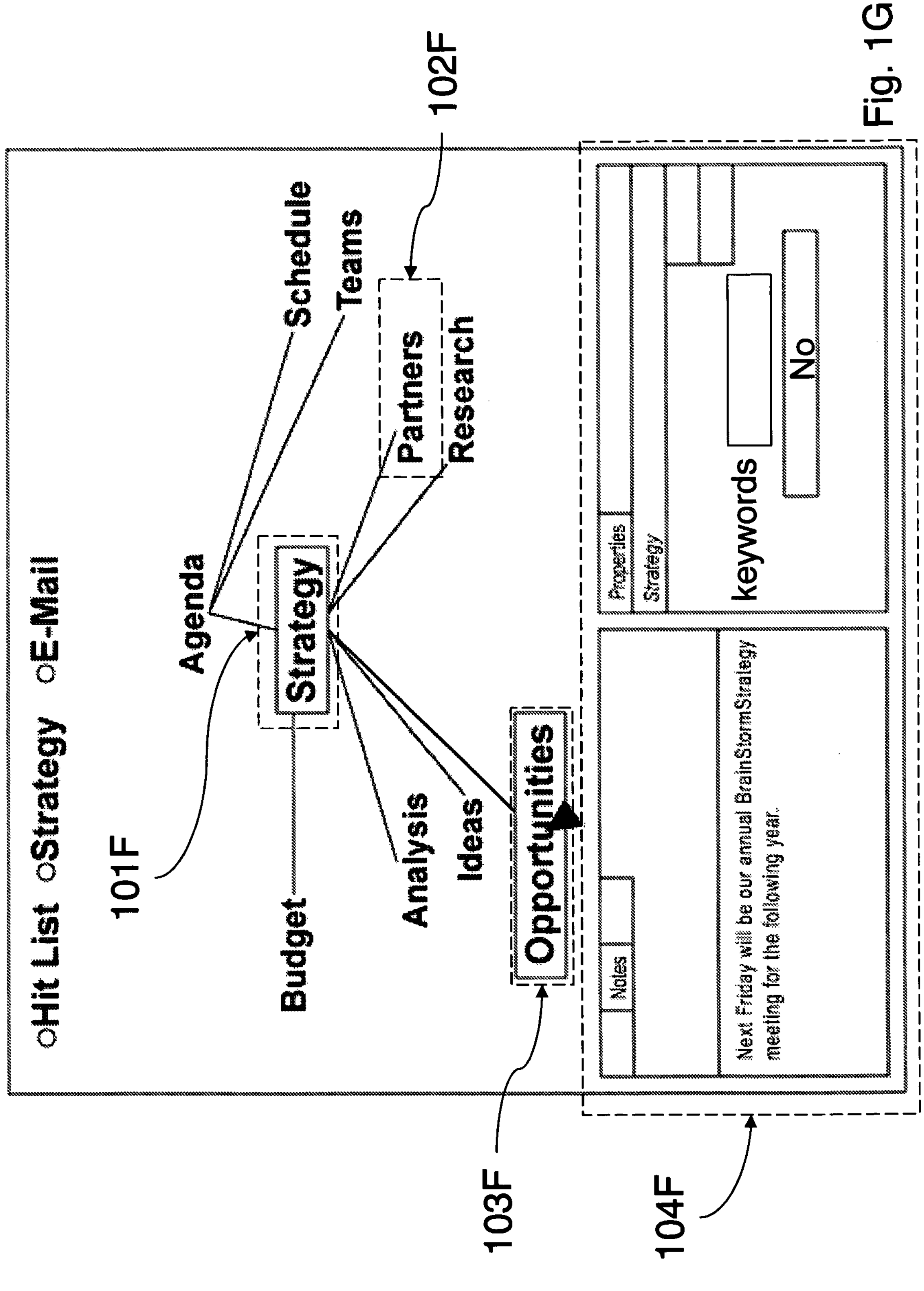
Figure 1H:
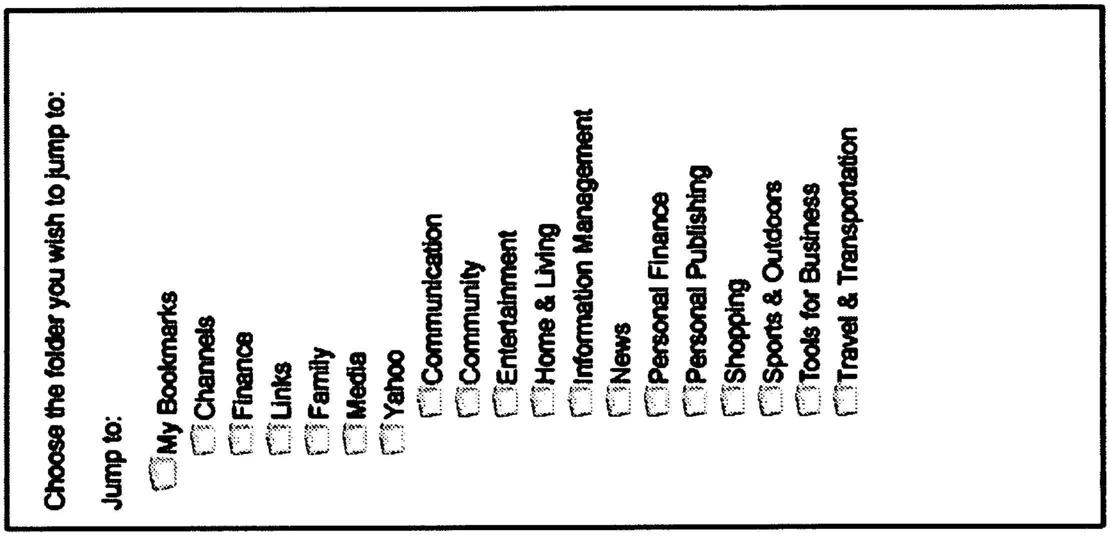

As has been previously described, there are at least five commonly known platforms used in the prior art to store and retrieve information. Each platform has its strengths in meeting certain basic needs of storing and retrieving information. In order for us to accomplish our objectives, there are ten basic needs. A comparison chart of how each platform meets these needs is shown in FIG. 44. It shows that each platform meets part of these needs but none of them provides all the needs. One of the invention's features is to provide a method that integrates the beneficial features of these platforms in order to provide the user an integrative, personalized, and perspective view of the information.

The present invention provides solutions to the problems currently existing in the integration of human motives and digital content, and to the problems currently existing in storing and retrieving the motives and digital content. The present inventor has made the following observations in arriving at various features of the subject invention. There are at least ten basic requirements so the problems can be addressed. While each platform has its strength in some area, none of them meets all these requirements. For instance, conventional databases organize data by rigid small sets of parameters. Data that does not fit into these sets of parameters cannot be organized by a conventional database. Folder structures or tree structures follow a rigid hierarchy. Data that is interrelated often needs to be viewed with different hierarchy based on the circumstance.

On the other hand, human process and retain information often by relationships and correlations. This nature does not fit well into a rigid, small set of parameters, neither to a fix perspective of hierarchy structure. Therefore, humans often have difficulties storing and retrieving information in conventional databases or folder/tree structure. Moreover, many times the data to be stored is not in a form that fits any of the existing databases, thereby leaving much information stored on the computer or notebooks in an unstructured manner, which makes it even more difficult to be retrieved later. Humans, on the other hand, can easily handle such unstructured data when reminded by the relationships and correlations corresponding to the data. To process unstructured data, human may turn to the assistance of search engines. It relies on human feeding of proper keywords. This scheme only works when the information is specific and unique. The issue is human needs to be reminded by related or correlated terms in order to generate proper keywords. Moreover, many of the information do not contain the keywords of human motives or human impression. Further more, human motives and digital content forms large crosslink data structure that is too complex to be described by a handful of loose keywords.

In view of the above, the following further observations are made:

Human motives and digital content forms a close feedback loop. Motives affect information acquisition, storing, and retrieving while the outcomes of processing the information can alter the course of human motives. This feedback relationship makes motives and the collection of digital content fast evolving and difficult to predict.

In terms of retrieving information, the better the information is organized, the less searching is needed to retrieve it; searching does address the need of integrating human motives and personal perspectives of digital content.

In terms of integrating digital content and motives, the scheme needs to be flexible to reflect fast evolution of motives and digital content collection;

In terms of understanding the personal relevancy of information content of the data, human intelligence is superior to machine intelligence; and, When the relationships among related pieces of digital content and motives are in place, the overall picture conveyed by the various pieces becomes visible, much like an assembled jigsaw puzzle.

The present invention utilizes these observations to provide an improved method and system for storage, retrieval and integration of digital content and human motives which store in different information platforms. In particular, the present invention takes the view that the machine needs to be optimized to increase human convenience and efficiency, rather than convert humans to adopt the structure of the machine, as is done conventionally in the prior art.

The present invention is operational with numerous general purpose or special purpose computing system environments or configurations. Examples of well known computing systems, environments, and/or configurations that may be suitable for use with the present invention include, but are not limited to, personal computers (PC's), server computers, mini/main frame computers, hand-held personal digital assistants (PDA's) or laptop devices, smart mobile phones, multiprocessor systems, microprocessor-based systems, set top boxes, programmable consumer electronics, network PCs, minicomputers, mainframe computers, distributed computing environments that include any of the above systems or devices, and the like. Additionally, the present invention allows for simultaneous retrieval of information which is stored in different locations, different platforms, different forms and different formats, e.g., database records, document, web pages, audio, video, graphic/picture, photo, folders, emails, instant messages, machine codes or scripts, application specific files, or combination of thereof.

According to one embodiment of the invention, a crosslink data structure, crosslink database, and systems and methods to interact with the crosslink database, are provided. The meanings for each information content (such as files, e.g., text, images, audio/video files, books, emails, photos, music, web contents, resumes, database records, web merchandise, etc.) are perceived and described by a set of topics. Additional topics represents human motives can also be included in the topic set when adequate. These topics and the links to the information content are interrelated in the crosslink database environment. The user may interact with the crosslink database to inquire about the relationship of a member (topics or information content) or multiple members. The meanings (of digital content and motives) and related topics may be presented to the user so that the user can focus, expand, or migrate from the original scope of the inquiry. The meanings and topics may be ranked to reflect the importance and urgency. The crosslink database engine may present a quick glance or detailed listings of requested information for the user to select and gain access to the information of interest. This and other embodiments of the present invention provide the dynamic perspective view of information based on what is inquired and presentation of a big picture analogous to different pieces of information (digital content and human motives) assembled together like a puzzle, regardless of structured or unstructured nature of the information.

For a better understanding of the descriptions of various embodiments disclosed herein, the following convention is followed.

Keyword: the term "keyword" refers to individual words that have been used to assemble a topic. In the above example of a picture of Melody at Lake Tahoe, related keywords may be "picture," "Melody," "Lake," "Tahoe," etc.

Topic (member): the term "topic" refers to a collection of keywords that together gives a specific meaning. For example, consider the keywords "ice," "cream," "skate," and "rink." These keywords can be used to form the topics "ice cream," "ice skate," and "ice rink," etc. A topic may also consist of a single keyword. For instance, the "ice" topic may give meaning of the solid form of water. In contrast to the "ice" keyword, its meaning is not specific depending on how it constitutes with other keywords.

Content Member: the term "content member" refers to a description and a link or a pointer (application function call, database record, URL, hyperlink or file path, etc.) to digital content such as but not limited to a record in database, a document, a web page, an audio file, a video file, emails, instant message, a graphic/picture file, a photo file, a folder, a machine code or script file (for instance, in Window OS carries exe, dll, bat, cmd, script files, etc.), an application specific file (Microsoft word, setup file, programming tool setup file, etc), or combination of thereof.

Context: the term "Context" refers to a collection of topics, content members, other Contexts or the combination thereof. A context is analogous to a bundle of topics/content members that each tie by a thread (connection) to a knot (connecting node). A Context consists of only one connecting node and at least two topics, content members, other Contexts or the combination thereof.

Context connecting Node (member): the term "Context connecting node" is used to refer to the single member of a knot that ties rest of the members in the Context together. Since each Context has only one connecting node, the ID of the Connecting node is used to represent the Context. The connection node and connections are not visible to the user.

Topic connecting node (member): A topic is a bundle of keywords tie together by a connection member (thread) to the topic connecting node (the knot). Each connection to the keyword is numbered to determine the word sequence in the topic.

Linking Member: the term "linking member" refers to the connection (thread) that ties various keywords, topics, content members etc. to a topic or a Context connecting node. It is not visible to the user.

Inquiry: Inquire about the Contexts that contain the topics/content members of being inquired, and inquire about the related topics and content members in these qualified Contexts.

The description will now proceed to illustrate the structure and construction of an embodiment of the invention using the convention noted above. We begin by describing the various "building blocks" and will then show how these building blocks are used to construct various embodiments of the invention. FIG. 2A illustrates an example of a crosslink data structure section according to one embodiment of the invention. As shown in FIG. 2A, a connecting node N1 ties together two elements A1 and A2 by linking members 20*a* and 20*b* to form a bundle. The elements A1 and A2 are differentiable from the connecting node N1. Elements A1 and A2 are related because of this tie. To find out the related elements of the element A2, it first traces from A1 to the connecting node N1 via linking member 20*a*, and then from the connecting node N1 to any other connecting elements, in this case, to the element A2 via linking member 20*b*.

Elements A1 and A2 may be keywords, in which case the linkage forms a topic. On the other hand, elements A1 and A2 may be topics, in which case the linkage forms a Context. In the case of a Context, elements A1 and A2 may be topics, content members, other Contexts and the combination thereof, as will be explained further below. According to a feature of the present invention, when the elements, such as A1 and A2, are content members, they may be of different data types. For example, A1 may be an email belonging to an email database and A2 may be the link to a document file stored in a document server. Thus, data of different types may be interrelated in the crosslink database structure of the present invention. With the use of a network or wireless connection, the elements may even reside on different computers or servers, and still be retrievable using the embodiments of the invention.

Figure 2B:
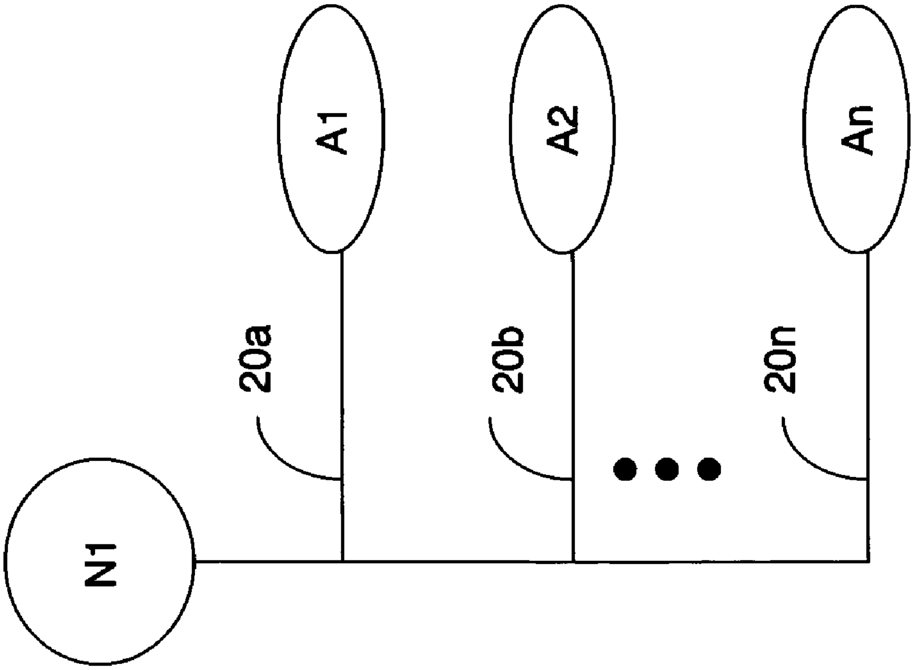
FIGS. 2-7 illustrate various building blocks of the crosslink data structures according to various embodiments of the present invention.
Figure 2A:
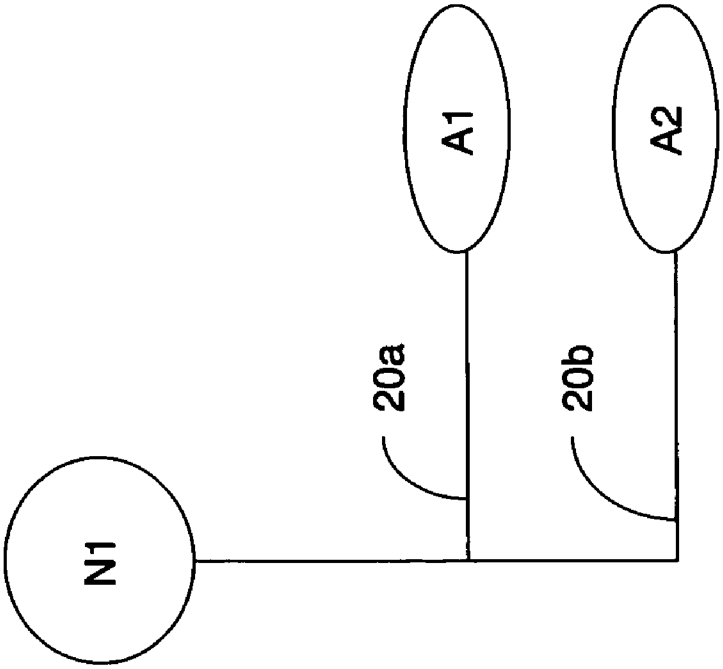

It should be noted that an infinite number of additional elements, An, may be added at various levels and connected to the connecting node N1 via links, as illustrated in FIG. 2B. On the other hand, one or more elements may be removed from the bundle by merely removing the respective linking member between the elements and the connecting node. Since the removal of an element from a bundle does not remove the element itself from the database, the removal of an element from a bundle does not interfere with the relationship between other existing elements and the connecting node.

Figure 3:
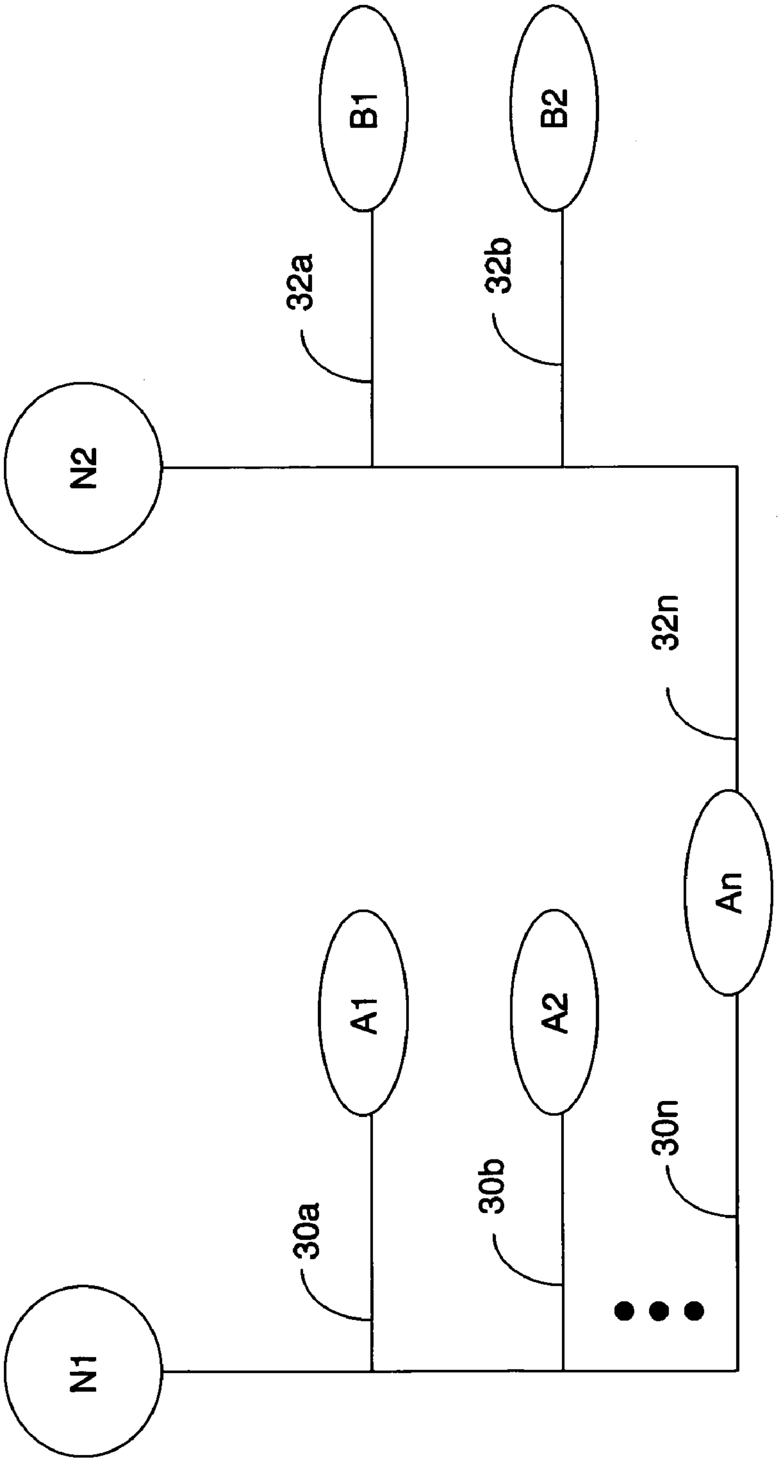

According to an embodiment of the present invention, two different bundles may be interrelated. FIG. 3 illustrates an example where element An is a member of both connecting nodes N1 and N2. Although elements A1 and A2 are not related to elements B1, and B2, all of the elements are related to An. Start from element An by first tracing to the connecting nodes N1 via linking members 30*n* and 32*n*. From node N1 elements A1 and A2 can be found via linking members 30*a* and 30*b*, and from node N2 elements B1 and B2 can be found via linking members 32*a* and 32*b*.

Figure 4:
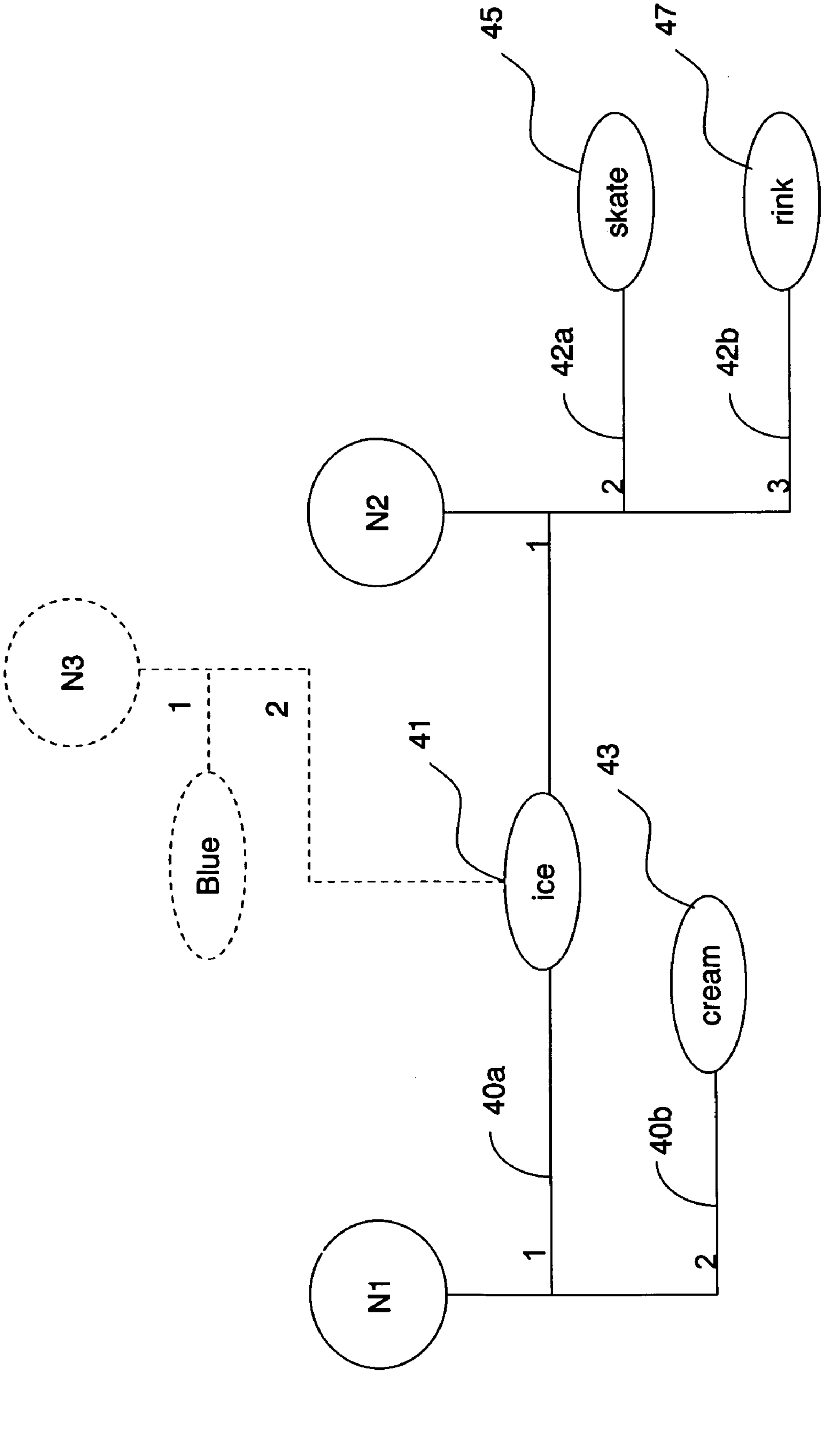

FIG. 4 illustrates an example of how keywords may be cross-linked to form topics using the linking members and topic connecting nodes. For example, topic "ice cream" can be form using topic connecting node N1 to tie keywords "ice" and "cream" together via linking members 40*a* and 40*b*. Note that the order is determined by the hierarchy associated with each linking member. Here linking member 40*a* is designated as hierarchy level 1, while linking member 40*b* is designated as hierarchy level 2. On the other hand, using the connecting node N2 one may generate topic "ice skate rink," by following the linking members at the appropriate hierarchy. Note that in this particular example the keyword "ice" is cross-linked to both connecting nodes N1 and N2 at the same hierarchical level, although this is not mandatory. For example, if one wishes to generate a third topic "blue ice," one may use a linking member to link the keyword "ice" to a third connecting node, but at a hierarchical level lower than that of the keyword "blue," as shown by the broken line arrangement for node N3.

Figure 5:
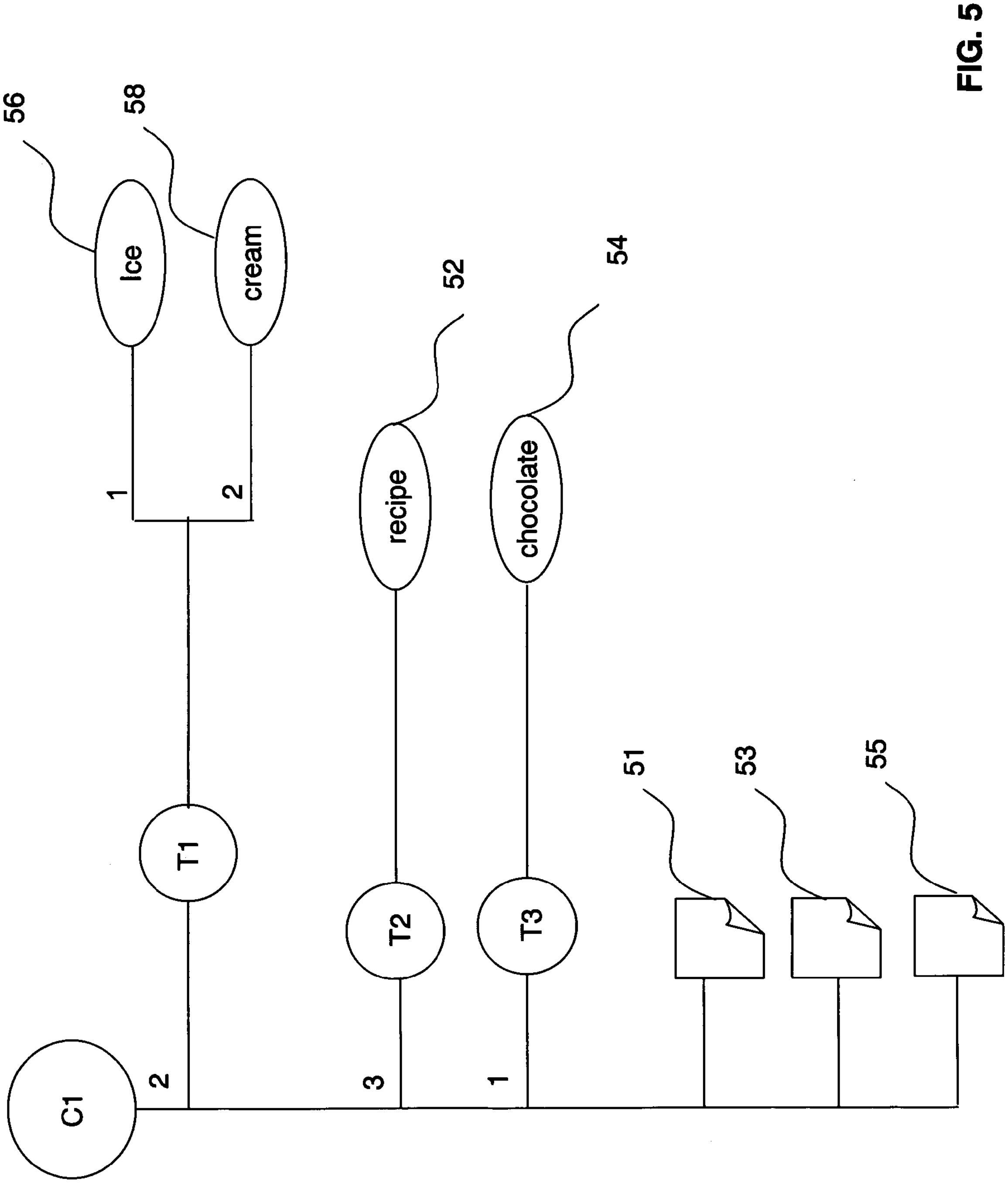

According to an embodiment of the invention, interrelated members (topics, content members, preexisting Contexts, and the combination thereof) may be cross-linked together into a single Context connecting node to form a Context. A simple example is shown in FIG. 5, where connecting node C1 relates to the topics "ice cream" (from topic connecting node T1), "recipe" and "chocolate" (from topic connecting nodes T2 and T3, each comprises of a single keyword) to form the meaning of "chocolate ice cream recipe" for the Context. From hereon the topic node will be omitted for simplicity.

Also illustrated in FIG. 5 are content members 51, 53, and 55, cross-linked to the node C1. Each of the content members may be of any type or format, for instance, a record in database, a document, a web page, an audio file, a video file, emails, instant message, a graphic/picture file, a photo file, a folder, a machine code or script file (for instance, in Window OS carries exe, dll, bat, cmd, script files, etc.), an application specific file (Microsoft word, setup file, programming tool setup file, etc), or combination of thereof. When the user reaches Context node N1, the user has immediate access to content members 51, 53 and 55. The Content members 51, 53 and 55 have the commonality in that they are related to chocolate-ice cream-recipes.

The combination of topics within a Context provides more specific meaning than each individual topic or keyword by itself. A simple example is when linking topics of "capital" and "United States", the "capital" here means Washington D.C. Whereas, linking "capital" and "California" together, the "capital" means Sacramento instead. It is easy for human to draw context meaning of an individual topic based on other topics in the same Context, therefore, eliminate the needs for generating individual differentiable topic. Similarly, a name topic associate with different topics can mean different persons to the user. For instance, no need to specify "brother Sam" from "coworker Sam" if the user happens to address two "Sam" whom he knows in the crosslink database.

Figure 6:
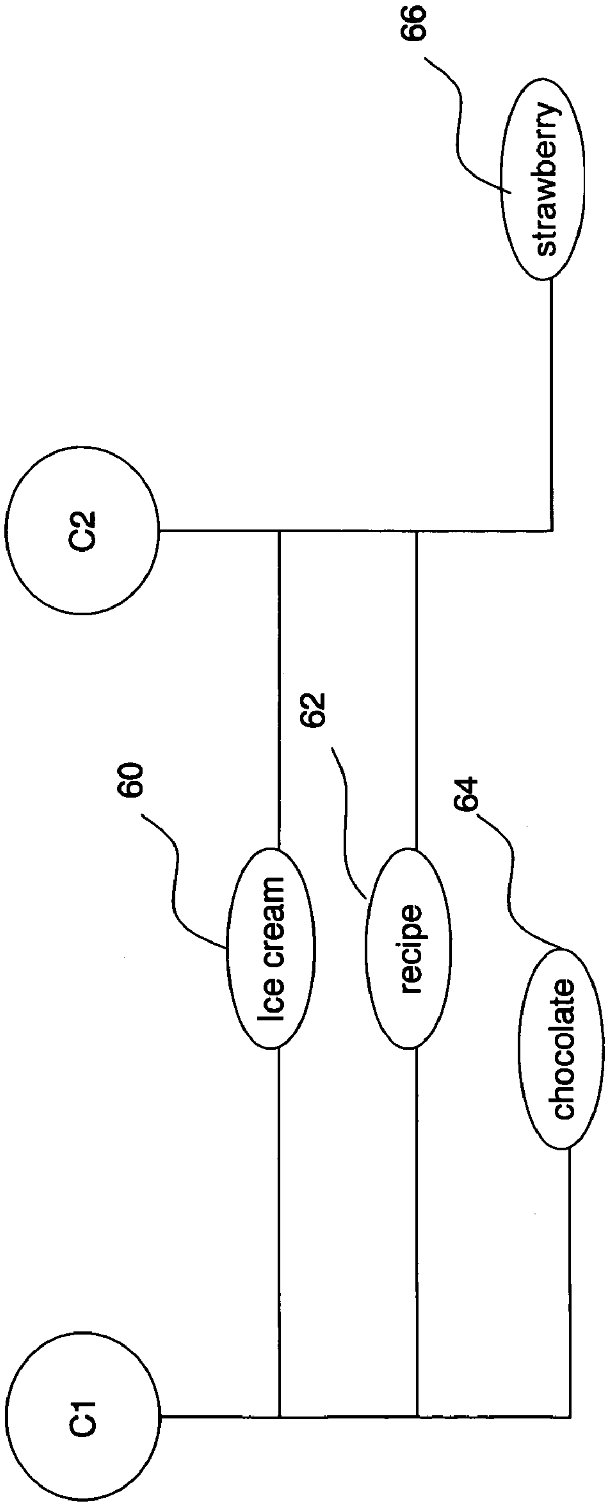

On the other hand, there are occasions where a topic may relate, and be cross-linked to, two different Contexts. Such an example is provided in FIG. 6. Here the topics "ice cream" (60) and "recipe" (62) are linked to Context C1 and to Context C2. Context C1 forms chocolate ice cream recipe, while Context C2 forms strawberry ice cream recipe. If the user inquires about "ice cream" and "recipe", both Context C1 and C2 are qualified, and since "ice cream" 60 and "recipe" 62 are already in the inquiry, they may be omitted from the display and the result of this inquiry can be simply "chocolate" 64 and "strawberry" 66. Thus, the differences between the two Contexts C1 and C2 are highlighted offering quick selection of "chocolate" or "strawberry" ice cream recipe to users.

According to another embodiment of the present invention, broader topics (with ranking) may be automatically suggested to the users in narrowing the search. The number of Contexts related to each topic can be used to weight the importance of each topic. From the example shown in FIG. 6, both "ice cream" 60 and "recipe" 62 are members of two Contexts, while "strawberry" 66 and "chocolate" 64 are members of only one Context each. When the user inquires about the topic "ice cream", the qualified members are "recipe" 62, "strawberry" 66, and "chocolate" 64. Since in this case, "recipe" 62 is a member of two Contexts, it is presented as a broader term than "strawberry" and "chocolate". On the other hand, when the user inquires about "chocolate", "recipe" and "ice cream" are among the qualified members. Either of which is a broader topic in the user's database than "chocolate" since they can lead to the other set of Context consists of "strawberry"–"ice cream"–"recipe".

Figure 7:
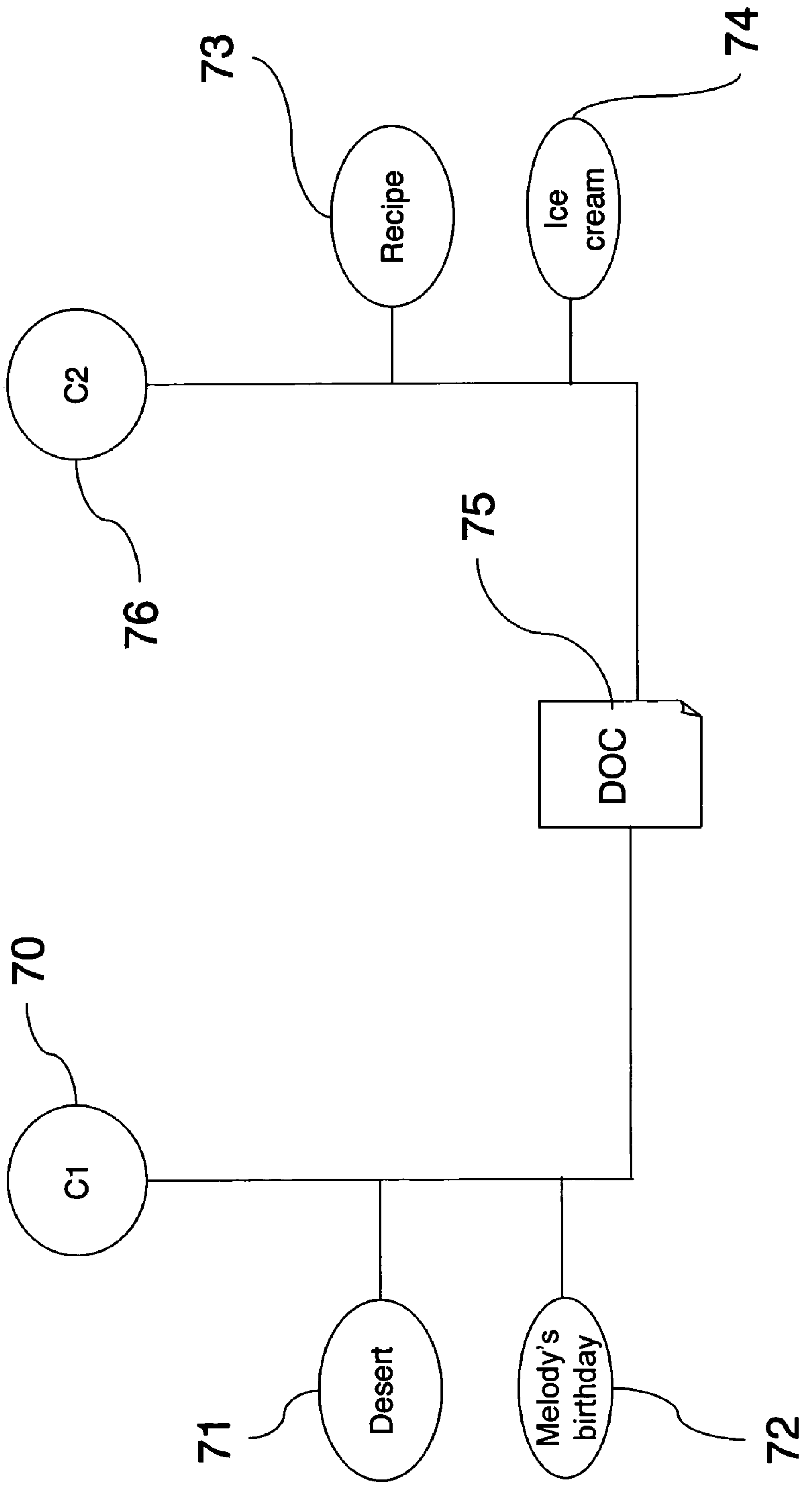

A further feature of the inventive crosslink data structure is to enable to relate a content member to be personalized, organized and retrieved from different perspectives using the combination of topics and Contexts. Consider the following example of a mother creating a document to organize a birthday party to her daughter Melody. The document includes an ice-cream recipe. Under the prior art folder-type system, a decision needs to be made where to save this file, e.g., under folder relating to Melody birthday, under a folder relating to recipes, under a folder relating to deserts, etc. On the other hand, using the inventive crosslink method, no such decision needs to be made, and the document can be reached using any of the mentioned parameters. This is illustrated in FIG. 7. Notably, the example of FIG. 7 depicts two connecting nodes, C1 and C2. Connecting node C1 70 is linked to topics "Melody's birthday" 72 and "Desert" 71 while connecting node C2 76 is linked to topics, "ice cream" 74 and "recipe" 73. The file DOC 75 is linked to both Contexts connecting nodes C1 and C2. Consequently, file DOC can be reached using any of the relevant topics. For example, if at a latter date the user would like to find this file, but only remembers that it was created in preparation for Melody's birthday. By typing the keyword "Birthday" the system would show a list of topics that are related to "Birthday", within which the user will identify the topic "Melody's Birthday" and trace to node C1, and hence to topic "desert" and to file DOC. On the other hand, if the user only remembers that the document contains recipes, the user may enter the topic "recipe," and the system would trace to node C2 thence to topic "ice cream" and to file DOC. Note that the file DOC may not contain text string about Melody's birthday, whereas Context of C1 is constructed to include "Melody's Birthday." The Context reflects a possible user's motive for preparing a desert in Melody's birthday party.

As can be understood, the system is structured to support human's natural way of organizing and retrieving information via simple impressions, via the ability to draw context meaning from relation and correlation, and via the ability to narrow, migrate, or expand the scope of interests by relation and correlation. For the example in FIG. 7, the user has a simple impression about the document DOC that it is useful for preparing "desert" for "Melody's birthday" party, that it is an "ice cream" "recipe" type of desert, and the user will be able to retrieve the document when reminded by these simple impressions and by the user's ability to obtain the context of each simple impression based on their relationships with other impressions. So, when the user creates the document and saves it, the user simply types in terms that the user associates with the document. Here, for example, in saving the document the mother can type in either "Melody," "recipe," "birthday," or "ice cream," etc. The user may later retrieve this document from a simple expression of "Melody" or "ice cream". The user may be reminded by a complete set of meanings like "Melody birthday"–"desert" or "ice cream"–"recipe" that points to the document. The user may also be reminded with other related topics and meaning sets, for instance, from "ice cream" to "recipe;" the user can be more specific (add topics in the inquiry), for instance, from "ice cream" "recipe" to "chocolate" flavor; the user can migrate (change to different topics), for instance, from "ice cream" to "recipe" then to "cheese cake"; the user can expand (change to bigger topics) in the scope of inquiry, for instance, from "ice cream" to "desert" that include "ice cream" and "cheese cake". At any time in the future, the user may add or remove association to reflect changes in the document or its relevancy. For instance, adding "to-do" to the Context of "Melody birthday"–"desert" helps the user to recall this motive and remove it from the Context when the party is over.

Another way to conceptualize this embodiment of the invention is as an "on the fly" decision tree. That is, as is well known, various systems use decision trees in order to help the user reach the desired information. This is particularly true in web-based stores. For example, a conventional decision tree for the example provided in FIG. 6 may be of a first drop-down menu letting the user start by choosing the keyword "recipe." Then another drop-down menu will allow the user to select among various categories of recipes, one of which would be "ice cream." Finally a third drop down menu will enable the user to select among various flavors, among which would be chocolate and strawberry. On the other hand, using the inventive method, the user may begin from any place, using any term, and a decision tree would be built "on the fly" as the user progresses down the selection tree. Taking the example of FIG. 6, if the user begins with "recipe," the linking members will trace to nodes C1 and C2, and will offer the user the terms "ice cream," "chocolate," and "strawberry." If the user begins with "ice cream," again the linking members will trace to C1 and C2 to provide "recipe," "chocolate," and "strawberry." On the other hand, if the user starts with chocolate, the linking member will trace only to C1 and provide "ice cream," and "recipe." As can be seen, this embodiment provides the user with faster access to the information. That is, if the user starts with "ice cream" or "recipe," it is not clear which flavor the user is looking for, and both are provided. On the other hand, if the user starts from chocolate—a narrower selection—the system does not need to show strawberry.

As can be understood, in various implementation the system is built in stages by the user simply indicating topics the user associates with various digital content (e.g., a file, a web page, email, etc.). The user does not need to articulate a data structure to for future information that could evolve unpredictably, or re-organize the data structure to adopt new digital content at hand. So, each time the user saves a new digital content, the user is asked to associate specific, personalized meanings/impression (using topic sets) with that digital content. This is of course natural to people and very easy to do, while it is an immense task for a machine to do. Consequently, this system utilizes the strength of the human brain by obtaining the associations, while at the same time utilizing the strength of the machine by performing all of the complex crosslink relationships and construction behind the scene so that the user interacts with the machine in a natural way. In this manner, when the user looks for a file in the future, the user needs merely to type any of the meanings or impression words the user associates with that file, and the system will use the cross-linking web to direct the user to the document, even if the user forgot the name of the document or the folder in which it was saved. Of course, the user may still use the conventional folder filing system. That is, the inventive system need not replace the conventional folder filing system, but may be complementary to it. This way, if the user knows where the file is, the user may go there following a folder tree. However, if the user knowing the file is residing in a complex folder tree hierarchy or forgot where it is, the user may more efficiently use the crosslink system to obtain the file. Additionally, as times passes various files may have their meaning to the user changed. Using the inventive system the user need not worry about moving the file to a different folder or creating/re-organizing the user's folder tree. Rather, the user simply needs to associate the file with new set of meanings (by modify, delete, or add topics). In this manner, the change is made without disrupting the remaining files and/or folders.

To further understand to power of the inventive crosslink system, consider the example of business management. Assume that a project ABC has numerous meeting minutes and action items that are stored in MS Word document and in paper notebook. The owners of these actions items are John and William. This project also related to customers' Xcorp and Ycorp requirements that are embedded in MS Outlook emails. ABC project is competing with a few competitors with their performance matrix published on several web pages. Under such circumstance in the prior art system, the pieces of the puzzle (above digital content and motives) are dispersed in the folders, emails, and web sites and the user does not have the entire picture at hand. On the other hand, since the inventive crosslink system can link any type of files at any format and integrate them with user's motives, if the user enters the same association topics for these files, they will all be linked and, regardless of where they will be saved, the user can reach all of them and see the entire picture. For example, the above individual information may be crosslink as follows:

1. The meeting minutes and action items may be associated with topics Project ABC-meeting minutes-date, and Project ABC-action items-John-William, respectively.
2. The two emails will be related to topics Project ABC-customer requirements-Xcorp and Project ABC-customer-requirements-Ycorp, respectively.
3. The web pages will be related to ABC project-competitors-performance matrix.

When the project manager inquires about project ABC, the meeting minutes, action items and owners, customers and requirements and competitive information (ranking topics and Contexts) are shown. When the project manager inquires about customer Xcorp, the requirements for this project as well as other related business matters with this customer would be shown. Moreover, before meeting or calling a customer, the manger can have a clear overall view of the business relationship besides project ABC by inquiring about this customer and removing project ABC from the inquiry. When inquiring about task owner John, this project actions and other workloads are shown. So the manger has a clear picture whether John is overloaded. When having a meeting with John, the manager can also follow up with other project that John is involved.

Returning to the above example of Melody's picture at Lake Tahoe. Assume that the trip was booked via an online service, such as Travelocity® and that a confirmation email has been received for the trip. Further assume that the bank statement showing the charges for this trip was downloaded in, e.g., and Excel format. Under the normal folder structure, the picture would most likely be saved somewhere in the "My Pictures" folder, the confirmation email would be retained in an email program, e.g., MS Outlook, and the Excel spreadsheet would be stored under some folder dedicated for financial matters. Under such prior art system, the pieces of the puzzle are dispersed in the folders and the user does not have the entire picture at hand. On the other hand, since the inventive cross-link system can link any type of files at any format, if the user enters the same association keywords for these files, they will all be linked and, regardless of where they will be saved, the user can reach all of them and see the entire picture. For example, if the keywords "lake" "Tahoe" "trip" are associated with these documents, once the user start enter any of these terms, i.e., any of "lake" "Tahoe" "trip," the linking members will lead to all three documents and the user will be presented with the pictures, the confirmation email, and the bank statement—all of which relate to the trip to Lake Tahoe.

In a similar manner the crosslink system may be used to construct on the fly decision tree for other databases. For example, merchandise websites may be constructed using the inventive crosslink system. Consider the car parts website discussed above. The site may use the rigid prior art system where the user is forced to follow the dropdown decision tree menu. On the other hand, the user may be given the choice of using the inventive crosslink system. Using this system the user may start from any keyword. For example, if the user looks for break pads, the user may start by typing break or break pads. The system will then use the crosslink relationship to generate a decision tree on the fly, leading the user to the correct break pads. For instance, possible related topics are car models, pad materials, brand names, pad model number, etc. While there are various advantages to using the inventive crosslink system for such websites, one can be illustrated using the above car parts example as follows. If a person wishes to buy several parts for the same car, then using the prior art dropdown menu may be adequate. However, imagine a person who would like to order several break pads for several different cars. Using the conventional system the user will have to follow the entire decision tree for each separate order. On the other hand, using the inventive system the user may start from break pads, and then leave the car selection for the last decision step. In this manner, for each order the user backs up only one single step, and does not have to go through the entire decision tree.

Another example, web site like www.nsf.gov contains diversified information that their web visitors can easily get lost. Most people will start with a keyword search. For instance, if you enter "SBA", it will return more than one hundred matches as that provided by Google search. The visitor needs to go through each links to find what they need. The site also provides fixed, pre-arranged categories. But these categories are unlikely to fit everybody's perspective. In case of when the inventive crosslink system is used, instead of blindly going through try-and-error of entering different keywords like a librarian, a on the fly decision tree will be given to the user based on their input if the inventive crosslink system is used.

Architecture Example—Connecting Keywords

Figures 8A, 8B, 8C:
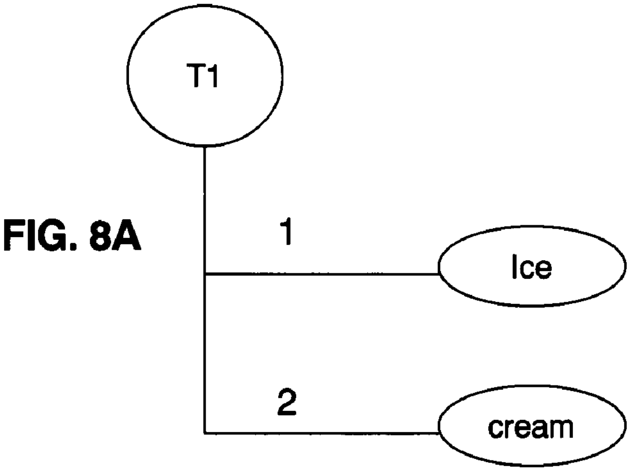
FIGS. 8A-8C illustrates a crosslink data structure architecture for topics according to an embodiment of the present invention.

Hereinafter, the architecture of the crosslink data structure will be discussed. First, an example of constructing a topic data structure is described with reference to FIG. 8A-8C. This example illustrates how the topic crosslink structure of FIG. 8A is implemented in conventional database format depicted in FIGS. 8B and 8C. The cross-linked structure of FIG. 8A has a connecting node with a universal ID "T1," connecting to keywords "ice" and "cream." As shown in FIGS. 8A-8C, the Topic Table comprises Primary Keys Ks, Kt, etc., Connecting Node ID's T1, T1, etc., Keyword ID's w1, w2, etc., and Sequence 1, 2, etc., data fields. The Keyword Table comprises Primary Keys Kn, Km, etc., Keyword ID's w1, w2, etc., and Keyword data fields. The Primary Key data fields are simply a running enumeration of the entry rows. The remaining fields will be explained with reference to the following example. The Node ID T1 is used to represent the topic "ice cream". When Note ID T1 is given to the crosslink database, a filter is applied on the Topic Table 8020 to select records with this Node ID. The outcome is records Ks and Kt, where Keyword ID w1 and w2 are retrieved with sequence 1 and 2, respectively. The Sequence filed shows that the keyword relating to Keyword ID w1 should be presented before the keyword associated with Keyword ID w2. By looking up from the Keyword Table 8030, these two Keyword IDs make up "ice cream."

This data structure allows topics to be interrelated by keywords. For instance, when the user enters a keyword "ice", topics "ice cream", "blue ice" and "ice skate rink" could be retrieved. How does it work? First, the keyword ID w1 for keyword "ice" is retrieved from the Keyword Table 8030. Then a filter is applied to the Topic Table 8020 to select any records containing the Keyword ID w1 in the Keyword ID field. From these records, a list of Node IDs is obtained. Here each node ID represents a topic that contains the keyword "ice". So after converting the node ID into topics, the user will see the outcome of "ice cream", "blue ice" and "ice skate rink", etc. This address the issue of keywords suggestion used in prior art system (for instance, Microsoft, Windows Explorer, visual Thesaurus, theBrain, Microsoft Outlook) where only topics matching the first entry word are suggested. As in previous example, "blue ice" topic will not be shown when their users inquire about "ice" in the prior art systems because ice is not the first entry word. Back to the invention system, if the user picks the Topic "ice cream", both Keyword IDs w1 and w2 are retrieved from the Keyword Table 8030. A filter is applied to the Topic Table 8020 to select records that contain both Keywords. In this case, the record with Node ID T1 is retrieved. Although in this example only two keywords are involved, the same mechanism is applicable for topics containing any number of keywords.

Figure 9:
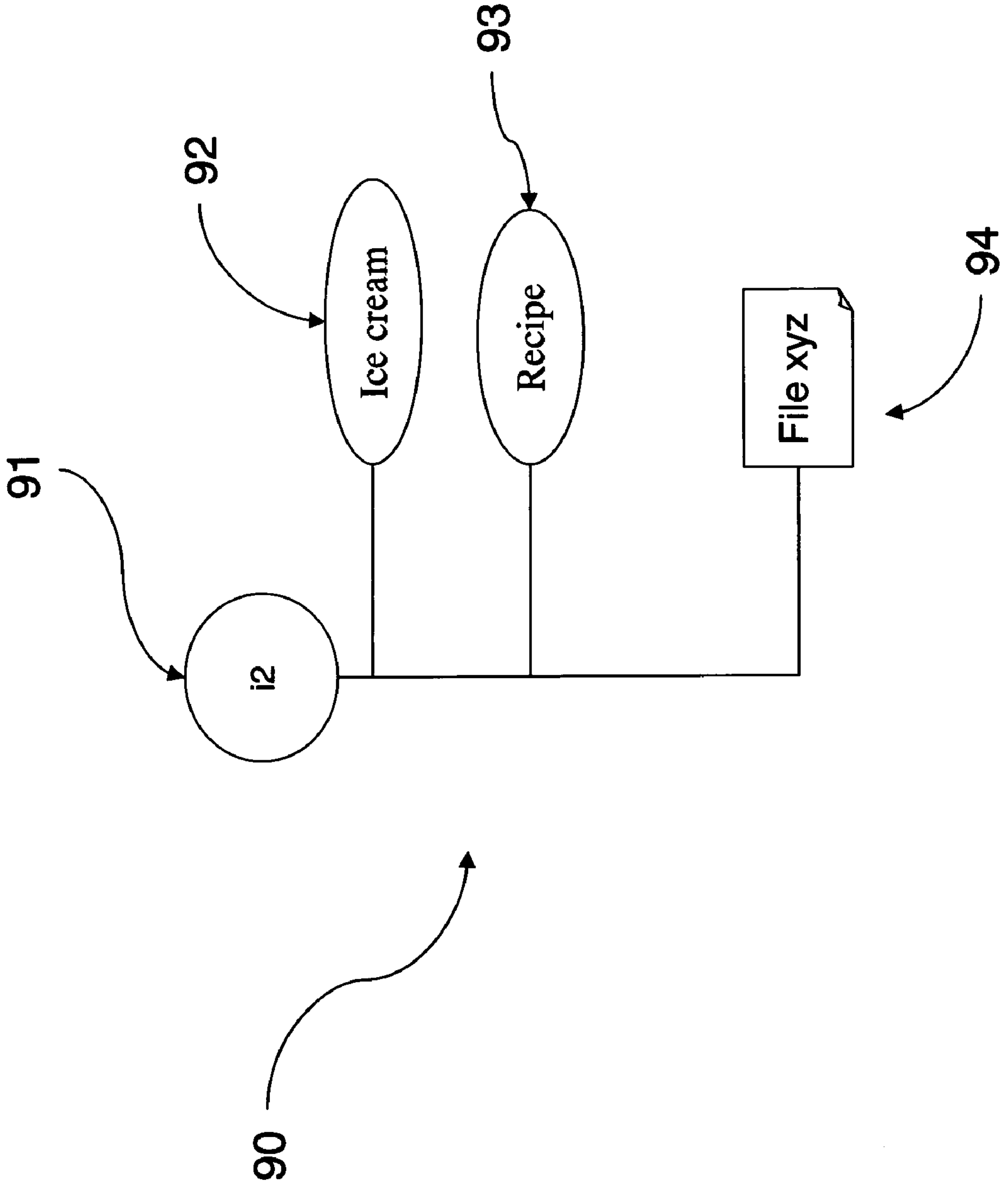
FIG. 9 illustrates an example of a Context data structure.
Figure 10A:
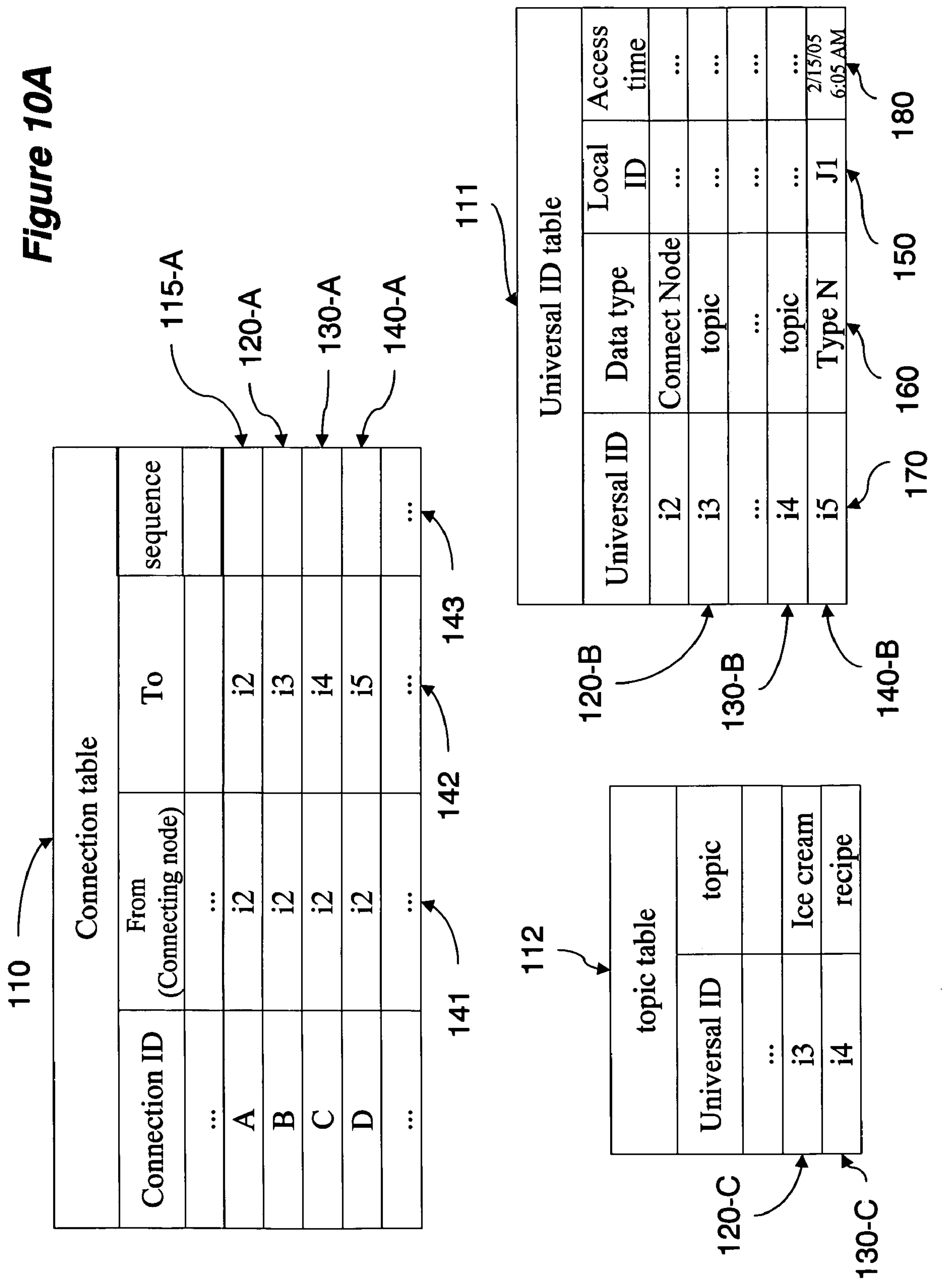
FIGS. 10A-10B illustrate an example of crosslink database architecture for Contexts according to an embodiment of the present invention.

Next, an example of implementing a crosslink Context data structure is described, using an example shown in FIG. 9. Context 90 contains a connecting node i2 (91), two topics "ice cream" (92) and "recipe" (93), and a content member, File XYZ (94). Note that here "recipe" is illustrated as a topic having one word. The illustrated relationship among these elements is established using a conventional database as depicted in FIG. 10A. The "Connection Table" (110) contains the fields "from" and "to". In this case, three records store the connection between i2 and i3 (120-A), i2 and i4 (130-A), and i2 and i5 (140-A), where i2, i3, i4, and i5 are the universal IDs, and their data type for these IDs can be found in the "Universal ID Table" (111). The record 115-A is the connection between i2 to itself. It does not carry any logical meaning but it helps to reduce programming complexity. Records 120-B and 130-B indicate that both i3 and i4 are of "topic" type and their content can be found in "topic table" (112, see topic data structure for details). ID values i3 and i4 leads to records 120-C and 130-C in table 112: topics "ice cream" and "recipe" are related to connecting node i2. Note that both i3 and i4 are the topic connecting nodes; the process of involving table 8020 (FIG. 8B) and 8030 (FIG. 8C) to extract the topic for each node in Table 112 has been previously discussed. The free mixing of different data types and formats is also depicted by the presence of a member 140-A. The record 140-A contains the connection between i2 and i5. By looking up the "Universal ID Table" (111) record 140-B, i5 is recognized as the Type N, local ID J1 (field 150) from external servers.

Figure 10B:
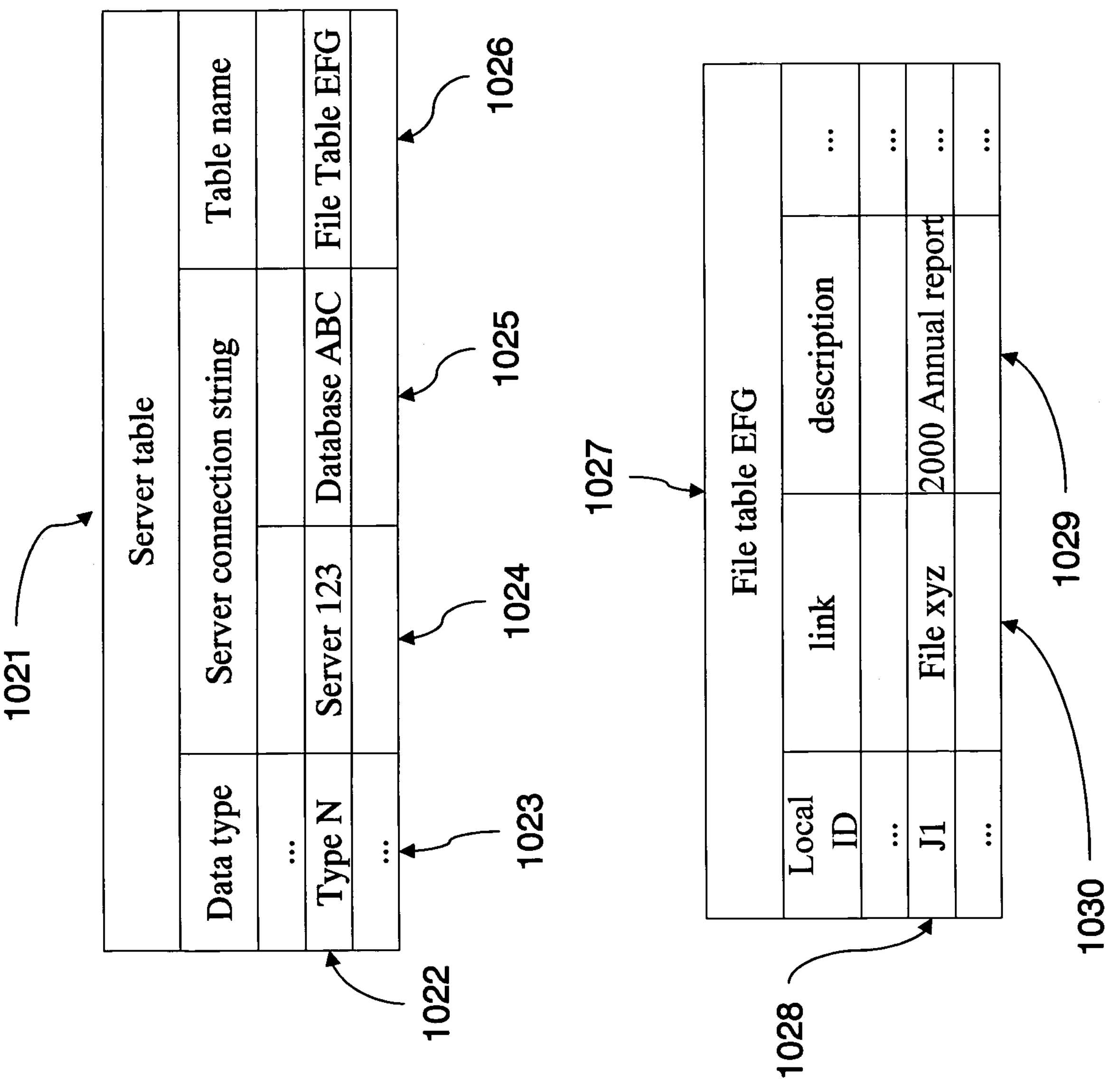

To obtain the file linking by i5 the system needs to connect to the file server or database server (for instance, using XML, SQL, etc.) by looking up the "Server Table" 1021 (FIG. 10B). This table contains fields of "data type" (1023), "server" (1024), "database name" (1025), and "table name" (1026). According to file type of "File Table N", record 1022 provides detailed information regarding how to retrieve universal ID "i5" (140-B): it is a record of "Table EFG" in "Database ABC" that resides in "Server 123." The system also based on a pre-arrange configuration that allows the client side to inquire for "File Table EFG," The "server 123" looks up "Table EFG" (1027), local ID "J1" (record 1028) and returns "File xyz" file name, and its associate parameters (description field 1029, access date, creation date, byte size, application-type, author, etc.). It also responds to other database inquiry that include deliver the content of File xyz over the Internet/local network if the user chose to open the content. Note that although only one file data type is used in this example, the same mechanism applies to multiple data types of various databases that reside in different servers or from application program interface (API, for files/folders from the operating system, emails from an email application tool, etc.), either on the user's local machine or over local computer network or the Internet. For instance, for a content member corresponding to a Microsoft word document stored in a local computer, the data stored in table 1021 may be local_host, (empty), (empty) in data fields 1024, 1025 and 1026, respectively. The full file path of the document will be stored in data field 1030 of table 1027. The user may need to go through the standard authentication and privilege check when access data from a server.

An advantageous feature of the inventive crosslink system is that Contexts (files and topics) can be transmitted between two crosslink databases over any electronic connection such as, for example, over the Internet using, e.g., HTML, XML, SQL, etc. Under the prior art, when one sends a file to another user over the Internet, only the file is transferred, and the receiver has no indication as to what the file relates to or what is its content. Additionally, it could take some effort for the receiving side to sort out the files when large a number of them are sent. For instance, some legal documents or business transactions and contracts can be quite complex. On the other hand, using the inventive system, the file is transferred together with the relationships the sender has assigned to it, i.e., together with the relevant crosslink elements. In this manner, when the receiver saves the file, these relationships, i.e., crosslink elements, are saved with the file and are activated immediately, to enable clear understanding of the meaning of the content in the file and enable easy retrieval of the file in future time. It is structured and flexible at the same time. Of course, prior to saving, and at any time thereafter, the receiver may modify the relationships assigned to the file to meet personal needs.

An example of transferring files together with relevant crosslink element, e.g., Contexts is shown in FIG. 11. The Context 130 contains 3 topic ("ice cream", "recipe", "cheese cake") and 3 content members. The members of this Context are enclosed between "<context>" and "</context>. The Context contains three topics 131, 132 and 133 and three content members 1341, 1342, 135. Members 1341 and 1342 need to be requested from the server\database\file table (134) and member 135 is from a file server. In case a file is located in sender's local hard drive, the sender's server name is always disclosed in the file path so that the file path is accessible by other machines. If a file is attached together with the Context file, the file path will be the file name itself. For instance, a tag of <file path="\ABC.txt"/> will be used to indicate the Context contains an attached file ABC.txt. When the Context is saved in the receiving side, the system will prompt the user where to save the attached files. The system will update the file path for where the attached file is saved.

The receiving system examines whether for each topic an identical or equivalent topic already exists in its own crosslink database. It uses "fuzzy text matching" (details discussed below) to prompt similar topics for the user to pick. If the user finds an identical or equivalent topic already exists in the receiving database, it assigns the equivalent topic and its corresponding universal ID (table 112, FIG. 10) to this topic. Otherwise, a new topic will be created in the receiving system. If the data type (database/server/table, webpage, emails, local files, etc.) of a content member already exists in the receiving side, it adopts the existing data type, otherwise, it creates a new data type in Table 1021. Moreover, judging from the corresponding data type and local ID or file path, hyperlink of a content information, it can determine whether this content information already exists in the receiving side. If it does, it adopts the corresponding universal ID. Otherwise, it creates a new record in table 111 similar to that of 140-B (FIG. 10A). The system also checks whether the topics set matches exactly with that of any existing Context in the receiving side. If it does, it notifies the user. The user may accept the Context as is; in this case the content members of the sent-Context will be merged into the existing Context (by creating corresponding linking members between these content members and the connecting node of existing Context in table 110). Alternatively the user may additional topics to differentiate the receiving Context from the existing Context. When a new Context is build, a new connecting node will be created in table 111 to tie all the members (topics and content members) together (again, by creating corresponding connections (linking members) between the connecting node and rest of the members in table 110).

The present invention uses "fuzzy text matching" to determine whether a text body contains text strings that are similar to a topic. Fuzzy string search has been described in numerous web sites that includes Inflection, equivalent meanings, soundex, Meta phone, common word endings (stemming), synonyms, accent stripping. These technologies have been commonly adopted in the industry to handle human misspelling and optical character recognition errors. Microsoft Indexing Service and Textolution of Vancouver, BC, Canada, provides packages that are ready to be integrated. Various other companies also make their technology available commercially. For instance, Zylab of Vienna, Va; API of Long Valley, N.J.; Executive Technologies, Inc., of Birmingham, Ala; Language Analysis Systems, Inc., of Herndon, Va; and Phonetic-Eye, of Tychyon Technologies of Thiruvanmiyur, Chennai, India.

Figure 12:
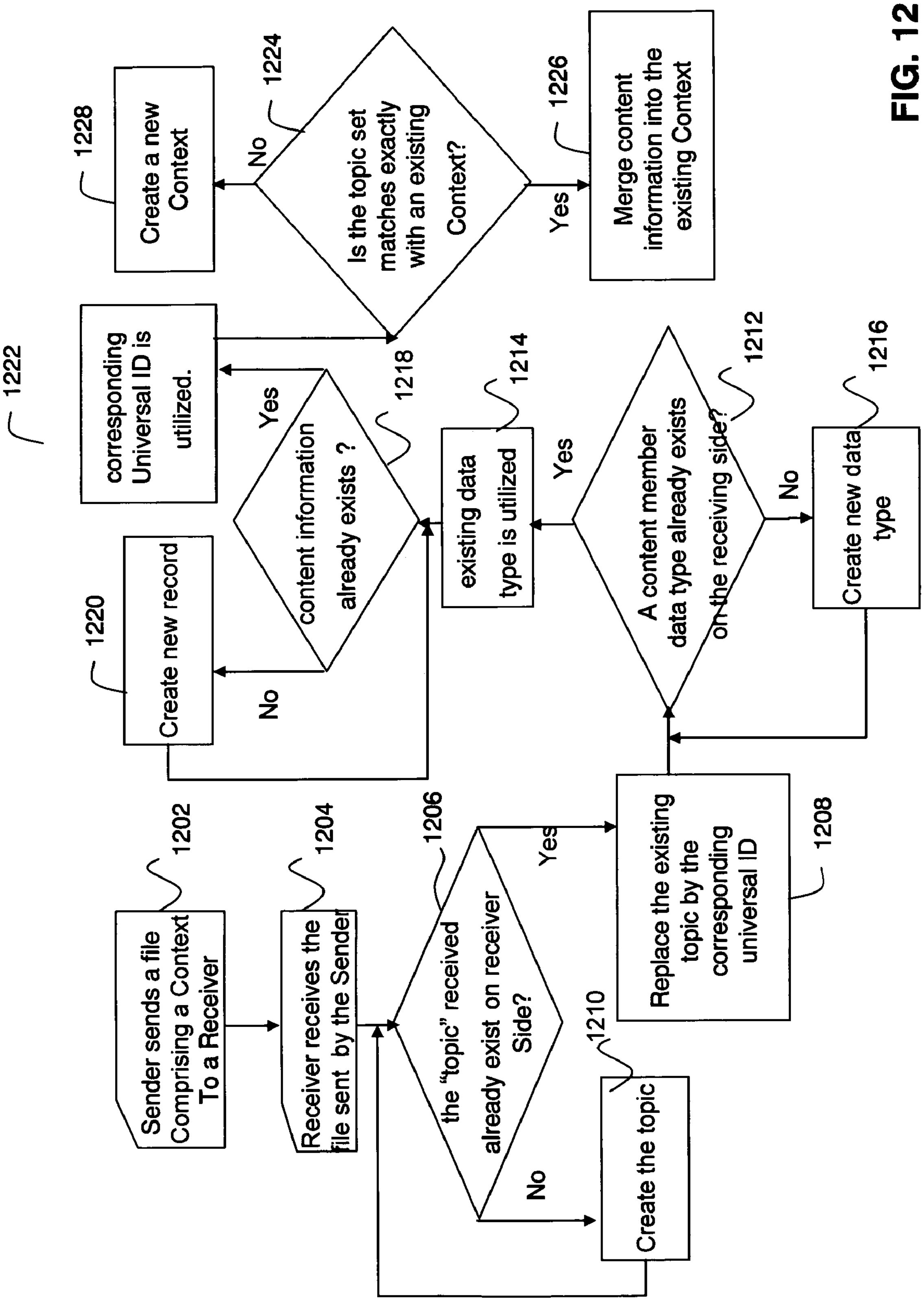
FIG. 12 illustrate a flow chart of transmission of a crosslink database according to an embodiment of the present invention.

An example of determining whether a text body contains at least one text string that is similar to a topic is discussed next; here the topic may consist of multiple words. When speed is a concern, soundex is a better approach. The drawback of using soundex may be receiving more irrelevant matches since scoring is not an option. The function CompareString-Fuzzy from the textolution.com package gives score on how similar two words are. The drawback of using this approach may be too slow for some applications To begin with, the least common word in the topic is selected as the first reference word. One example for determining the least common word is by selecting the lengthiest word. None relevant words like a, the, that etc. in the text body or topics are not considered for the comparison. Then one word in a time is extracted out from the text body and compared to the first reference word. If the similarity score is higher the minimum set point, a word in the text body has been found similar to the topic. In this case, the words in the vicinity of the first found word (called "vicinity word group") are extracted. One word in a time from this vicinity word group is compared to the $2^{nd}$ least common word in the topic. If a similarity is found, the same "vicinity word group" is compared to the third least common word. The vicinity word group needs to contain at least one similar word as every relevant word in the topic in ordered for the vicinity word group to contain text string similar to the topic. In this case, each similar word position in the text body is recorded and may be highlighted to capture the user's attention. The user may then review the highlight words and to agree or disagree with the suggestion. If the "vicinity word group" fails to meet this criteria, the "fuzzy text matching" engine moves on from the $1^{st}$ found word to the next relevant word, compare it to the least common word, and start the process all over again until it complete every word in the text body. An example is given below. The "vicinity word group" is extracted by starting from the position of the $1^{st}$ found word, including X number of relevant words from the left and X number of relevant words from the right. The X number may be a multiply of the total relevant words in the topic. Consider a topic "Amazon book sales" and a multiple factor (X) of 1, assuming the $1^{st}$ found word of "Amazon" is discovered and the vicinity word group of "online Book seller Amazon fall sales begins" is extracted. This word group will be determined to contain the similar word string as the topic since the word group contains "book" and "sales." If the topic is changed to "Amozon books sale," the result is unchanged. Since "Amonzon" and "Amazon", "books" and "book", "sales" and "sale" are similar. On the other hand, if the topic is "Amazon book discount," the word group contains no similar word string because of missing the word "discount." It is obvious for those skilled in the art that various modifications and variations can be made to the structure of the present invention, for instance, other mechanism (Inflection, equivalent meanings, soundex, Meta phone, etc. as those listed above) may replace the "CompareStringFuzzy" function for words comparison, without departing from the scope or spirit of the invention FIG. 12 illustrates a flow chart according to an embodiment of the present invention, for transmitting crosslink members between two crosslink databases over a network. Referring to FIG. 12, first, at step 1202, a sender may send a file comprising a Context of information containing to 3 topics, for example, "ice cream", "recipe" and "cheese cake", and 3 corresponding content members, over the internet to a receiver, and the receiver receives the file (step 1204). At step 1206, the receiving side examines whether the topics received already exist. If yes, the process proceeds to step 1208 to replace the existing topics with the corresponding universal ID. Otherwise, the process proceeds to step 1210 to create the topics. Next, at step 1212, the receiving side determines whether database/server/table (including applications from local computer) of a content member exists. If yes, the process proceeds to step 1214 to utilize the existing data type. Otherwise, the process proceeds to step 1216 to create a new data type in the Table. Next, at step 1218, whether or not this content member already exists in the receiving side is determined by judging from the corresponding "/server/database/table: local ID" or file path, hyperlink, etc. of a content information. If yes, the process proceeds to step 1220 to utilize the corresponding universal ID. Otherwise, the process proceeds to step 1222 to create a new record. Next, at step 1224, the system checks whether the combination of the topic members matches exactly with an existing Context in the receiving side. If yes, the content members of the sent Context of information will be merged into the existing Context (step 1226) (by creating corresponding connections between these content members and the connecting node). Otherwise, the process proceeds to step 1228 to create a new connecting node to tie all the members of this new Context together.

User Interface—Example I

Figure 13A:
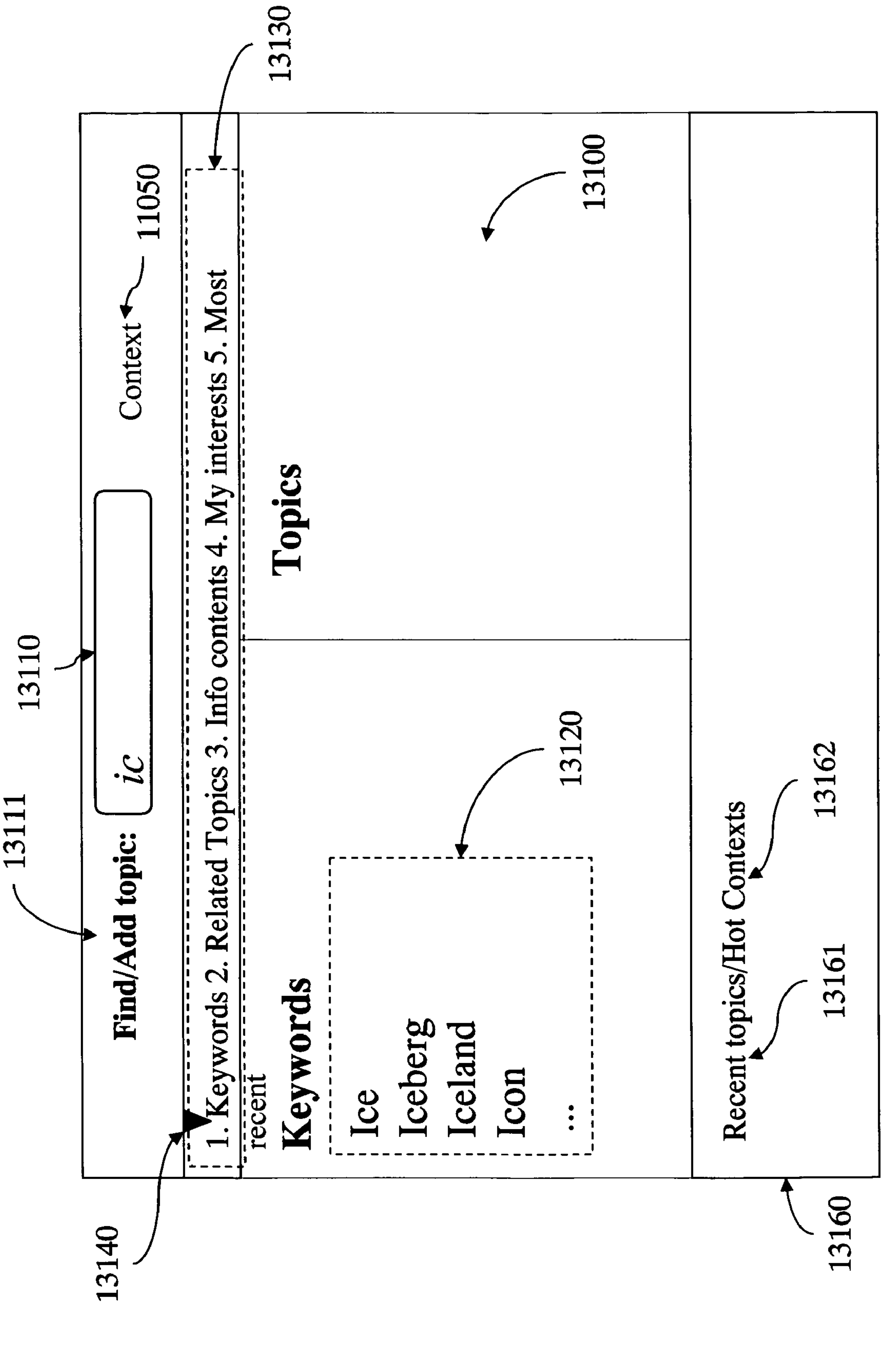
FIGS. 13A-13D illustrate a user interface for organizing and retrieving information from the crosslink database according to an embodiment of the present invention.
Figure 13B:
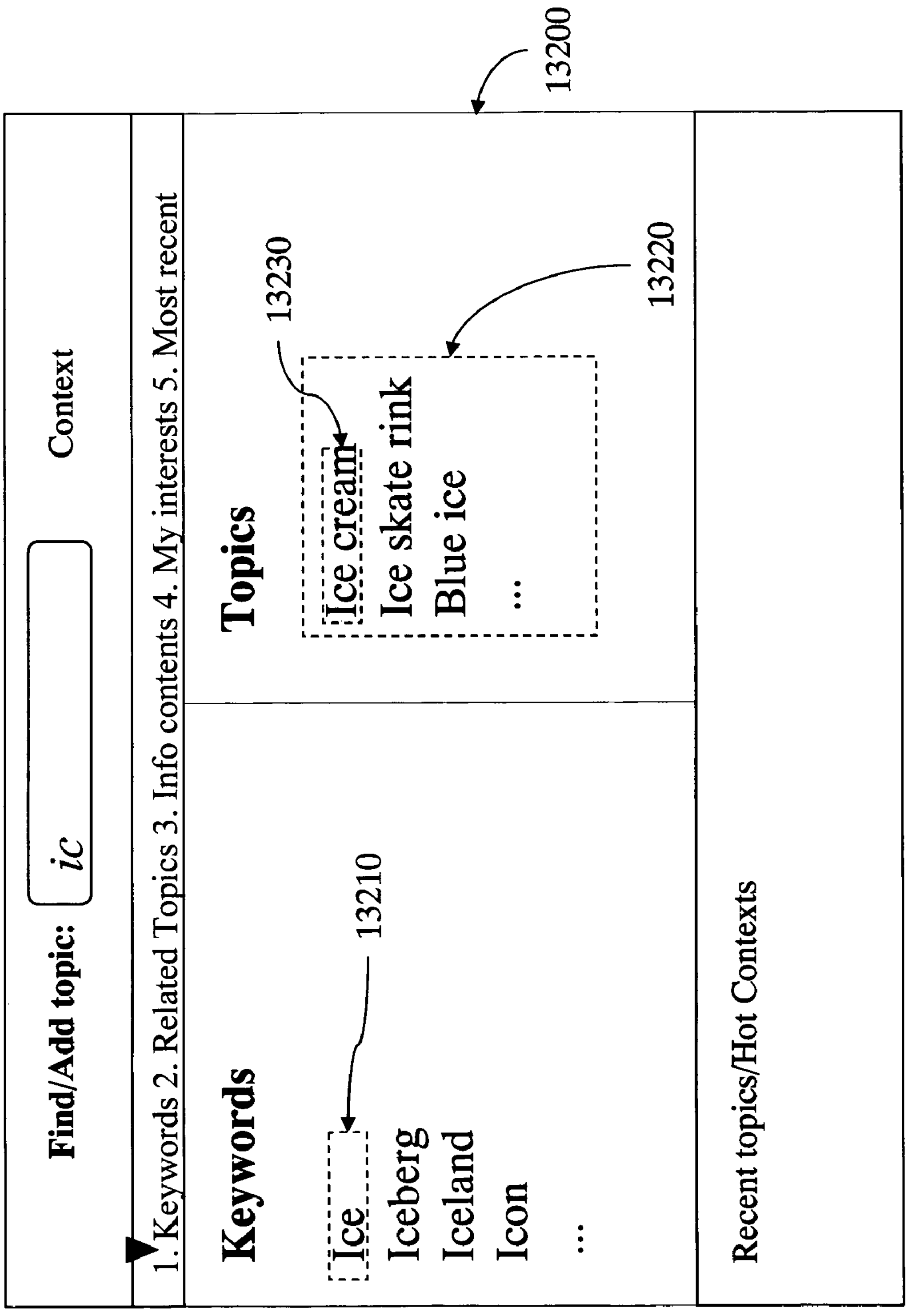
Figure 13C:
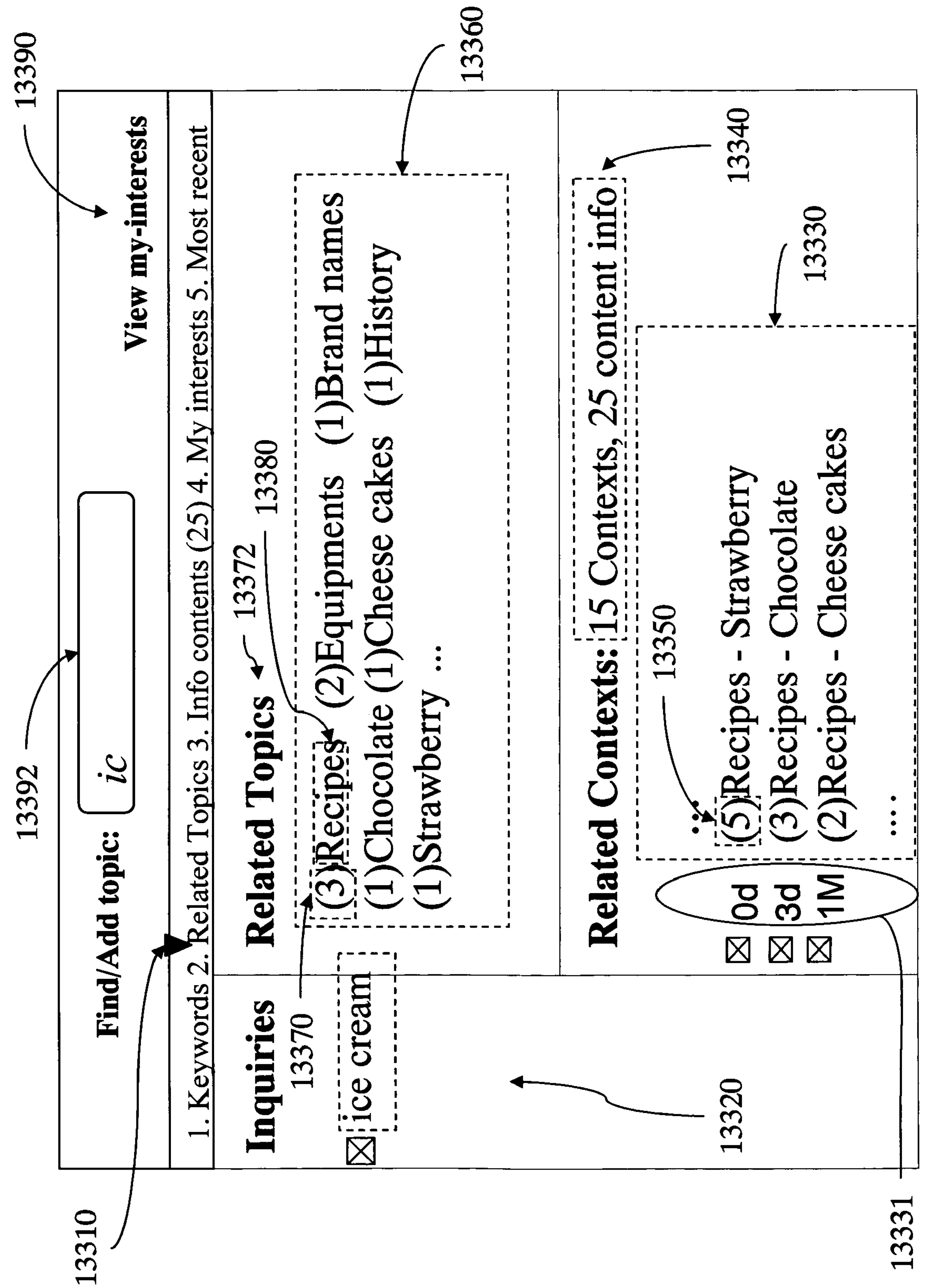
Figure 13D:
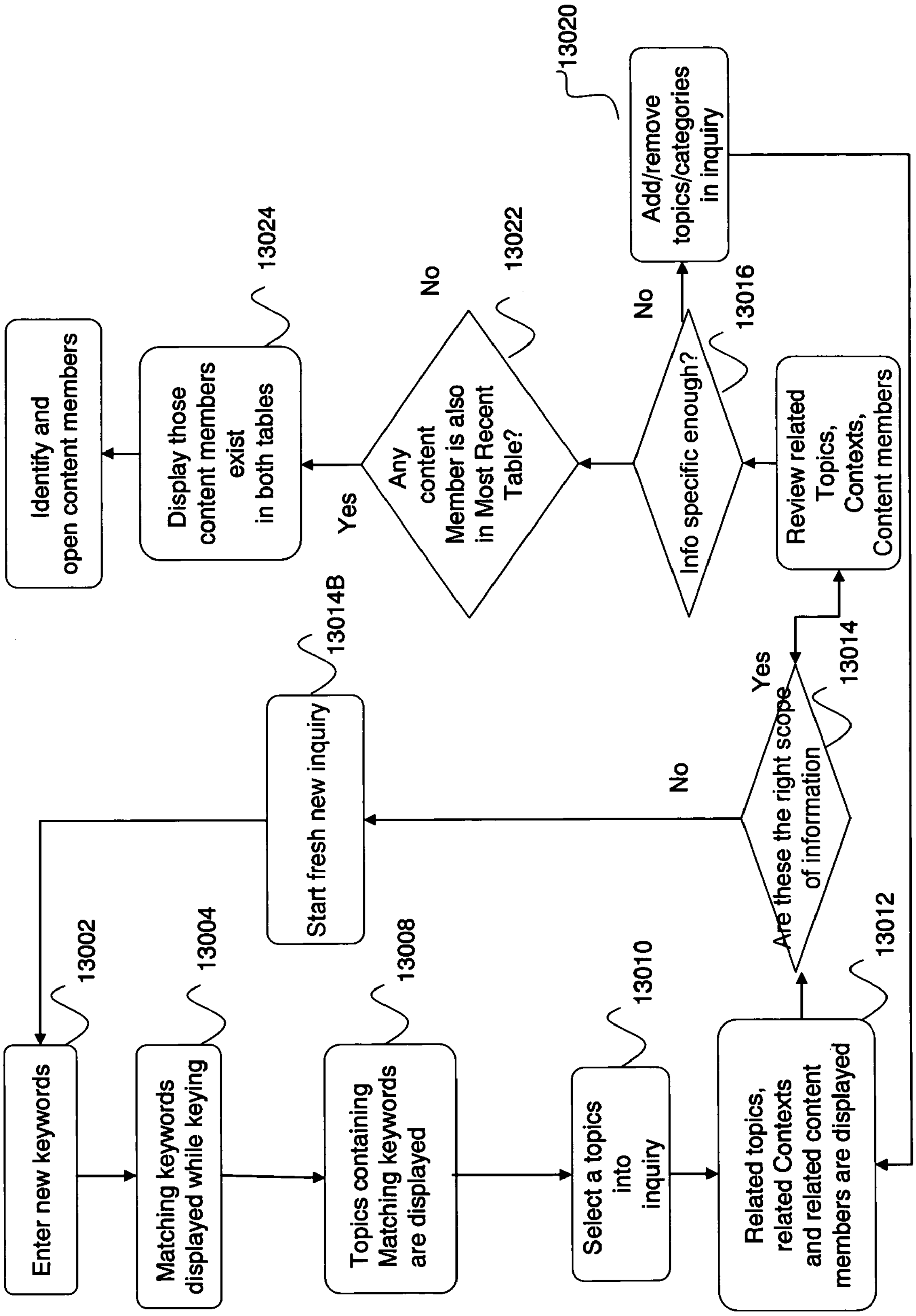

FIGS. 13A-13C illustrate an example of using a PC application user interface for interacting with a crosslink database of the present invention, while FIG. 13D depicts a general flow chart. In this example, the user is trying to retrieve a document relating to "ice cream" that the user had previously stored in a network computer or a personal computer. The graphic user interface (GUI) in this case may be built on a web-browser, for example, Internet Explorer, Mozilla Firefox, Safari, or web browser application (Microsoft Window allows IE browser to be imbedded in an application) or desktop application. The first page is as shown in FIG. 13A and the progression is depicted in text 13130. The top row of the first page includes an "Enter" field 13110 and "Context" 11050. The row below the top row comprises the page indicator 13130 "Keywords," "Related Topics," "Info contents," "My Interests," and "Most Recent." The current page is indicated by the arrow 13140. In the example shown in FIG. 13A, the current page is at "keywords". The two columns below the above mentioned rows comprise "Keywords" 13120 and "Topics" 13100 panels.

For viewing pre-existing keyword(s) and topics, the user selects the "keyword" by clicking on the text body (13130) of "Keyword." The user enters a keyword or multiple keywords into box 13110. While typing up the keyword, the available keywords that match the entry word fragment are shown in keyword-panel 13120. In the example, the user enters "ic" and, before the completion of keyword "ice", the pre-existing keywords that are similar to the entry word fragment (using "fuzzy text matching") are displayed, in this case, "ice, iceberg, Iceland, icon", etc. The more complete the entry is, the more specific keywords are displayed. The user may select (clicks) the desired keyword from the list of similar keywords, in this case, "ice" 13210 (FIG. 13B). The topics that contain at least one similar word as "ice" are subsequently shown in the topic panel 13220. In case of only one keyword is listing in panel 13120, the matching topics that contain the keyword may be automatically displayed in 13220 without the need of clicking on the keyword. In another embodiment, when the number of qualified keywords is less than a preset number, the system may automatically show the topics that contain at least a similar word as the entry keyword. If the user enters two keyword in 13110 (FIG. 13A), only topics that contain a similar word as that of first entry keyword as well as a similar word as that of the second entry keyword are shown in 13220 (FIG. 13B). Similarly, the user may enter more than two keywords in field 13110, for a topic to be displayed, it needs to contain a similar word for each entry keyword.

The user now reviews the available topics in 13220 (FIG. 13B) and click on the desired topic, here: "ice cream" 13230. This action moves the process to the page of "related topics" (13310—FIG. 13C) and at the same time the topic "ice cream" is entered into the inquiry panel (13320), as shown in FIG. 13C. If only one topic is listed in 13220, the topic may be automatically entered into the inquiry without the need of clicking the topic. The database engine first looks for any Context that contains all those topics that are listed in the inquiry panel 13320. The qualified Contexts are listed in the "Related Contexts" panel 13330 except not showing those topics that are already in the inquiry panel 13320. In the example shown in FIG. 13C "ice cream" is not shown in the three "recipes" Contexts because it is already in the inquiry. The reason why topics that are entered in the inquiry panel are not shown in this example is that search field may be progressively narrowed and more specific, and the user can focus on the differences among the qualified Contexts. It is obvious in another example where the database engine may look for any Context that contains at least one of the topics in the inquiry. This scenario will not be discussed here to avoid branching off the main course of discussion.

The total number of qualified Contexts of information and the total number of content members in the qualified Contexts are summarized in the panel 13340 (FIG. 13C). In this particular example, 15 Contexts of information containing the topic "ice cream" and 25 content members from the 15 Contexts of information are presented to the user for selection. The number enclosed in the bracket ( ) (13350) represents the total number of content members in that particular Context of information. In this example, 5 content members are related to the "ice cream"+"recipes"+"strawberry" Context. This number may be used to rank the order of how Contexts are displayed in panel 13330. The higher the number is, the higher the Contexts are ranked and displayed. More options on the ranking of Contexts will be discussed later.

Likewise, the topics of the qualified Contexts of information, excluding those entered in the inquiry panel, are presented in panel 13360. Each topic is associated with a number, 13370, representing the number of qualified Contexts containing this particular topic. For example, the number "3" in the bracket in front of "recipes" in FIG. 13C, 13380, indicates that three Contexts (in the Related Context panel 13330) of information contain the topic "recipes." The numbers may be used to rank the topics in the "Related topics" panel In this case, the larger the number is, the higher the topic is ranked. This number can also be used to rank the order of topics in a Context. The purpose is to automatically arrange the layout of topics in Contexts so that commonality and differences between Contexts in panel 13330 are apparent. For instance, if the topics order in a Context is arranged alphabetically, the appearance of the Contexts in the example shown in FIG. 13C would have been as follows:

(5)Recipe-Strawberry (3)Chocolate-Recipe (2)Cheese cake-Recipe

But when the topic ordering within a Context is ranked by the importance of the topic (in this example, ranked by the number in bracket 13370), the Contexts appear as follows:

(5)Recipe-Strawberry (3)Recipe-Chocolate (2)Recipe-Cheese cake, where the topic "recipe" is aligned so that the user can quickly perceived the commonality and at the same time, the differences between these Contexts. Although in this example the topic is ranked by the number of its associate Contexts, the same principle is applicable to any other topic ranking schemes.

Figure 16:
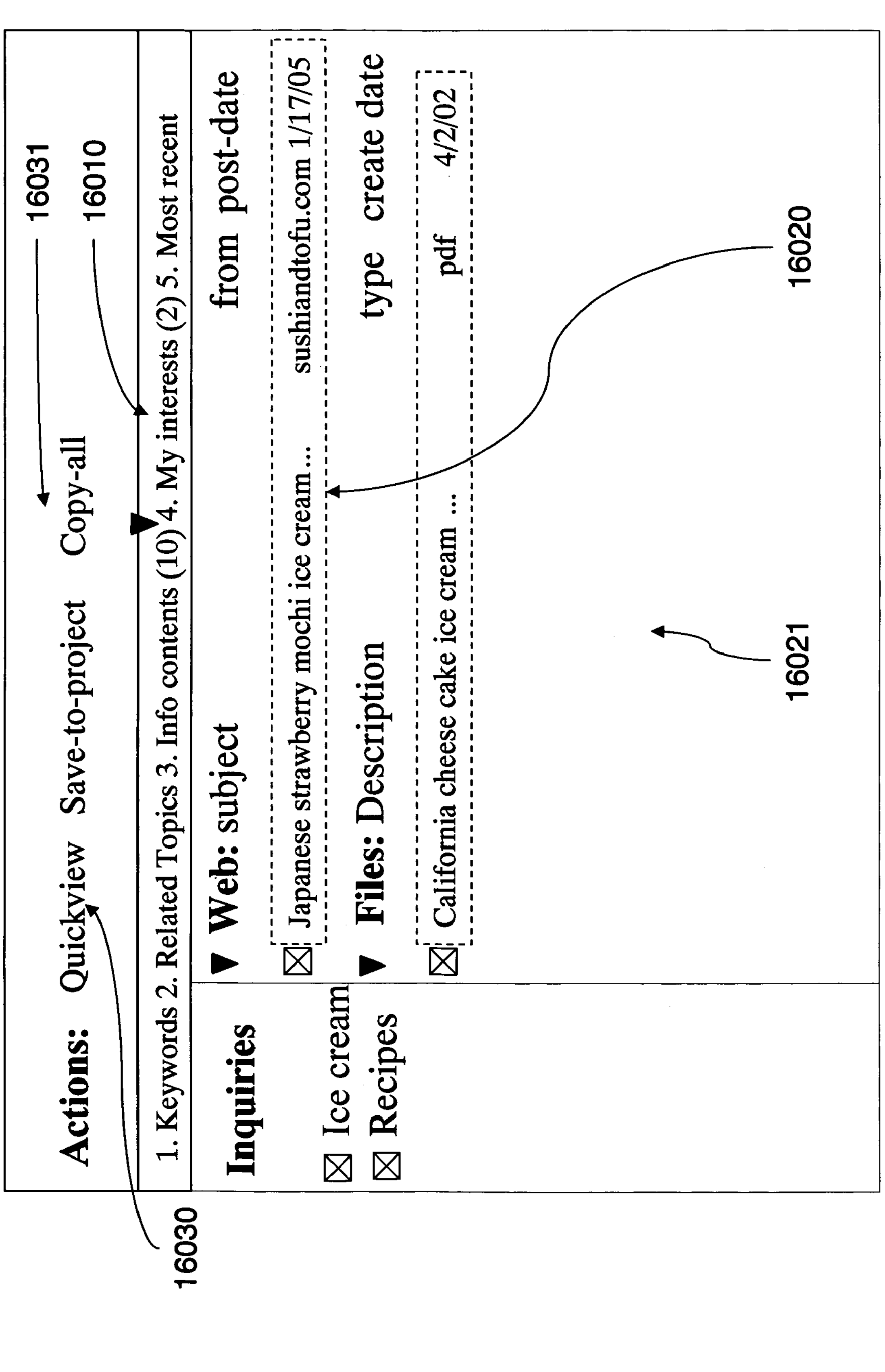

Access time (the most recent time when topics or Contexts caught the users attention, more details below) may be used for ranking how related topics and Contexts are displayed in panels 13360 and 13330 (FIG. 13C), respectively. The order of the topics or Contexts in display can be ranked by reverse chronological or chronological order. An "access time" field (10080, FIG. 100) in the "universal ID" table 111 (FIG. 10A) is used to store the recent access time for all items. The duration (in units of days, months, or years) between current time and the access time may be shown next to each qualified Context in panel 13330 (FIG. 13C). In the example shown in 13331 (FIG. 13C), 0D, 3D, 1M represents 0 day, 3 day, and 1 month (in this example rounded up in months when greater than 30 days), respectively, for the duration of the three Contexts. The access time for a Context is stored at its connecting node. The access time for a Context by default is the creation date. The access time may be updated when the Context is revised (add new members, revise old members, delete old members, etc.), or when the Context's checkbox is checked by the user, or when one of the Context's content members is accessed (created, opened, revised, saved) by the user, or the combinations thereof. In one embodiment when the user opens the content member in panel 16021 (FIG. 16). The database engine records the access time for the content member and looks up what are the related Contexts of this content member. It then updates the related Contexts assess time to be the same as the content member. In another embodiment, the database engine checks what Contexts are qualifies for and also is clicked and only update these Contexts' access time. A topic access time is also revised when a content member or a Context is accessed by the user. The default access time is the creation time of the topic. The crosslink database engine looks up what are the topics in the inquiry panel 13220 (FIG. 13C) at the moment the content member is accessed. It updates those topics' access time to the time of the content open. In another example, the database engine looks up what are the topics in the inquiry panel (13320, FIG. 13C) when a Context's checkbox (in panel 13330) is checked. It updates the access time of these topics to the time of check event. The reason these topic's access time is updated because they have helped the user identifies meaningful information in the form of either Contexts or content members. When in display in panel 13360, the topic can be ranked in reverse chronicle order.

Features—Topic Search, Exploration, and Storage

Figure 14:
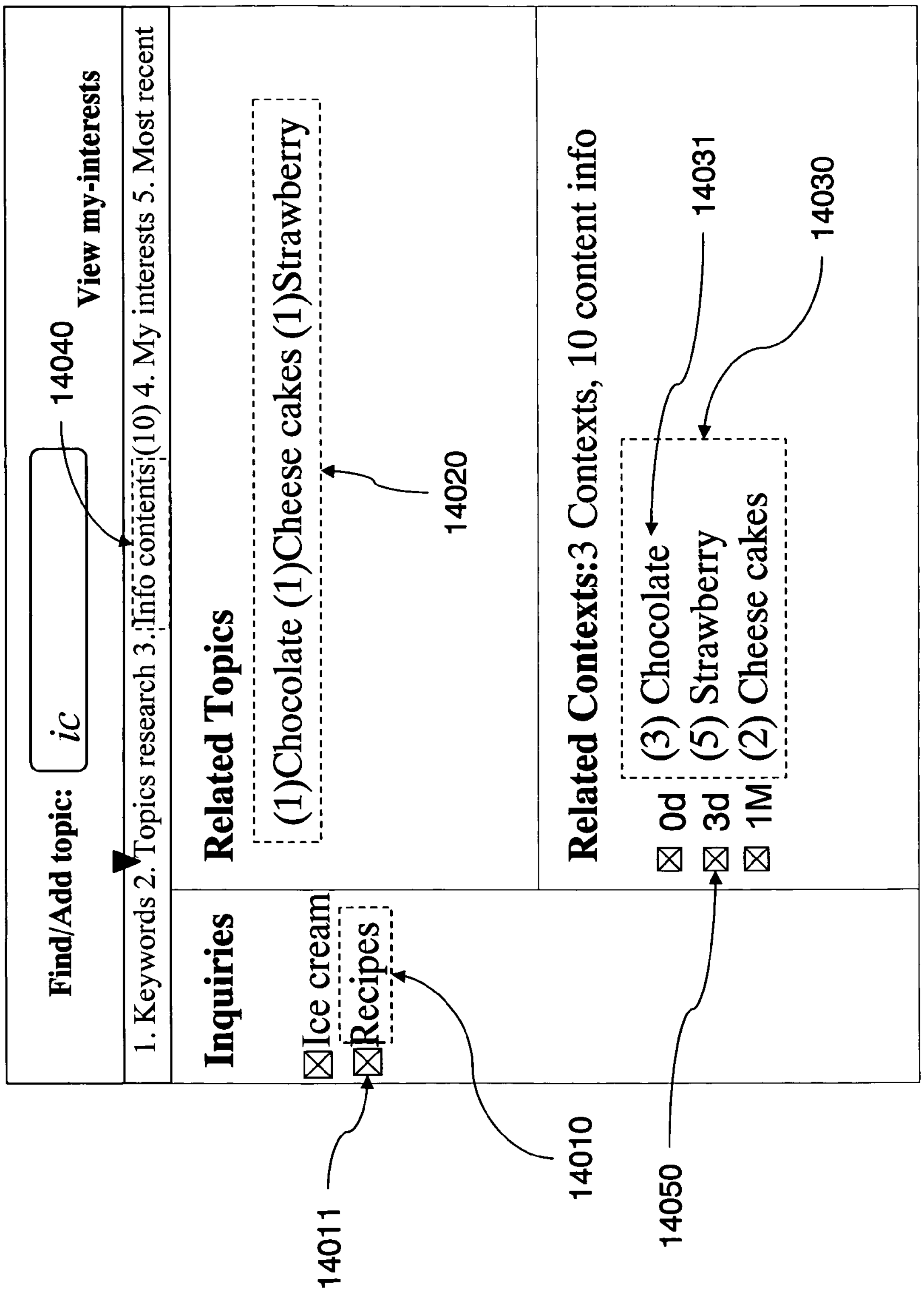
FIGS. 14-21 illustrate various screens of a user interface for illustrating how a user inquires the crosslink database according to an embodiment of the present invention.

To narrow down the number of related topics, related Contexts, or related content members, the user may send any of the topics either listed in the "Related topics" panel (13360) or in the "Related Context" panel (13330) (FIG. 13C). In this example, the user clicks the topic "recipe" (13380) to add it to the inquiry, as indicated in 14010 (FIG. 14). This narrows down the qualified Contexts to 3 Contexts as that shown in 14030. Each member in the inquiry has an associate checkbox (14011). Uncheck a member is equivalent to remove it form the inquiry. When the user has multiple topics and/or content members in the inquiry, checking or un-checking checkboxes in the inquiry allow the user to quickly explore several combinations of the topics. An alternative approach for checkbox is to have a temporary buffer (for instance, dividing the inquiry into half: one half for inquiry and the other half serves as a buffer). Instead of un-checking an item in the inquiry, the user may drag the item to the buffer. Drag it back to the inquiry panel when the item is needed again.

To review the content members the user reviews the Related Contexts and checks Contexts of interests (each Context has a check box, 14050). Multiple checkboxes can be selected each time. Next the user selects "info content" 14040. This brings up the window as that shown in FIG. 15A. In this example there are 3 different data-types of content members that are qualified: emails (15010), web (15020), and files (15030). Each content member is described by three fields: "description", "access time" and the third field-"from" for emails, "site" for web sites, and "application" for files. The "access time" field stores the most recent time when the content was last accessed.

Figure 17:
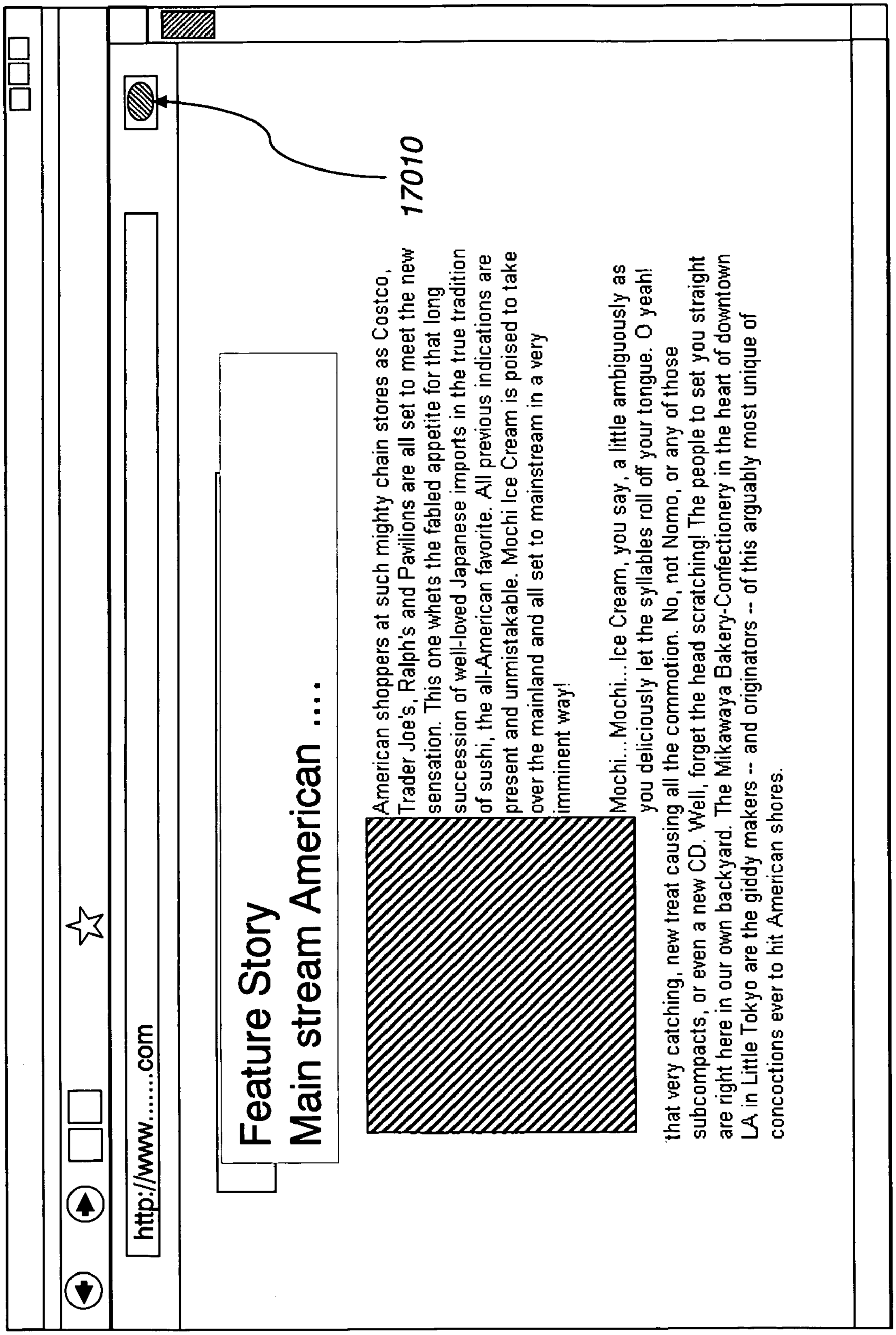

The ranking of content members may be based on the access time, by creation time, by content type, by author/sender etc. By double clicking on the text body of a content member, the user can open the content with its default application. In this example the user clicks on the item 16020 to view the web content via a web browser application. The outcome is shown in FIG. 17. To select the content member for later review, check the associated "( )" (like that of 15040) then click on "add to my interests" 15050 to store them for later review. FIG. 16 shows an example where two content members have been selected by the user for review; this panel is arrived at by clicking "My interests" 16010. The user may place the cursor on the content member and select a mouse menu (by pressing left or right button) item "get details". The database then calls the source of the platform from where the content member originates. For instance, if the content is a local PC file, Window Explore may be called to show the file within a folder. If the content is a record in a conventional database, the database application may be called and the inquiry for this content submitted. If the content is an email, the email application will be called to show the email in the application.

User Interface—Example 2

Figure 15:
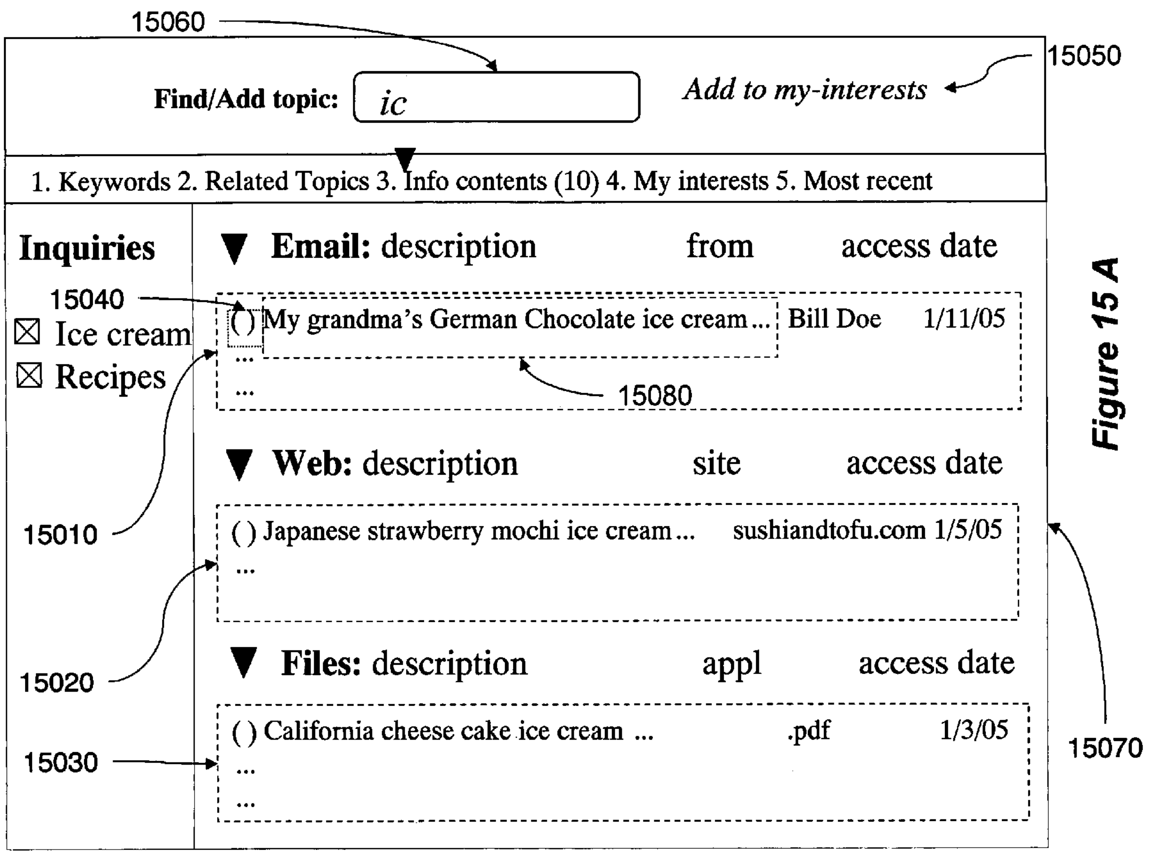
Figure 15B:
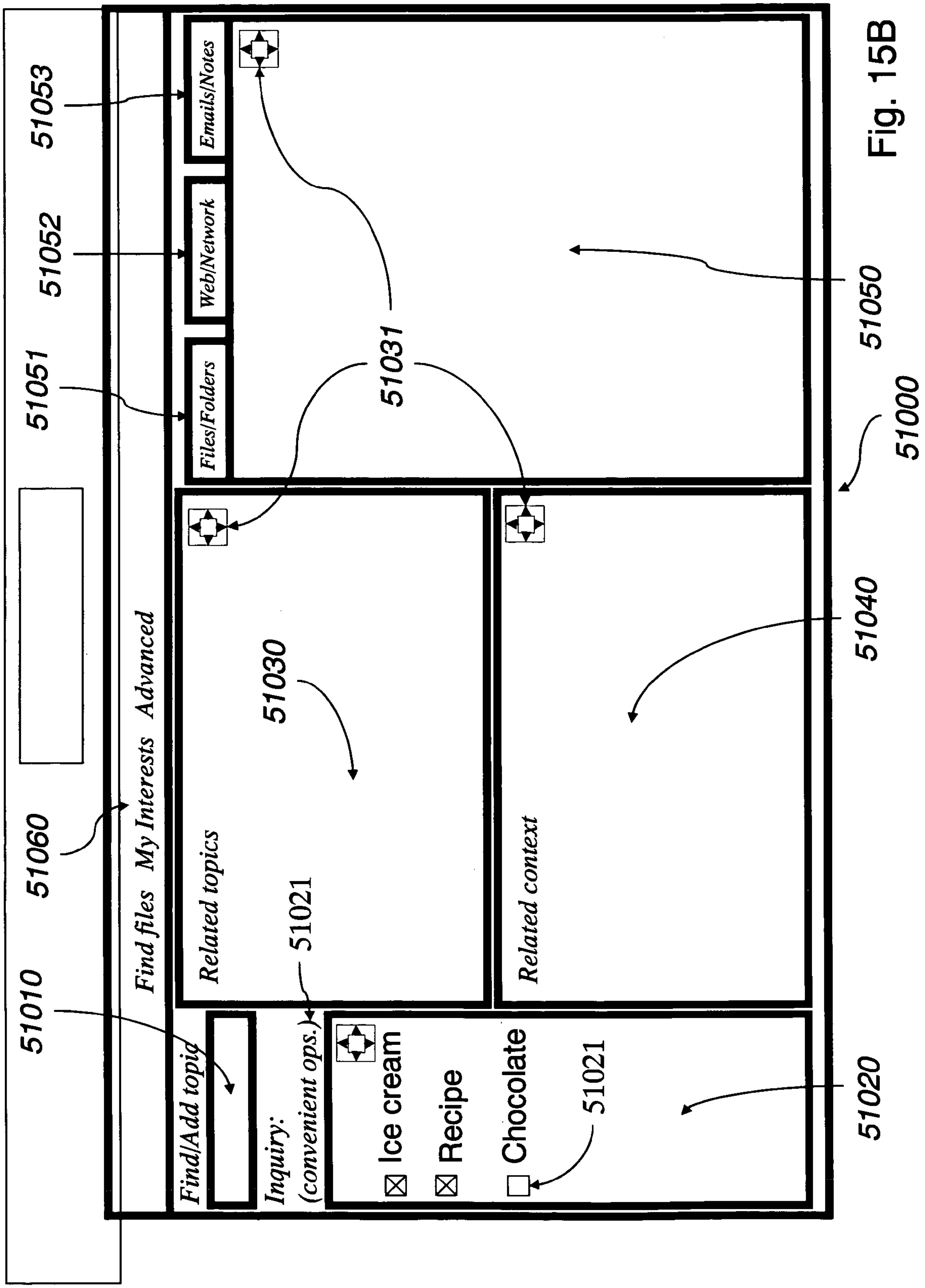
Figure 15C:
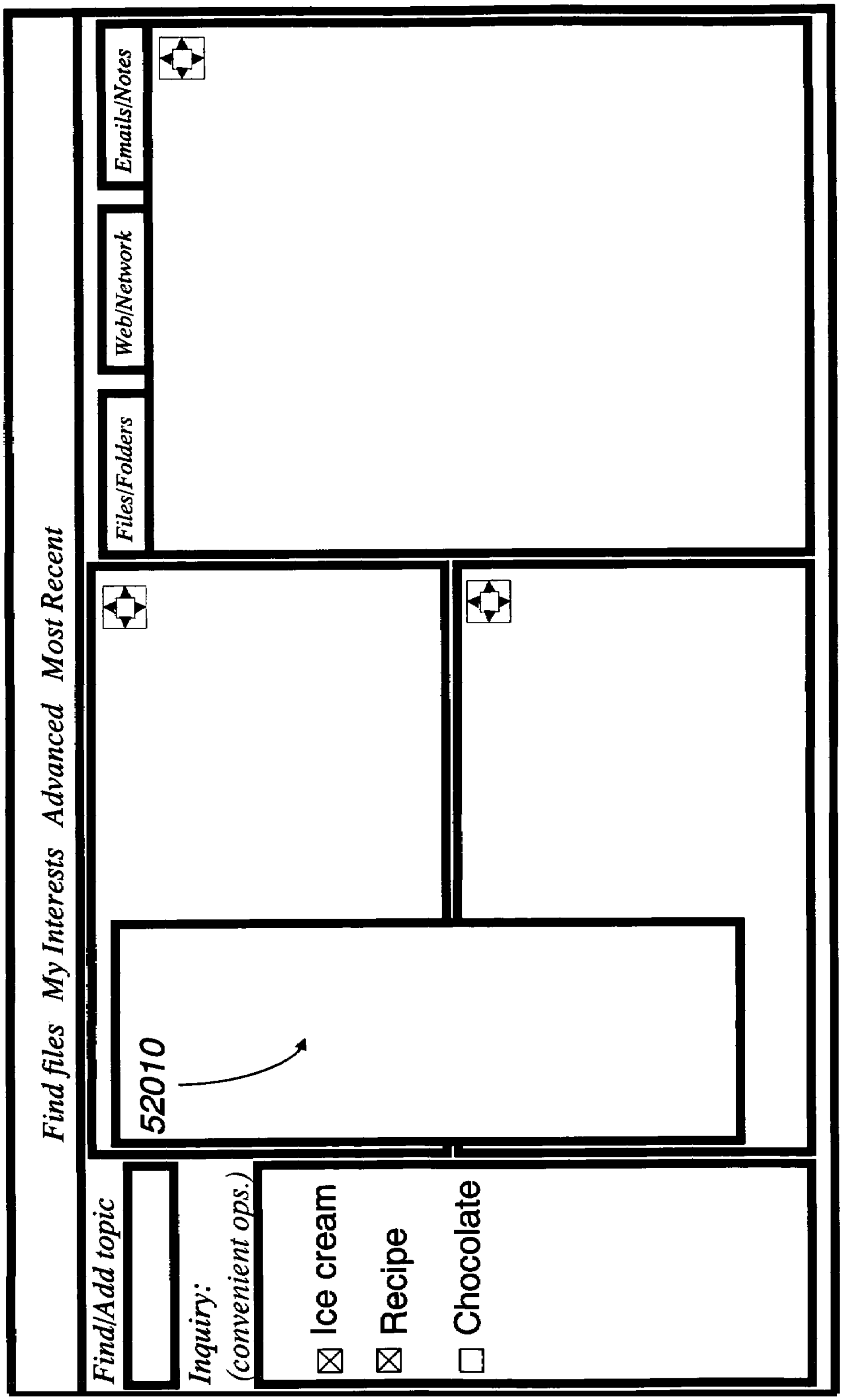

In this embodiment, the GUI in FIGS. 13-A, B and C, and FIG. 15 can be condensed into one GUI page, as show in FIG. 15B. The process is similar to that in the previously example. The objective is to eliminate the inconvenience of switching between different pages. There are four major panels in this GUI: panels 51020, 51030, 51040 and 51050; each panel can be expand to a larger size or restore back to default size by clicking icon 51031. The keyword entry field 13110 or 13392 (FIGS. 13A, C) is now equivalent to field 51010 (FIG. 15B). When the user clicks on this filed, a panel 52010 (FIG. 15C) pops up showing a list of recent topics (say top 20). As the user enters a part word into this panel, the system find a list of matching keywords based on "fuzzy text matching" as previously discussed. In panel 52010 it displays any topic that contains at least one keyword in the keyword list. If the user enters a second keyword, the system generates the second matching keyword list. Only topics that contain simultaneously at least one keyword in list 1 and one keyword in list 2 will be displayed in panel 52010. The same scheme is applicable when the user enters more than 2 keywords in field 51010.

The user can either select one of the topics in panel 52010 (FIG. 15C) or click on area outside of the panel for panel 52010 to close. The selected topic now appears in the inquiry panel 51020. Topics related to the inquiry topics are displaying in panel 51030, FIG. 15B (functions similar to panel 13360, FIG. 13C) while the related Contexts are shown in panels 51040 (functions similar to panel 13330, FIG. 13C).

Note that each topic in the inquiry (51020) has a checkbox (51021) associate with it. Unchecking a checkbox is equivalent to removing this member from the inquiry. Checking and un-checking checkboxes allow the user to quickly explore the relationship for different member combinations in panel 51020. The user can also select convenient operations (51021) like "clear all" to remove all items from the inquiry panel, "clear content" to remove only content members, "clear checked" to remove only checked item, and "clear unchecked" to remove unchecked items. Each Context in panel 51040 associates with a check box identical to that of 14050 (FIG. 14) Checking a Context will show in panel 51050 those content members that are related to the check Context. Multiple checkboxes can be selected simultaneously. The function of panel 51050 is similar to that panel 15070 (FIG. 15B). In the example, it contains three tabs: Files/Folders 51051, web page/Context 51052, Emails/Notes 51053. More tabs may be added if other types of data are to be cross-linked. Each tab represents certain categories of content members. For instance, click "Files/Folders" tab to review files or folders type of content. A number (not shown in figure) for each category is display on the tabs to indicate the number of qualified content members. For instance if (3/2) is displayed in the "Files/Folders" tab, the user expects to see total of three files and 2 folders within this tab.

Which tab will be the default tab that is shown to the user? The tab that contains the most recently accessed content member. The database engine compares the access time of all the qualified content members to find the most recently accessed content member. Whichever tab this content member resides in, the tab will be shown to the user by default. Note that the default tab is dynamically determined for every inquiry.

Features—My Interests

A feature of the invention relates to avoiding the "off track" chase that often occurs when one searches for information stored electronically, e.g., on the Internet. As is experienced by many users, during a search for a particular subject, the computer returns hits on related subjects that the user is interested in, but not at the moment. However, on many occasions, in order not to lose this information, the user follows these "tangential" leads and get off track and distracted. One feature of the invention helps avoid such distractions. When using the inventive system, the user may encounter numerous keywords, topics, Contexts, or Content members that are of their general interests, but not of immediate interest. According to a feature of the invention, the user can temporarily store these elements for future review. According to one embodiment, the user may place the cursor on these elements and pick "send to my interests" item in the mouse menu. To view what has been saved in "my-interests", the user clicks on "view my interests" 13390 in FIG. 13C or 51060 in FIG. 15B. Window 18000 (FIG. 18) pops up, where the saved topics, Contexts, and content members are shown in panels 18010, 18020, and 18040, respectively. The control word "(my interests)" 18030 is submitted into the inquiry (when "my interests" is clicked) to signal the database engine any Context that has been elected into "my interests" are qualified. An example for implementing "my interests" is that a special Context contains the control topic "(my interest)". Note that a control topic cannot be deleted or renamed by the user. When the user clicks an item and select "send to my interest," this item joins this special Context. When inquire about "(my interests)", any items in this Context is displayed in the appropriate panels. When an item is removed from the "my interests", the crosslink database system "Deletes" this item from this Context.

Figure 18:
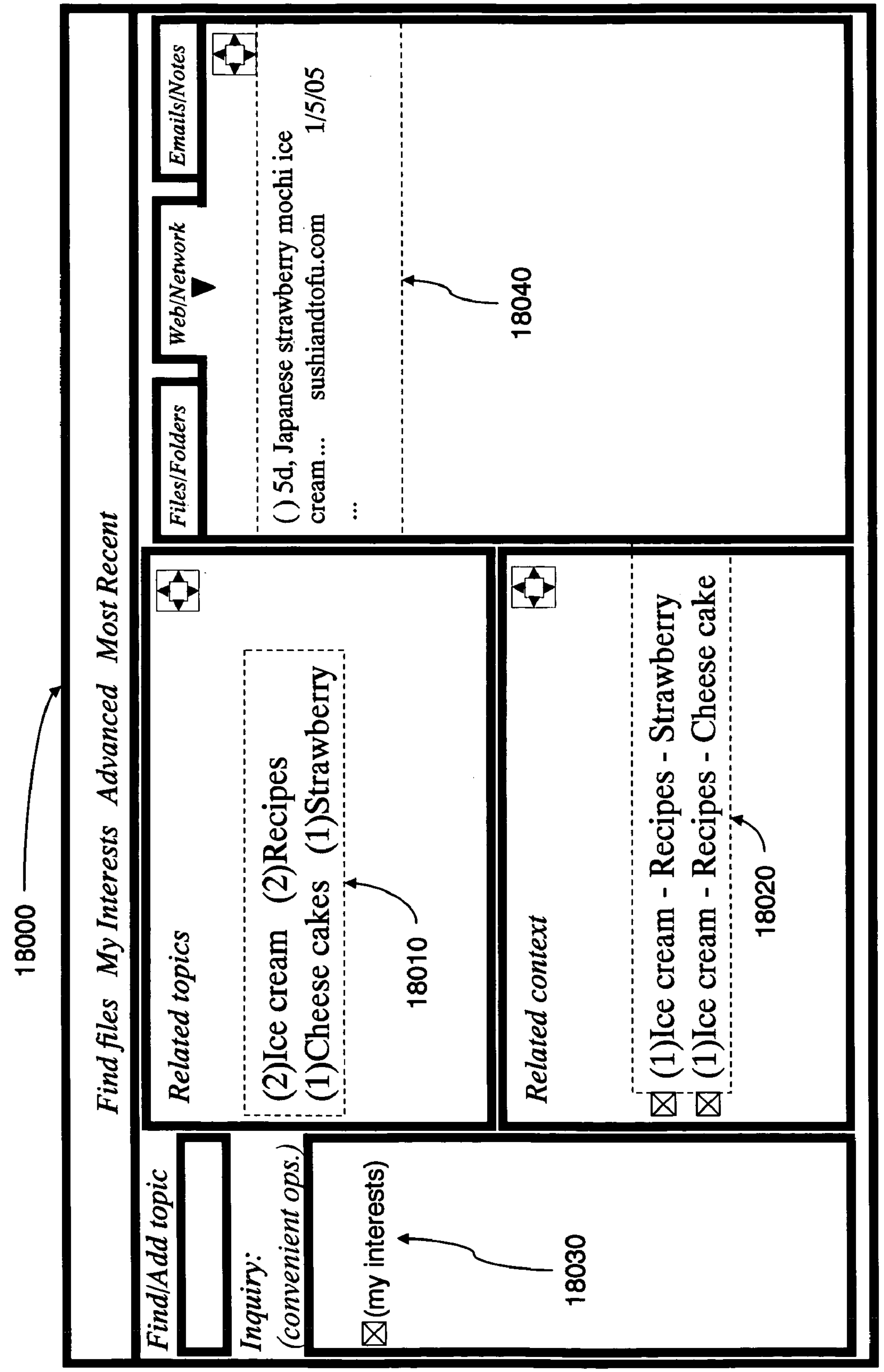

When a large number of content members are stored in "my interests", it could be overwhelming to recall why each content member has been selected by reading the description of each content. In this case, it is very helpful to view the same information in "Contexts" and "topics" in Window 18000 (FIG. 18). The "related Context" 18020 provides a quick glance of what has been selected. The user can take the same advantage of interacting with topics and Contexts as discussed previously. In the example in FIG. 18, the user quickly gets the impression of two ice cream recipes. The "related topics" provides a mean to see the common topics (or big topics). For instance, "recipes" and "ice cream" (in 18010) are the big topics. By adding the big topics into the inquiry similar to that of shown in FIG. 14, the user can focus on the differences (or sub-topics) between the content members. In this case, one is related to "strawberry" while the other is related to "cheese cakes".

Features—Most Recent

Figure 19:
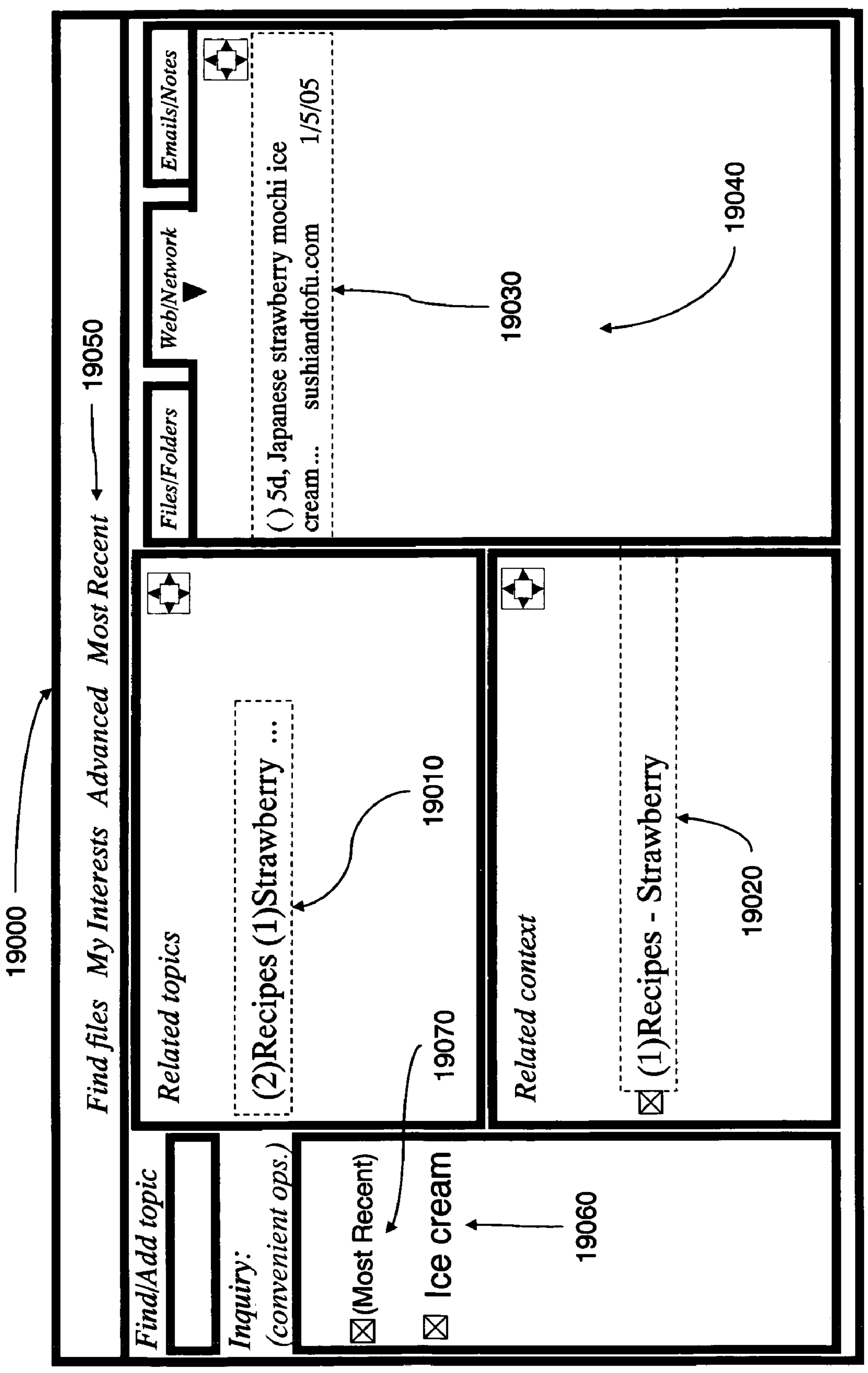

Time in an important factor in information: It happens from time to time that a user tries to reopen a content member that the user has dealt with recently, but has a tough time recalling where it is stored and what the content member name is. However users usually have a general impression of what the information is about. Let us go back to the previous example in which the user did click on 16020 (FIG. 16) to view the web content shown in FIG. 17. The user's opening action triggers the database engine to update this web member's (its universal ID) access time (with a field in the Universal ID Table 111). To view the most recent content members, the crosslink database filters out non content members in Table 111 and extract the most recently accessed content members (for instance, most recent 100 content members) and place them in the "Most Recent Content Table". The user may click on "most recent" 19050 to review the content description listing in reverse chronicle access time in panel 19040; in this example the control topic "(most recent)" is submitted into the inquiry. When nothing is in the inquiry except the "(most recent)", by default the "Most Recent Content Table" is displayed in the panel 19040 (FIG. 19). When the user submits topics or content members in the inquiry field 13320 (FIG. 13C), any qualify content members will be compare to those in the "most recent-content" table to find matches. The matching content members will be displayed in panel 19040, FIG. 19. For instance, if the user submits at least one of the topics into the inquiry: "ice cream", or "recipe", the web content of FIG. 17 will be one of the qualified content members. Since this content is also in the "most recent-content" table, there is a match. In FIG. 19, where "ice cream" (19060) was submitted into the inquiry, the database engine indicates one content member (19030) qualifies in the "most recent content" list. Click 19030 to open the web content again. An example for implementing this "most recent content" table is creating a special Context that contains the control topic "(most recent)" All the contents in the "most recent-content" is grouped into this Context. When inquire about the "(most recent)" topic, the content members in this Context are shown in the appropriate panel 19040.

In one embodiment, the most recent topics and Contexts may be logged similar to that of a content member. Each topics and Contexts access time are tracked using a field in the Universal ID Table 111 (FIG. 10A). The definition of access time varies based on different embodiments as was previously discussed. The "Most Recent Topic" is created by applying filter on the Universal ID table for topic type, then ranking access time, extract the top most recently access topics (for instance, cutoff for most recent 100) and placing them in the "Most Recent Topic" table. Similarly for "Most recent Context" table, filters can be applied on the Universal ID table for only connecting node type (each representing a Context) and cutoff for the top, most recently accessed Contexts. When nothing is in the inquiry except the "(most recent)", by default the "Most Recent Content" table" is displayed in the panels 19010 and 19020 (FIG. 19). When topics or content members are submitted into the inquiry, only topics/Contexts that are both qualified and in the most recent tables are displayed. An example for implementing this "most recent topics" or "most recent Contexts" is creating a special Context that contains the control topic "(most recent)" All the "most recent topics" or "most recent Contexts" are grouped into this Context. When inquire about the "(most recent)" topic, the topics and Contexts in this Context are shown in the appropriate panels 19010 and 19020. When addition topics are inquired, any qualified topics, Contexts or content members have to also be related to the "(most recent)" control topic in order to be displayed in window 19000.

What is shown to the user for the most recent Topics, Contents, or content members may depend on what is inquired. When an inquiry is submitted, only the topics and Contexts that are qualified for the inquiry and also in the "Most Recent" tables are shown in the "most recent" list. This way the user can focus only on the most recent topics, contents, or Contexts that are relevant to the scope of inquiry. Note that an alternative for inquire about most recently accessed Context was previously discussed: By ranking Context in the Related Context panel 13330 based on time of duration between present time and last access time, the most recently accessed Contexts is ranked on top in the Related Context panel 13330 (FIG. 13C).

Applications-Most Recent

Generally users rely on notebook computers to log daily events so that they can be reviewed and followed up in a timely fashion. Similarly, users of the invention can intelligently review and follow up with their pass activities, thoughts, motives, and information gathering by reviewing the most recent topics, Contexts, and contents. The invention provides simply and effective way to intelligently guess what topic, Context, and content are relevant to the user during the near past and allows them to review the most recent that are within the scope of inquiry (interests).

Another example of using the most recent feature is when a large number of related topic turns up from an inquiry. The user may need to select a second topic or more to narrow down the choices. If the user has gone through this step before, the user can select most recent view (19050, FIG. 19) to view only topics that are recently accessed. Because he has selected a second topic in conjunction with the $1^{st}$ topics for a previous inquiry, he may find the second topic in the most recent topic list. It is much easier for the user to spot the second topic in this case because the number of related topics is significantly reduced by most recent filter.

Grab a Content Member Link

To crosslink a content member, the content member link first needs to be grabbed. Several approaches may be used to grab the link associate with a digital content. For files in Window operating system for instance, the user can place the cursor on the file name and select a right mouse menu item "add file for crosslink". It calls a crosslink application to grab the file path using Window OS/.NET API. To grab the object (mail message, contact, tasks, calendar, note, yellow sticker, etc.) link from Microsoft Outlook for instance, an add-in button may be placed at the Outlook toolbar. When the user clicks the button, the add-in grabs Outlook IDs of the selected objects. Feeding an Outlook ID to Outlook API can re-open the object. Therefore, the database engine may crosslink the Outlook ID just like a file path. To grab the URL of a web page, an add-in button may be placed at the browser (for instance, Window Explore browser) toolbar similar to that of Outlook. Similarly add-in buttons also can be placed in Microsoft Office Suite (Word, Excell, and Powerpoint, etc.) Using the feature of "paste as hyperlink" application program interface (API) function call in Office application, the link can point to a specific location (for instance, paragraph, slide, or cell) of the document. In addition, whenever a link (web, document, emails, etc) is grabbed, the crosslink database system may also place the link (to the web server, file server, application server, or application API, etc and possible associate parameters) into the operating system "paste buffer" so that the link can be copied into any text editor as a hyperlink. The user can call this link from the document as well. This saves the effort to collect the link if it happens to be also referenced in a document.

Another approach to grab the file links for desktop application is to log the file activities of open, save, revise, create, rename, delete, etc. using driver, operating system Application Program Interface (API) hook, .NET file system watcher API, Window OS "My recent document" log, MS Office "My recent document" log, etc. The file paths (links) of recent activities are presented to the user. The user may pick a file path(s) from this list to place the link(s) to the buffer for further processing. To grab the link of a conventional database record, a button or its alike need to be added to the GUI of the database. Clicking the button grabs the record identifier, table name, database name, and server name. When grabbing a content that contains text, the system can automatically compare the text with existing keywords and topics using "fuzzy text matching" and suggest them to the user.

A conventional hyperlink stops working once the file pointed by the hyperlink is moved to a different folder or rename. This makes re-organizing and re-arranging folders and files difficult. Since the crosslink database also retrive files/folders by file path, it encounters the same issue. One approach is to use a file monitoring system (similar to that of used in computer security applications or .NET Filer Watcher System Application Program Interface). File move, rename, or deletion can be monitored by a crosslink application for a selection of applications, the original file path and the final file path. For the case of file deletion the final file path points to the OS "trash bin". When an rename, file move, or deletion event is detected, a new file path is issued to the file. The original file path reported in the log may be used to compare to what records in the content tables (FIG. 10B). When there is a match, it may notify the user or may automatically update the file path to the new file path or have the user to confirm. Once it is confirm, the link is updated. It may also monitor certain applications activities or file extension and record final file path in a log. When a content member link is broken, the crosslink database may automatically go to this log and find similar path (for instance, similar filename, or same directory) and suggest them to the user. Once confirmed the link is updated.

Figure 20:
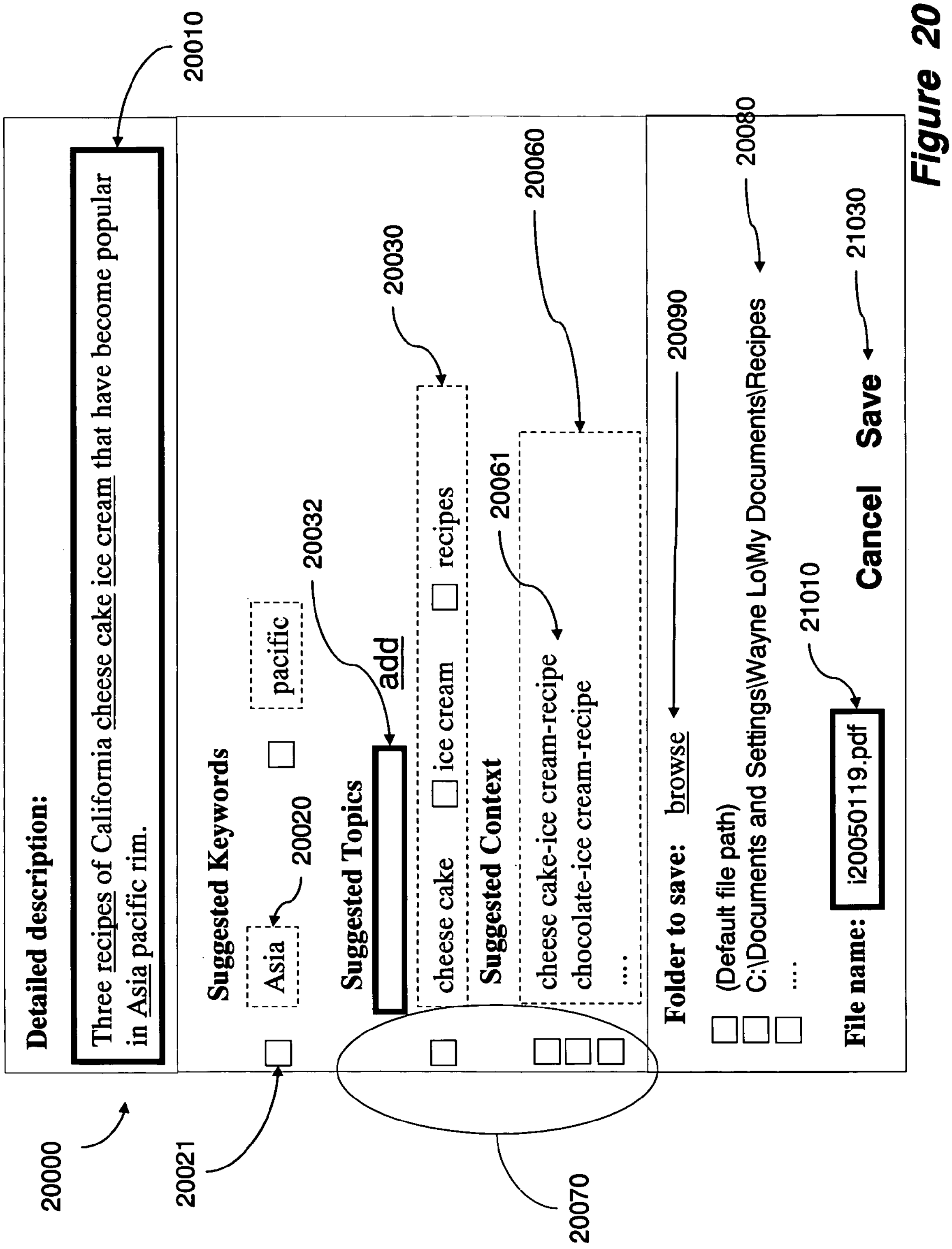

When a digital content is being saved, the crosslink database may intelligently suggests related keywords, topics, Contexts and folders. In this example, the content-information is a document file. When the user is to "save" this file the first time or to "save as" this file, a screen such as that shown in FIG. 20 pops up (for instance, using API hook to replace the default operating system save dialog box). It prompts the user to describe the file content. In one embodiment, the system may clip the very beginning portion of the file and automatically fill it into the description field. The user may overwrite it with the user's own description, e.g., "Three recipes of California cheese cake ice cream that have become popular in Asia pacific-rim" (20010). Before this file is saved, the user may look up the suggested topics or Contexts by the crosslink database. The database engine uses "fuzzy text matching" to check the text string in the description, the beginning and ending portion of the document, or the entire document for preexisting topics. Note that "fuzzy text matching" may suggest irrelevant topics. But human intelligence can easily and quickly spot the relevant topics among a short list of suggestion. In the example shown in FIG. 20, the database suggests a list of keywords and topics to the user. The user can select the relevant topics by checking the associate checkboxes (20070, FIG. 20). If the user has an intended topic that is not in the suggested topics, the user may add this topic by entering into field 20032. If this topic does not exist in the crosslink database, the database may suggest similar topics as the entry topic using "fuzzy text string matching". If none of suggested topics are relevant, the user can select a keyword by checking the keyword checkbox 20021. The system will automatically find the most recent set of topics (a preset number, say 5) that contain the selected keyword.

In the end based on the user's selected topics, the database will search for the most recent Contexts, say most recent five Contexts that are related to the selected topics and display them in panel 20060. The user can check the Context checkboxes for this file to relate when the file is saved. If the user selects none of the suggested Contexts but does select some of the topics, the selected topics and the file link are placed in the crosslink database buffer when the user clicks "Save" 21030. Note that the filename (21010) is automatically suggested by the system by default and can be overwritten. When clicking "Save" 21030, the file is saved into the designated storage and the file link is automatically sent to the crosslink's revision buffer, from where the user can add the file existing Contexts or include it in a new Context.

The invention scheme may also intelligently suggest folders for the user to save the file. This function is handy when the user has to maintain a legacy folder structure. If the user checks suggested topics, the database automatically does the following: (1) sends these topics to the inquiry, (2) checks all the Contexts, (3) looks up the qualified content members and selects the most recent (say five) content members which contain a file path, and (4) display the folders of these paths in 20080. One of the suggested folders in 20080 is the default folder when the user does not find a need for constructing a folder structure for the file. When the user selects one of these folders, the file is saved into this folder when the user clicks "Save" (21030). The user may also browse for other folders when the intended folder is not in the suggested list.

Figure 21:
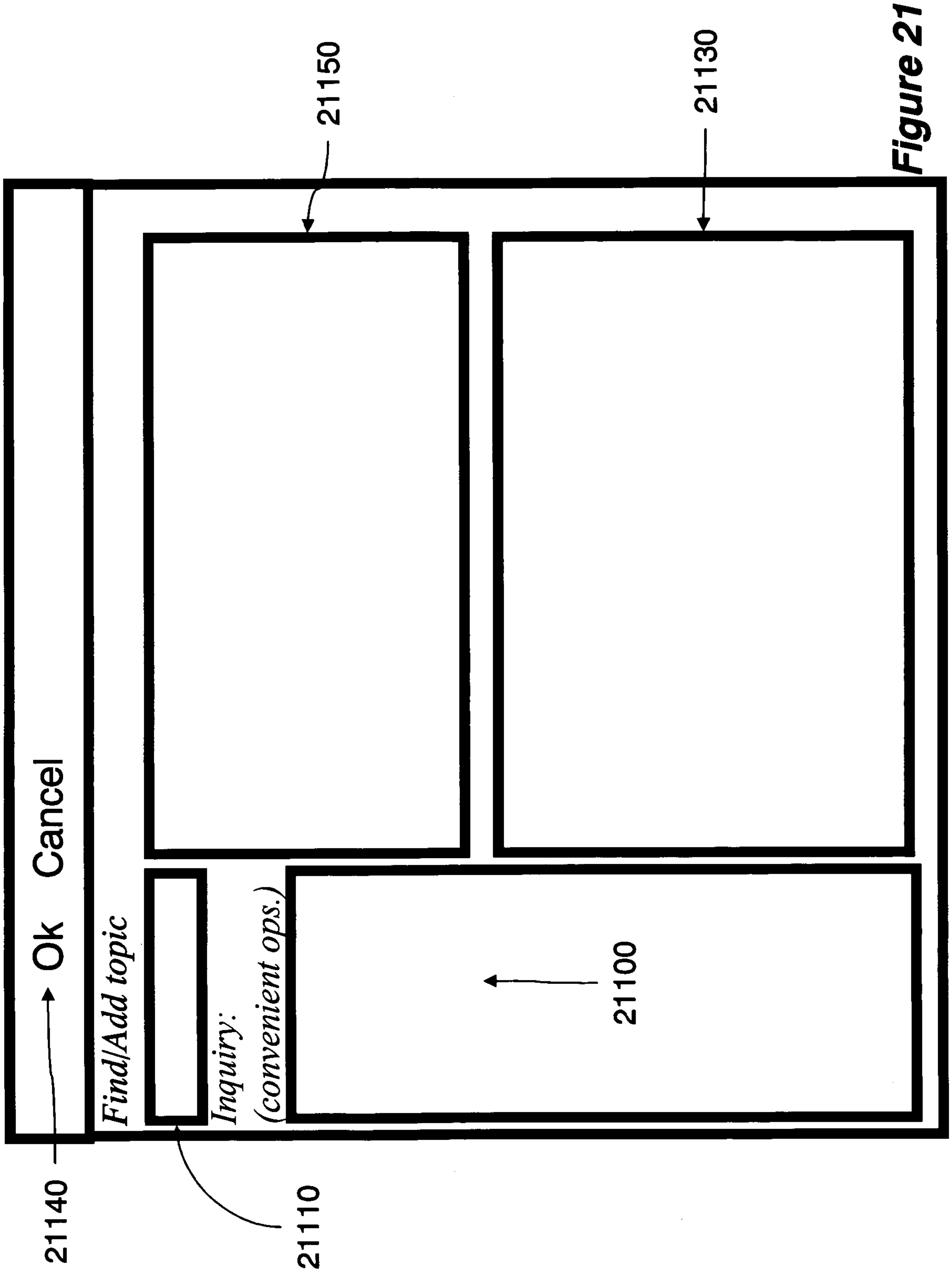

Alternatively, FIG. 21 provides a simple scheme for the user to crosslink a digital content without leaving the digital content's application window. The functions of Panels 21100, 21110, 21130 in FIG. 21 are identical to panels 51020, 51010, 51040 in FIG. 15B. It prompts the user to enter a topic or a group of topics in field 21110. The related contexts to the topics in the inquiry are displayed in the panel 21130. The related content members (not shown to the user) are then ranked according their most recent access time. The most recent set of files are selected and their residence folders/directories are retrieved and displayed in panel 21150. The user can select one of the folder/directory. The crosslink database system grabs the selected folder/directory, appends a default file name (for instance "topics-year-date-time") and place the full file path to the operating system clipboard buffer. When the user select save or save as from the application menu, a standard save/save as dialog box pops up, the user may "paste" (press control and V key for Window) the file path from the clipboard buffer to the dialog box file name field. After the file is saved, the file hyperlink may be grabbed by a monitoring system as previously discussed and placed in the revision buffer 21100. From here the user may construct a new Context comprising the file link or add the file link to existing Contexts following the procedures previously described.

When a document is received, to be read or been read, the crosslink database may suggest the topics and Contexts to the reader based on previous data in the crosslink database about the author or organization. When a document is cross-linked, the author/organization may be automatically added into the context(s) as a control type topic (ID topic). This ID topic is similar to a regular topic except it is not displayed in "Related Topics" and "Related Contexts" panels to avoid clutter. When any document is read, the crosslink database may automatically send this document's author or Organization ID topic to the inquiry and display to the user the related topics and Contexts that are ranked by access time. The more recent topics from the suggestion may be used to compare to the document properties (title, subject, author, manager, organization, categories, keywords, etc.) and the text body using "fuzzy text matching." The matching topics may be suggested to the user and highlighted in the document.

When a document is received, to be read, or been read, the database may suggest the recent topics and Contexts to the reader based on the "recent set of topics." The most recently accessed topics are inquired and used to compare to the document properties and the text body. The database engine may suggest to the user those topics that are found similar (using fuzzy text matching as previously described) and highlight the similar words in the document. The recent set of topics may come from the "most recent topic" table (previously disclosed), or from the round up of the topics in the "most recent Contexts" table (previously disclosed), or the combination thereof.

When a document is received, to be read, or been read, the database may suggest related content members which are recent to the user.

The author may also transmit a set of topics to the reader by inserting an XML tag, so that these topics may be automatically suggested to the reader, for instance, <crosslink="auto topics">topic 1, topic 2, topic 3, .</crosslink>. When the document is opened or saved, the crosslink database may detect these tags and parse the tag and present the topics to the user.

Similar mechanism for suggesting keywords, topics, Contexts, or other content members (for instance, other emails or documents, etc.) are also applicable to cross-linking emails, web pages, etc. The corresponding information components between a document and an email are as follows:

The author name: the 2nd party's (the sender for received emails or the receiver for sent emails) display name or email address.

The author's organization: the 2nd party's email address by removing @ and text in front.

Subject: Subject

Text body: text message

Manager: email identities in CC and BCC

Categories: email folder

The corresponding information components between a document and a web page are as follows:

Organization: Web organization (amazon.com, MSN.com, Google.com, craigslist.org, etc.)

Subject: title

Text body: text portion of the web page that are shown to the user.

Keywords: keywords

Construct or Revises Contexts

The inventive system enables the user to construct or revise information stored in the crosslink database. Two embodiments are illustrated herein. The focus for the first embodiment is graphical and visual. The focus of the second embodiment is to let the user see and manipulate what Contexts are to be affected before execution of a revision. The editing privilege may be available via a secure login or impersonation/authentication from operating system account login (for instance, MS Window).

The typical revision functions are as follows:

Crosslink content members (construct a Context);

Rename a topic of a Context;

Delete/add a topic relationship from/to a content member;

Delete/add a content member relationship from/to a Context;

Delete/add a topic relationship from/to a Context;

Delete a Context;

Merge two Contexts;

Trace relationships of a topic or content member.

To rename a topic member of a Context

1st EMBODIMENT

Figure 22:
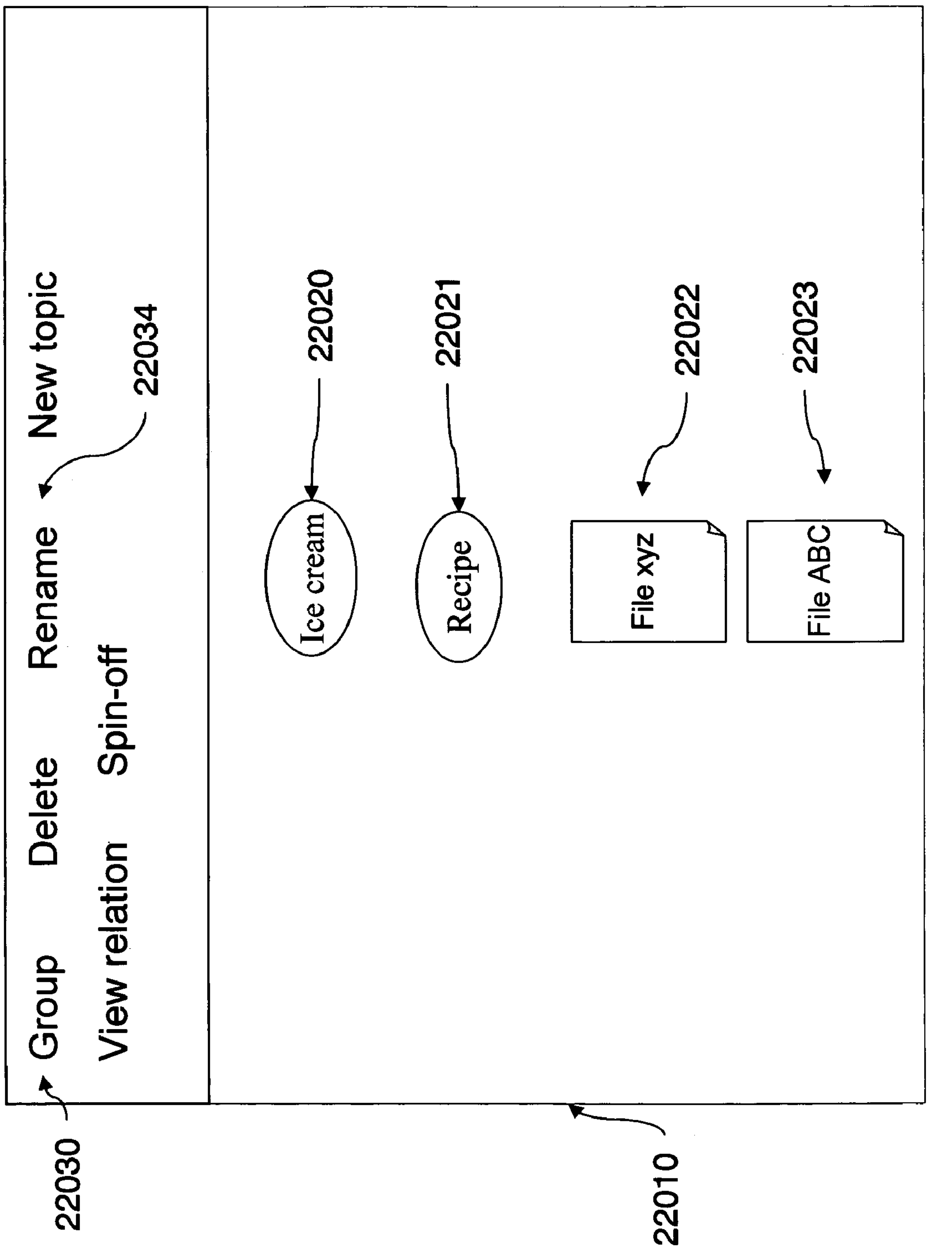
FIGS. 22-29 illustrate the user interface of how a user constructs or revises a Context on the crosslink database according to embodiments of the present invention.
Figure 23:
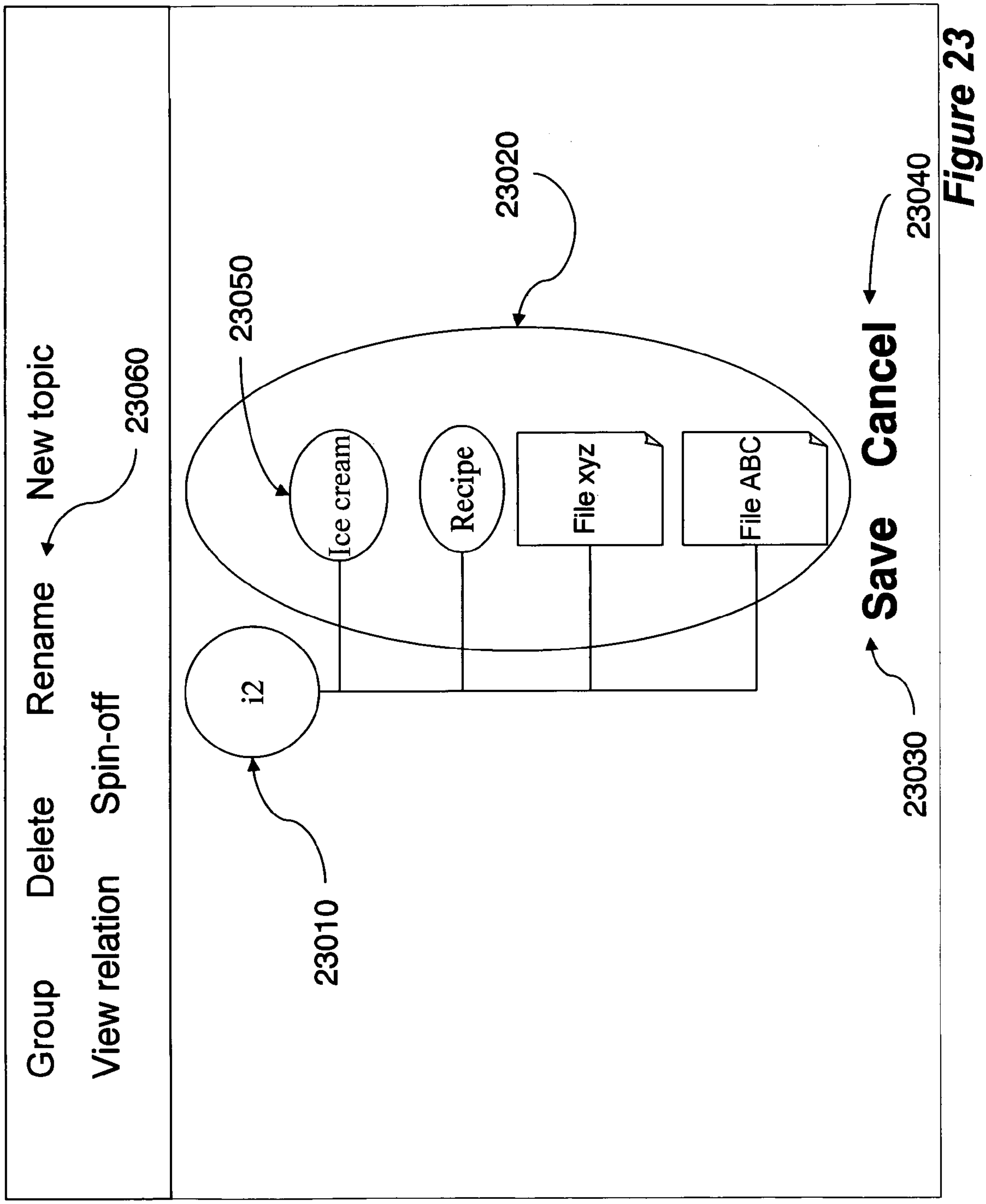

In the first embodiment, to construct a Context, the user may start from a content member(s) and associate topics with this content member to form a new Context. The user may click on any topic or content member then select the mouse menu item "sent to edit panel". An example is shown in FIG. 22 where two topics (22020, 22021) and two content members (22022, 22023) have been gathered in the "edit" panel 22010. To relate these 4 members, the user first selects the four members (by holding down shift key plus mouse clicks or mouse press and drag an area to enclose the 4 members) then clicks on "group" (22030). The database engine first checks whether any existing Context has exactly identical set of topics (matching same topics and same number of topics) as the new Context. If a Context preexists, the two content members will be merged into this Context. Otherwise, a new Context will be created. In either case, FIG. 23 shows the final outcome where the connections between the connecting node (23010) of this Context and the four members (23020) are displayed. The user can select "save" (23030) to accept the change or "cancel" (23040) to void the action. When the user saves the change, the connections between the Context node and topics, Contexts will be recorded in Table 110 (FIG. 10A); any new topics or content members will be recorded in associate table (for instance, table 111 (FIG. 10A), table 1027 for files/web page (FIG. 10B), table 1021 for database record in a file server.

Figure 24:
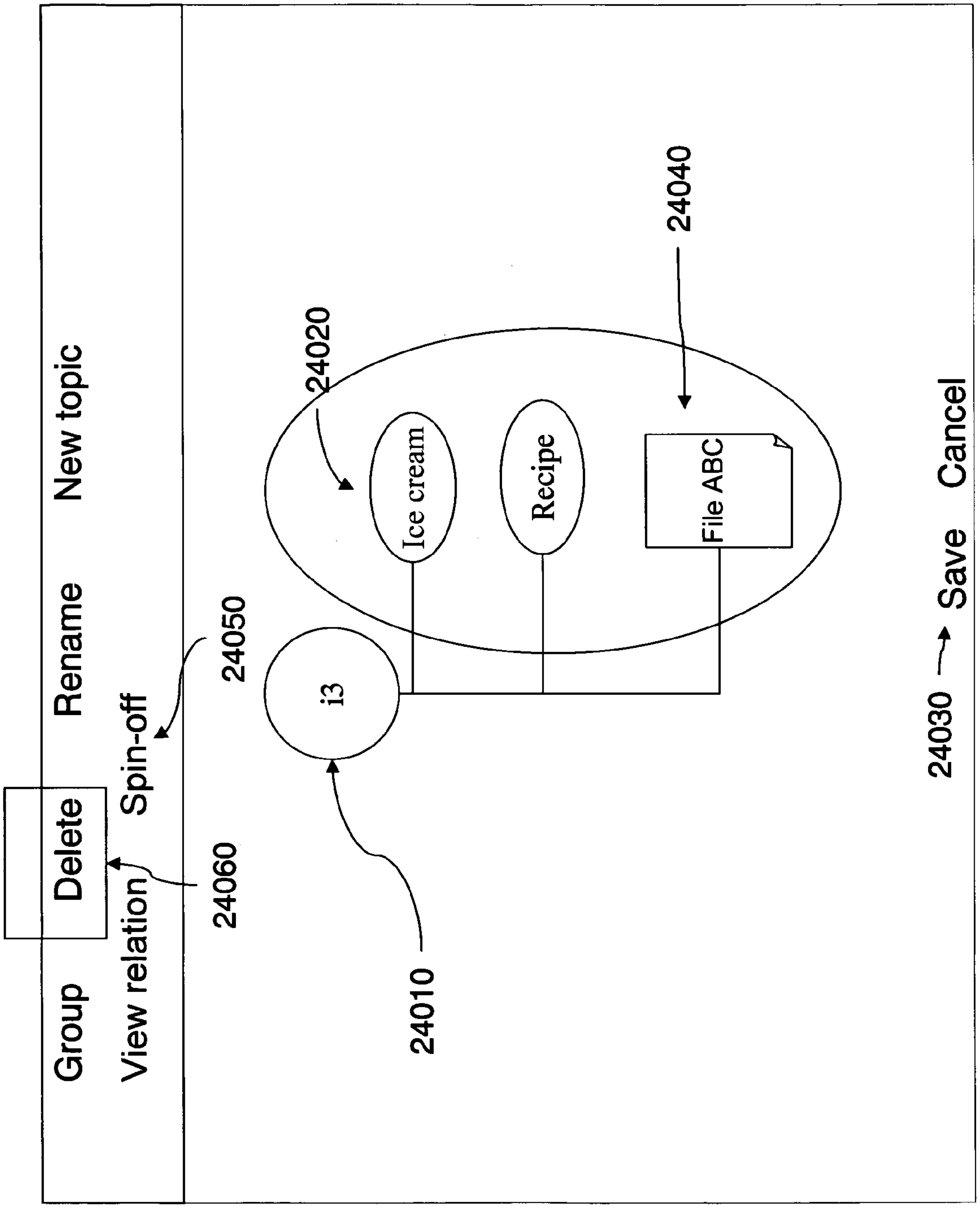

An option is provided to revise the topic set for a content member but not affecting the topic set for the rest of the content members in a Context. The user first selects the target content member and clicks "spin-off" (24050, FIG. 24) to separate the target content member from the rest of content members. The user in this example spins off "File ABC" (24040). FIG. 24 shows that a "temporary Context" 24010 is created that contains "File ABC" and the same topic set as the original Context (A temporary connecting node i3 is created to connect to "File ABC" and to all the topic set of the original Context.

The user can now work on this temporary Context without affecting the original Context until a final decision is made. The user can select any topic (24030) or the connection (24030) in the panel and click 24060 to delete its relationship from the temporary Context; in this case, the "recipe" topic is deleted. Note that only the connection between the topic and the connecting node is deleted, not the topic itself. If the user accepts this change, the database engine will delete the relation between the target content member ("File ABC") from the original Context in Table 110 (FIG. 10A). It then checks any existing Context that has exactly identical set of topics as the temporary Context. If yes, the content member will be merged into the existing Context (by establishing the connection between connecting node and the content members in Table 110). Otherwise, the connections, members' IDs and links will be recorded in associate tables for the temporary Context. The use can follow a similar procedure for adding a topic member to a content member in a Context, but not affecting the rest of the content members in the Context. A temporary Context containing the target content member is spun off from the original Context. The user then selects the temporary Context and other topics (pre-existing in the database or freshly created) in the edit panel, clicks the "group" operation (see 22030, FIG. 22). If the user accepts this change, the database engine checks any existing Context that has exactly identical set of topics as the temporary Context. If yes, the content members in the temporary Context will be merged into the existing Context. Otherwise, the temporary Context will be recorded as a new Context.

Figure 25A:
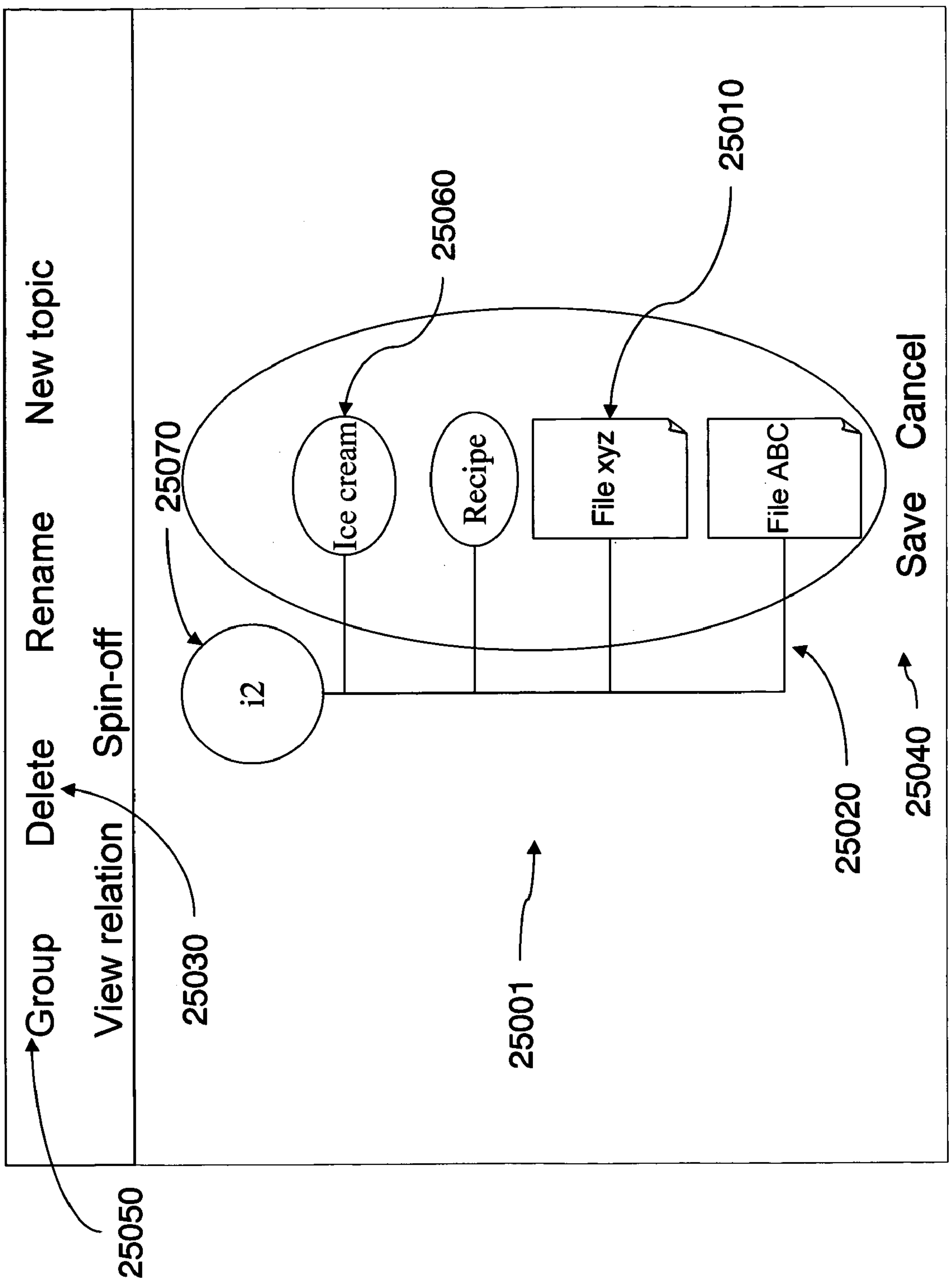
Figure 25B:
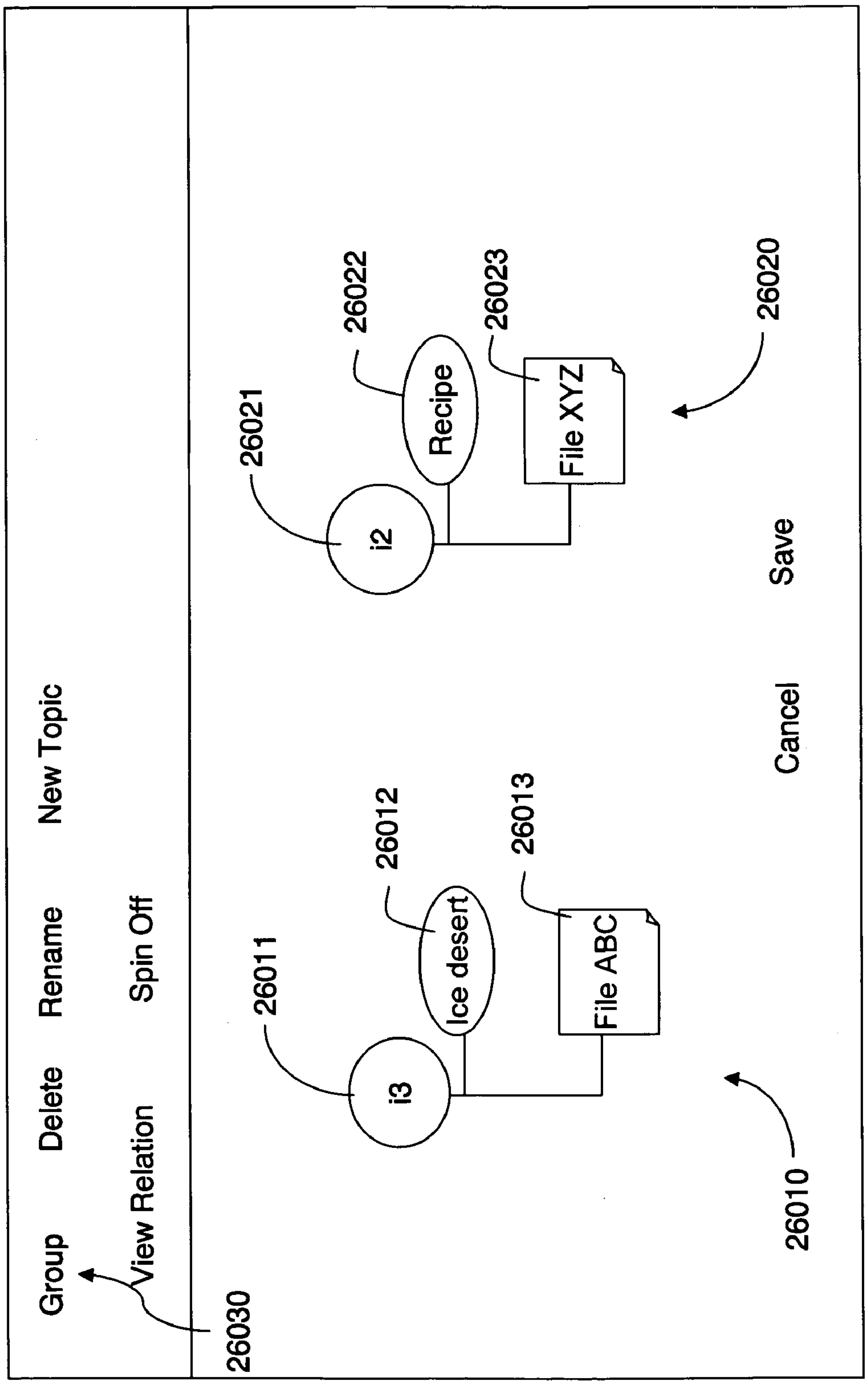

An example is shown in FIG. 25 for removing/adding a content member relationship from/to a Context. The user first selects the content member (25010) or the relation (25020) in the revision panel then clicks on (25030) to delete. When the user accepts the change, the database deletes the record in Table 110 (FIG. 10A) that establishes the relation between this content member and the Context. There could be situation that the remaining Context or the content member becomes meaningless. For instance, the Context is no longer containing any topics or the content member is no longer related to any Contexts. This will be taken care of by the "house cleaning" routine. To add a content member from a Context is very similar to removing one. The user selects the Context with the new content member, then clicks on 25050. When the user accepts the change, the database creates a new record in Table 110 (FIG. 10A) corresponding to the connection between this content member and the Context connecting node.

To remove a topic relationship from a Context the user selects the topic (25060 in the example in FIG. 25) then clicks on 25030 to delete it. When the user accepts the change, the database engine checks any existing Context that has exactly identical set of topics as the temporary Context. If yes, the content members of the temporary Context will be merged into the existing Context. Otherwise, the connection between the topics and Context connecting node is deleted.

To add a topic relationship to a Context, the user selects both the Context and the topic then clicks on 25050 (FIG. 25). When the user accepts the change, the database engine checks any existing Context that has exactly identical set of topics as the temporary Context. If yes, the content members of the temporary Context will be merged into the existing Context (by establishing the connection between connecting node and the content members in Table 110). Otherwise, the connection (in Table 110) between the topic and the Context is added.

To delete a Context, the user selects the entire Context or clicks on the connecting node 25070 then clicks on 25030. When the user accepts this change, the database removes all the connections between this Context connecting node and other Context members (in Table 110). After this operation a member may become meaningless. For instance, a topic or content member is not related to any Context or a connecting node is not connecting to any topics. The meaningless members (their IDs in the Universal ID table 111 or links in associate tables) and the meaningless connections will be removed.

FIG. 26 depicts an example of how to merge two Contexts. The user selects both Contexts then clicks on 26030 to group them into one Context. Two Contexts 26010 and 26020 are shown in the example that representing by the connecting nodes 26011 and 26021, respectively. The resulting Context is shown in 25001 (FIG. 25), where all the members are connected to one connecting node. If the user accepts the change, the database engine locates all the connections in Table 110 that corresponds to one of the connecting nodes, say 26011, and replaces the connecting node 26011 with connecting node 26021.

Figure 27:
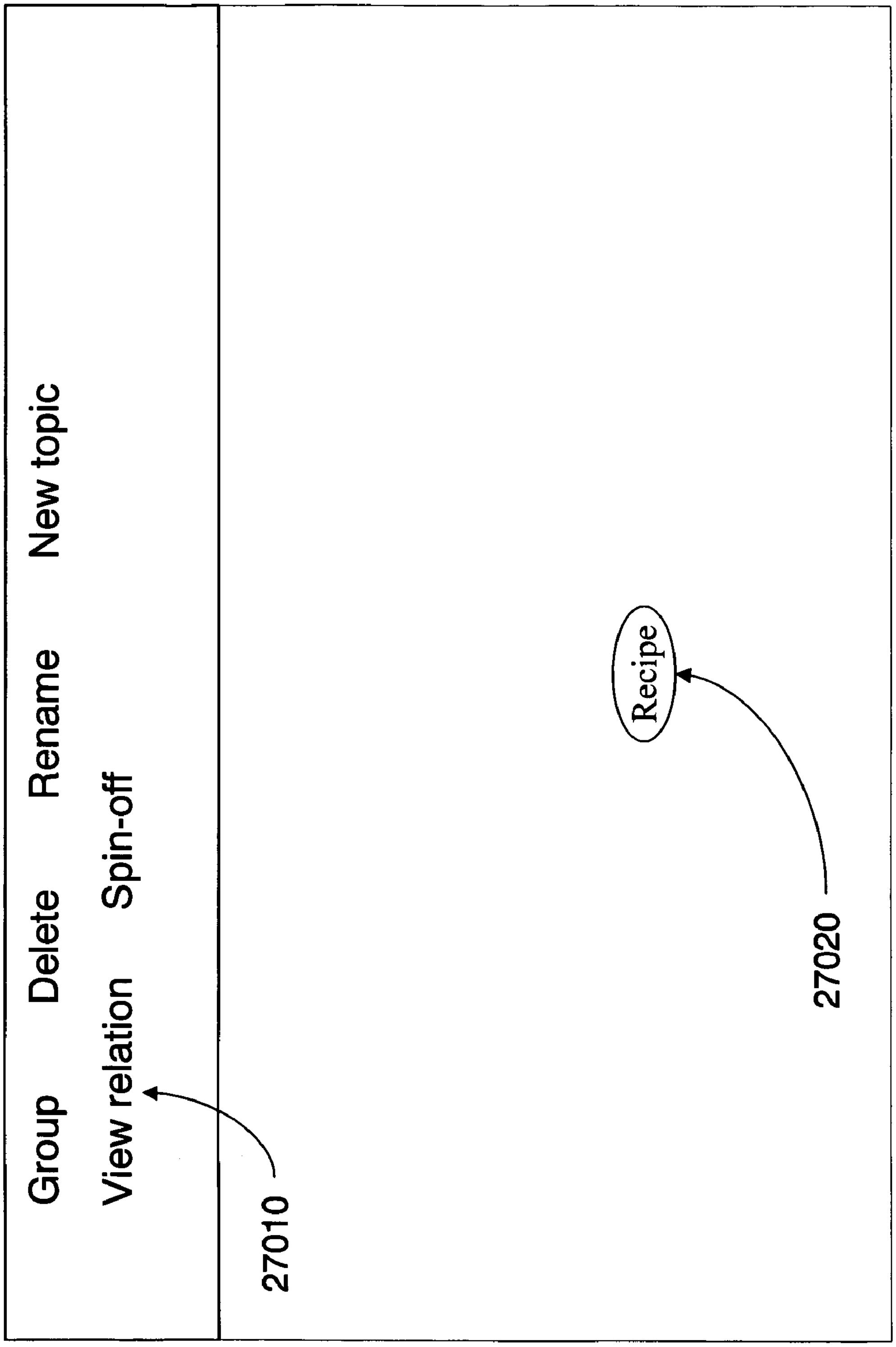
Figure 28:
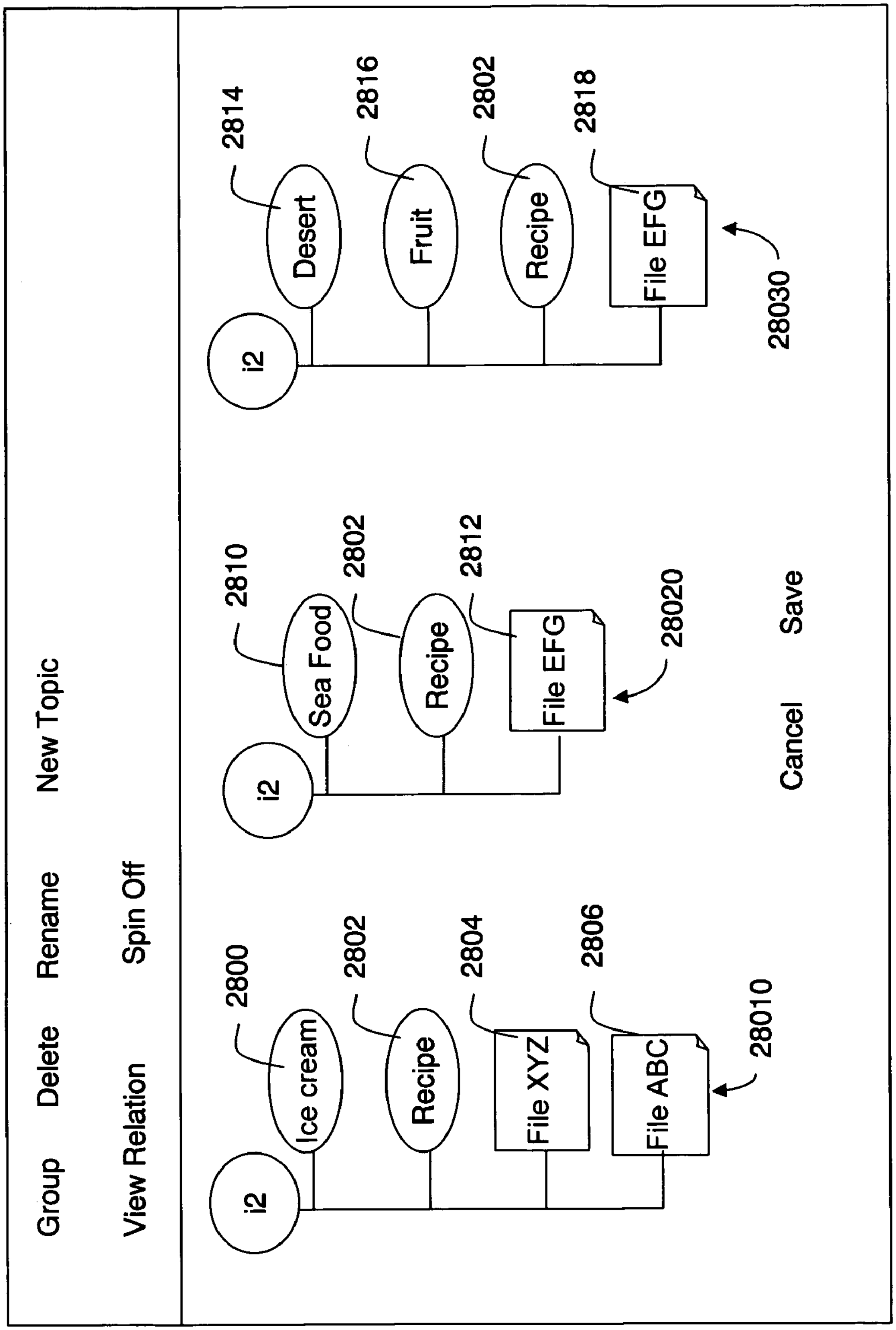

FIG. 27 illustrates an example of how to find the Contexts that are related to a topic or content member. The user first selects the member then clicks on 27010. The process for involving a topic or a content member is identical. In the example in FIG. 27, the topic 27020 is selected. The database engine first looks up for any records in 110 (FIG. 10A), field 142 that involves this topic's universal ID. It then extracts the connecting nodes from these records from field 141, and subsequently from the connecting nodes to all of the related Contexts. In this example three Contexts 28010, 28020, and 28030 are related to the topic "recipe", as shown in FIG. 28. The user can select any members from the results and traces down further if it is desired.

To rename a topic member of a Context, the user selects the topic in the edit panel then click on "rename" (23060, FIG. 23). The user can now strike over the to-be renamed topic with a new topic. In the example shown in FIG. 23 the user renamed "ice cream" (23050) with "ice desert". The database engine first breaks down the to-rename topic into individual keywords. In this case it ends up with "ice" and "desert" keywords. The database needs to check whether similar topics (to this new entry topic) already exist in the database. For each keyword in this topic, the database looks up in Table 8030 (FIG. 8C) to find similar keywords (based on "fuzzy text matching" previously discussed). In this example, a list of similar keywords for "ice" is stored in table A and a list of similar keywords for "desert" in table B. If more keywords compose of the topic, more corresponding tables will be created. Next the database goes to the Topic table 8020. It filters this table to find any records that contain at least one keyword in table A. It filters the filtered Topic table 8020 to find any records that contain at least a keyword in table B. It continues for each similar keyword table. In the end the qualified records after the filters are obtained. From these records the database extracts the topic connecting node IDs, representing a set of topics that are similar to the new topic given by the user.

The user may select a pre-existing topic among the similar topics for the new topic or insist to use the freshly created topic. If the preexisting is selected, the topic ID will be connecting to the Context connecting node. If the fresh new topic is selected, the database checks whether each of its associated keyword preexists (exact match here, not using "fuzzy text matching") in Keyword table 8030. If a keyword does not exist, it will be created. In this case "ice" has already existed but not "desert". A new keyword "desert" is created.

To update the new topic for the Context, the connection between the connecting node 23010 and topic 23050 is replaced with a new connection between the connecting node and the topic "ice desert" (represents by its global ID). If the user accepts the change by clicking on "save," the database engine will keep all changes in the database. Otherwise, the state of the connection table 110 before the revision is restored. In this case, it is possible that a fresh new topic was created and became meaningless. This topic will be cleanup later by the "house cleaning routine". It could be a concern that the keywords in the replaced topic or the topic itself could be meaningless. For instance, these keywords may no longer relate to any topics. In this case, they will be flush out by the "house cleaning" routine. The other concern is whether renaming a topic disrupts other Contexts. The answer is no because the renamed topic is left untouched for these Contexts.

Figure 29:
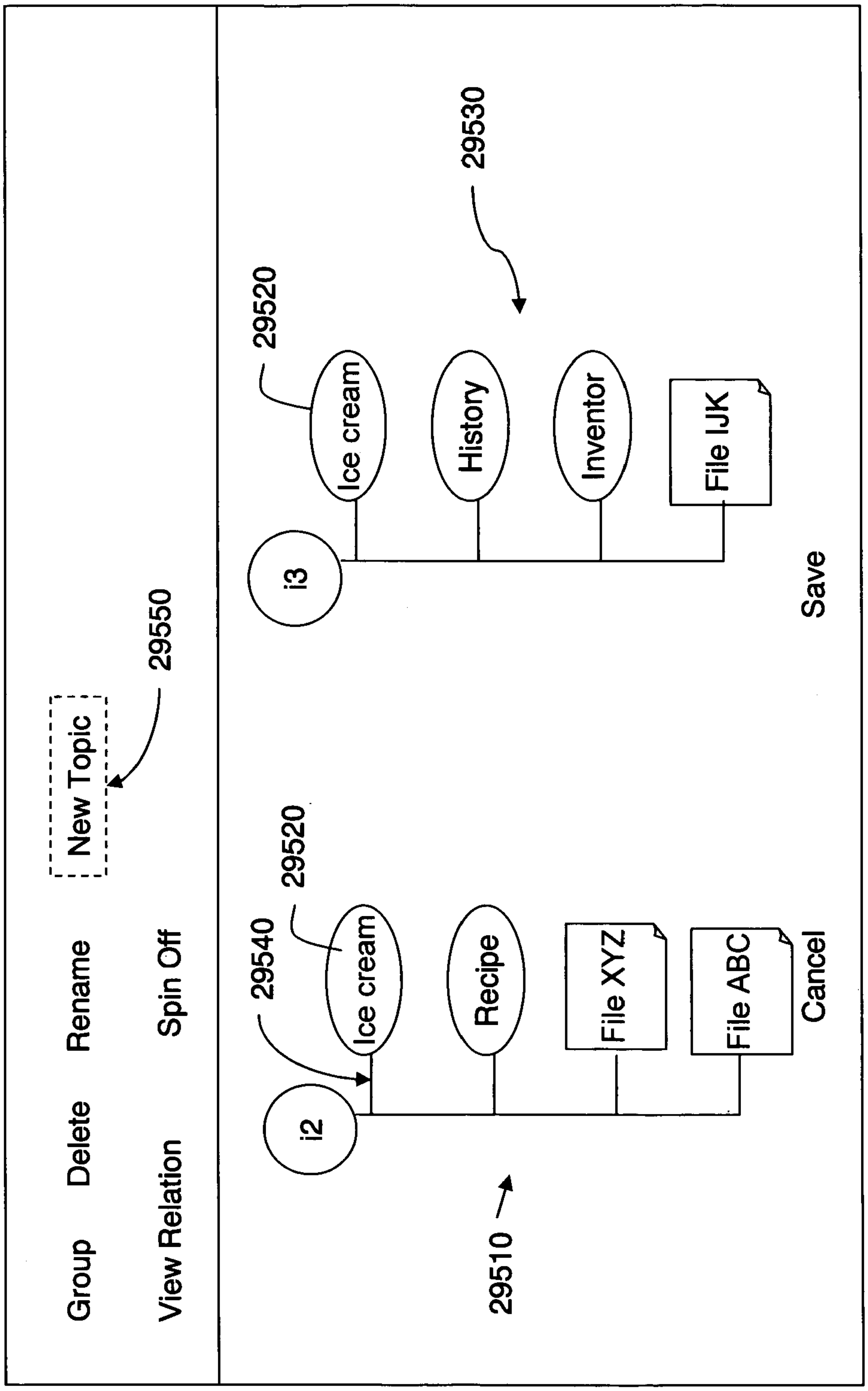

If a topic is related to several Contexts, the user may wish to rename the topic for certain Contexts but not for the others. First the user needs to trace all Contexts that are related to this topic. An example is shown in FIG. 29, where the topic "ice cream" (29520) is a member for both Contexts 29510 and 29530. If the user wants to rename "ice cream" for Context 29510 but not for 29530, the user needs to first select and delete the topic "ice cream" relationship from Context 29510 then clicks on 29550 to add a new or preexisting topic. The user can then group the topic with and the Context.

$2^{nd}$ EMBODIMENT

Another embodiment for constructing or revising the Contexts in the crosslink database is disclosed next. One of the objectives is to let the user clearly see the impacts on existing topics, content members and Contexts before a revision is made. Note that this embodiment is particularly effective when the relationships between these members become large and complex. One of the objectives is to address a common issue encountered in the prior art folder tree structure. In order to reflect the interrelated relationships between content members and folders, in the prior art system a file- or folder alias may be place in several folders. However, it is not easy to see this complex inter-relationship in the prior art system. For instance, when a folder name is renamed to reflect a reorganization of the tree structure, if this folder is aliased in multiple other folders, the new name is not updated for its alias. It is tedious to find all the alias folder and decide whether to update them with the new name.

When a revision action is taken, its influence may be previewed in the crosslink database system, as illustrated next. The Contexts being affected by the revision are those listed in the "Related Context" panel (310*a*50, FIG. 30 or 51040, FIG. 15B) with their corresponding checkbox (310*a*51, 310*a*52) checked. Similarly those qualified content members listed in "Related Content" panel 15070, FIG. 15 or 51050, FIG. 15B) will be impacted. The user may place the cursor on an operand (a topic, a Context, or a content member) and then select a mouse menu item. In the menu, the user may pick one of the following basic operations. Note that more complex operations that consist of a combination of these operations can also be added in the menu for convenience.

Figure 31:
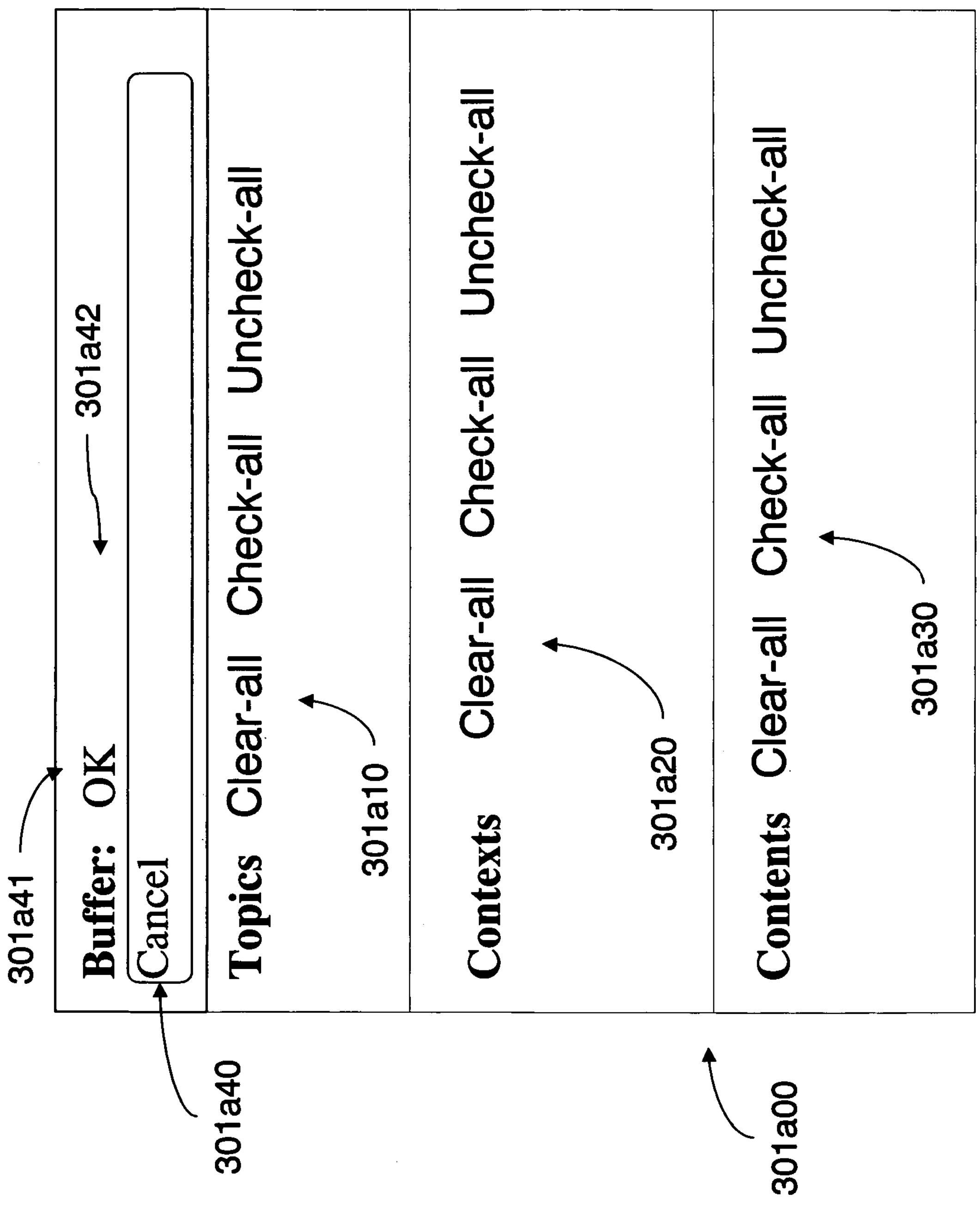
FIG. 31 illustrates the user interface of how content information is stored in a buffer for Context construction according to various embodiments of the present invention.

Examples of Basic Operations:

"Copy" (or by pressing the control- and the c key): The selected operand identified by the cursor (in the Related Topics panel, Related Context panel, Content Member panel, or the Revision panel, see FIGS. 14 or 15B) is placed into a buffer 301*a*00, FIG. 31. Each operand has an associate checkbox.

"Delete" (or by pressing the delete key): The user may only operate on any operand in the revision panel (14010 in FIG. 14 or 51020 in FIG. 15B) that with their check box checked. The operand relationship will be removed from the checked, qualified Contexts shown in the Related Context panel (14030 in FIG. 14 or 51040 in FIG. 15B). This operation is not available if no qualified Contexts are selected (checked).

"Delete content origin": When select this operation, relationship between this content member and selected Contexts are removed. In addition, it removes the origin of the Content itself if the user is authorized. It may operate only on any content in the revision panel. that with their check box checked. This operation is not available if no Contexts are selected (checked) in the Related Context panel.

"Add/New topic": The user can add the relationship between a new or preexisting topic and the checked Contexts; the details have been previously discussed. The user may key in the intended topic in a dialog box or into the Find/Add topic entry field (15060 in FIG. 15A or 51010 in FIG. 15B). During entry the system compares the new topic with any existing topics in the database. If there is an exact match it will use the existing topic. Otherwise, it suggests other similar topics (using "fuzzy text matching") in an menu (13100 in FIG. 13A or 52010 in FIG. 15C) for the user to select. The user may select an existing topic from the suggestion or select the create new menu itme to insist on the new topic. In either case, the topic will be added into any checked, qualified Context that appears in the Related Context panel. This topic is also submitted to the revision panel.

"Rename a topic": Two operations are involved in this scheme: the system first adds the new topic relationship from checked Contexts using "Add/new topic" operation (if it exists, the existing topic will be added into the Context), then use "Delete" operation to remove the old-name topic relationship from the checked Contexts. This operation may be only available to operands listing in the revision panel that with their checkbox checked. This operation is not available if no qualified Contexts in the Related Context panel are checked.

"Rename a content member": This operation simply rename the "description" associate with the content link. It does not alter the link or the content member itself. This operation may be available for operands listing in the revision panel.

"Paste" (or control and the v key are pressed): The buffer window 301*a*00 (FIG. 31) automatically pops up and waits for the user to select operands in this panel (by checking the checkboxes). The selected operands will be added into any cheeked, qualified Contexts that appear in the Related Context panel. A dialog box will pop to remind the user how many Contexts will be affected and wait for the user to confirm. The operands will be submitted to the revision panel if the user confirms the operation. In case of no Contexts are checked, the operands are placed in the revision panel.

"Group": This operation constructs a Context that consists of all the checked Topics and/or checked content members in the revision panel. It needs at least two different members in the panel and among which at least one is a topic. If meets the requirements, the database engine executes the "group" operation and checks whether an existing Context contains identical set of topics as the topic set in the temporary Context. If it does, all the content members are merged into the existing Context. Otherwise, a new Context is created to relate all the topics and content members. In either case of new or existing Context, the final Context is displayed in the Related Context panel with its checkbox checked.

"Join Contexts": The selected operand identify by the cursor (in the Related Topics panel, Related Context panel, Content Member panel, or the Revision panel) is added to the members of the check Contexts.

Examples of Combination Operations:

"Cut": This operation executes the "Copy" then the "Delete" operations on an operand. The selected operand is identified by the cursor on any items in the Related Topics panel, Related Context panel, Content Member panel, or the Revision panel.

Since the same "Inquiry" panel is used as a buffer for inquiry and revision, it needs to be apparent to the user whether the user is making an inquiry or revision operation. Whenever the cursor is in this panel (whether on an operand or not) and one of these revision operations are selected and at lest one of the related Contexts are checked, the text "Inquiry" is replaced with "Edit" and the panel (13320, FIG. 13C or 51020, FIG. 15B) background changes color. This is to give the user a visual reminder that the user is about to revise the crosslink database (in contrast to an inquiry that makes not changes on the database). If any Context in the "Related Contexts" is affected (check boxes for the Contexts are checked) by the revision, the panel (13330, FIG. 13C or 51040, FIG. 15B) background also changes color to remind the user the operation is about to affect some existing Contexts. In contrast since no inquiry can have any impact on the crosslink database, the user can be less of concern for the user's actions.

Figure 30:
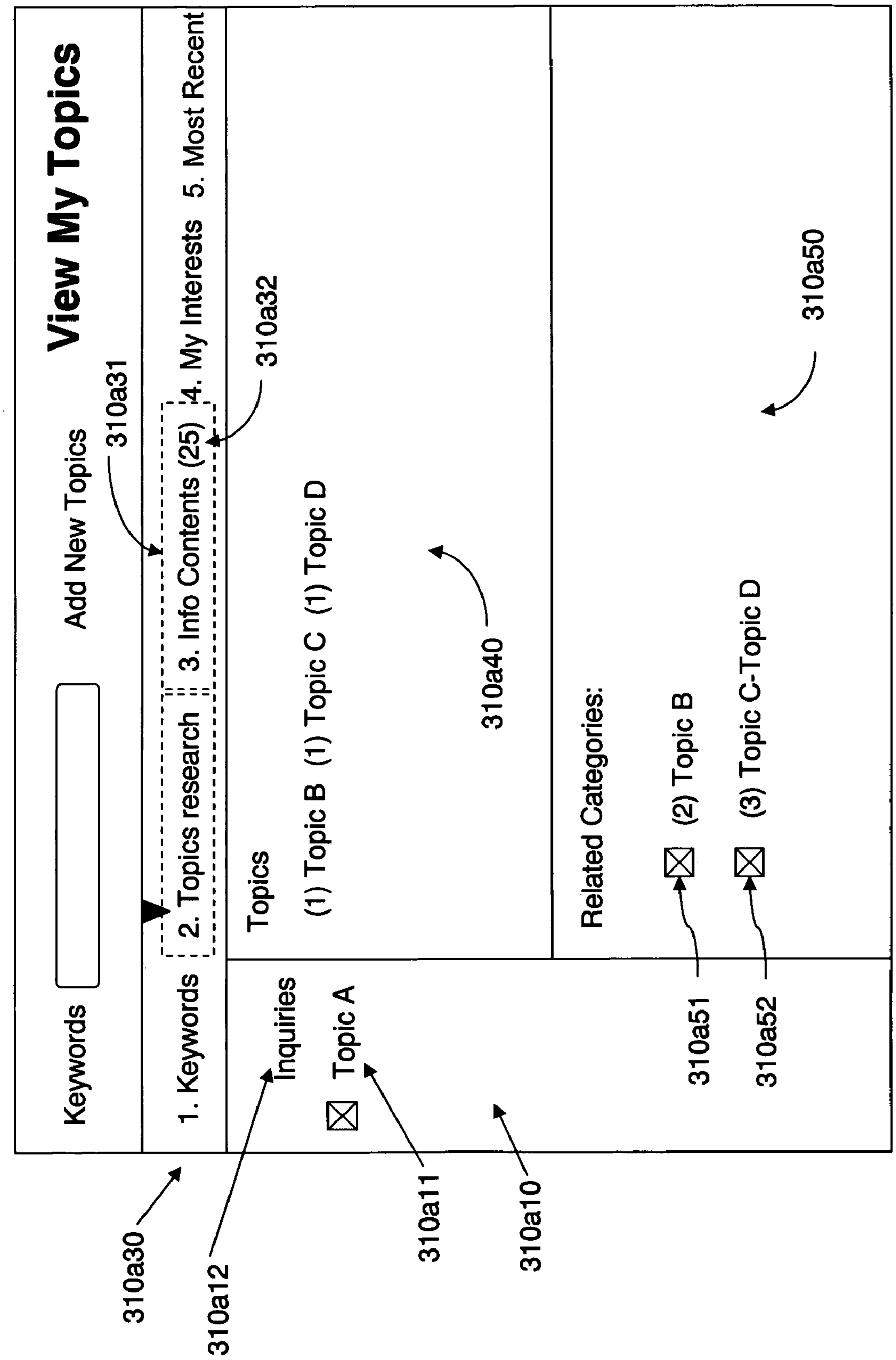
FIG. 30 illustrates the alternative user interface of how a user constructs or revises a Content on the crosslink database according to various embodiments of the present invention.
Figure 32:
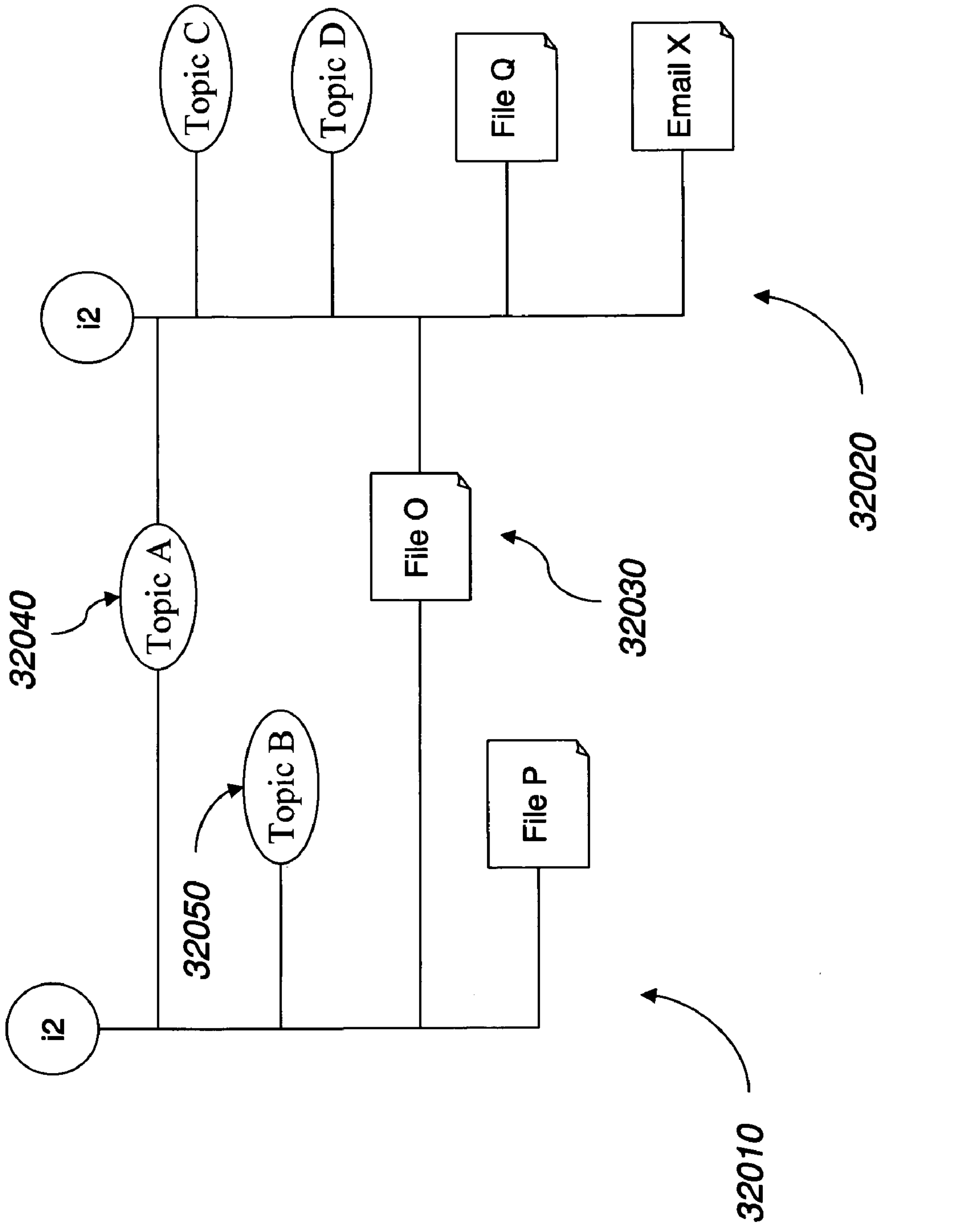
FIG. 32 depicts a crosslink data structure to illustrate various features of the crosslink database according to various embodiments of the present invention.

To help in explanation, we will use the scenario shown in FIG. 32. Two Contexts 32010 and 32020 are as shown in FIG. 32. Context 32010 has two topic members and two content members. Context 32020 has three topics and three content members. They share a common content member "File O" (32030) and a common topic member "Topic A" (32040). When inquiring about "Topic A", the outcome is as shown in FIG. 30. The two qualified Contexts 310*a*51 and 310*a*52 are shown in panel 310*a*50. Here we will use this GUI example.

When the user decides to delete the relationship of a topic from a Context, the user first may need to submit the topic to the Inquiry/Edit panel 310*a*10, FIG. 30 because only in this panel a topic relationship may be deleted. This requirement ensures that the user inquires and reviews what Contexts may be related to this topic (in Related Context panel 310*a*50), whether the topic needs to be deleted from multiple Contexts, whether the deletion will break the ties between these related Contexts, etc. The user needs to be aware of the impact of deleting this topic relationship before execution. Assume "Topic A" relationship is to be deleted. The user first submits it to the panel, place the cursor on "Topic A", and select the "Delete" operation from the mouse menu. "Topic A" is removed from both of the Contexts 310*a*51 and 310*a*52 since both checkboxes are checked. If the user wants to keep "Topic A" in Context 310*a*52, for instance, the user needs to uncheck checkbox 310*a*52 before the delete operation. On the other hand, if "Topic B" is to be deleted, only Context 320*a*51 could be affected because "Topic B" is not a member of Context 320*a*52. The user can clearly see this because this Context does not appears in panel 320*a*50 at the time of "Delete" operation.

Suppose the user wants to rename "Topic A" with "Topic D." The user first submits "Topic A" into panel 310*a*11 (FIG. 30) and become aware of the two Contexts that are related to Topic A. The user clicks on "Topic A", place cursor on it, then select the "Rename" operation. A panel, the same as that used in the "Add/New topic" operation, pops up. The user enters "Topic D". The system checks whether any topic similar to "Topic D" has already existed (using "fuzzy text matching"). Any similar topic will be shown for the user to choose. If no topic is chosen and "Topic D" does not exist in the database, "Topic D" will be created. In any case, the system then executes "Copy" operations on "Topic D" then "Paste" operation into the checked, qualified Contexts shown in panel 310*a*50. Next "Topic A" is "Deleted" from the checked Contexts. Since two Contexts are present and checked in panel 310*a*50, "Topic D" replaces "Topic A" in both Contexts. If the user wants to keep "Topic A" in Context 310*a*52, for instance, the user needs to uncheck checkbox 310*a*52 before the "Rename" operation.

Figure 33:
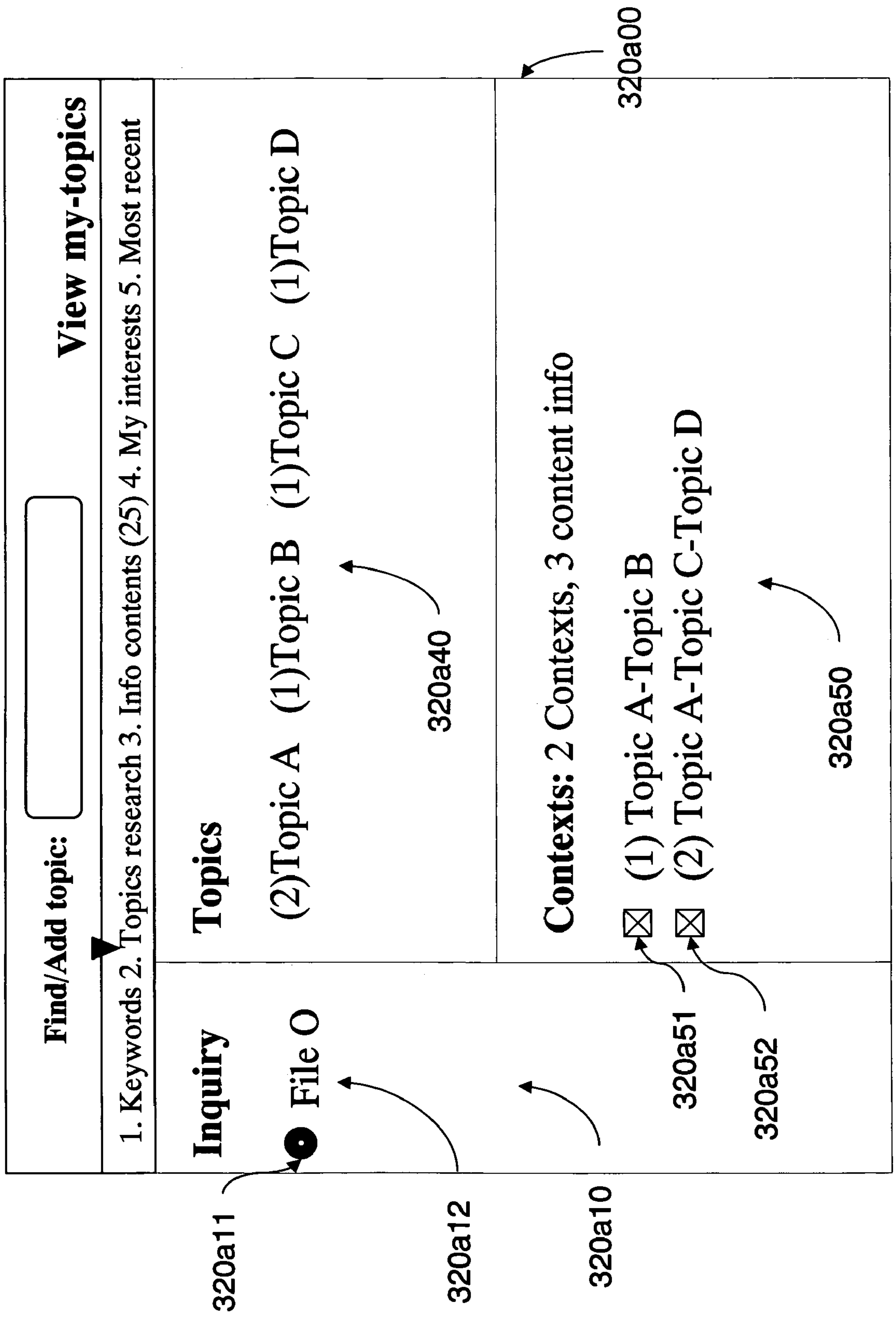
FIGS. 33 and 34 depict user interface screen to illustrate various features of the crosslink database according to various embodiments of the present invention.

To revise a content member, the first step is to submit the content member to Panel 320*a*10 (FIG. 320*a*). In the example shown in FIG. 33, an icon (320*a*11) next to the "File O" indicates it is a content member. Place the cursor on 320*a*11 and select "Rename" operation, a textbox pops up where the description of this content is filled in and can be revised. The filename after this operation is not affected. Only the file description is changed. To remove the relationship between this file and selected Contexts, select "Delete" operation from the mouse menu. If the user wants to keep this file in Context 310*a*52, for instance, the user needs to uncheck checkbox 310*a*52 before the "Delete" operation. To add a content member, the user goes to content panel (16021, FIG. 16 or 51050, FIG. 15B) and place the cursor on the content member, select mouse menu item "Copy" and "Paste" (or select "Add to Contexts" operation). The content member will be added into the checked Contexts. To delete the file origin and link from the database, the user can select "Delete content origin".

To create a new Context, the user submits one topic member and at least one other member (assuming one content member in this example) to panel 310*a*10 then selects "group" from the right mouse button menu. For instance, "File O" and "Topic A" are already in the inquiry 320*a*10. If the user selects "group" operation, the database engine checks whether a Context consisting of only "Topic A" has existed. If it does not, a new Context is now created with "Topic A" and "File O" as its members. If such a Context exists, "File O" will be merged into this Context. Note that Any Contexts related to both "Topic A" and "File O" will be shown in panel 310*a*50. The user can clearly see what has existed before the operation.

Whether content members are present in the inquiry panel or not, the operation is the same for adding, renaming or deleting a related topic. The topic needs first to be submitted to panel 320*a*10. The rest of the procedure is the same as what has been disclosed.

Figure 34:
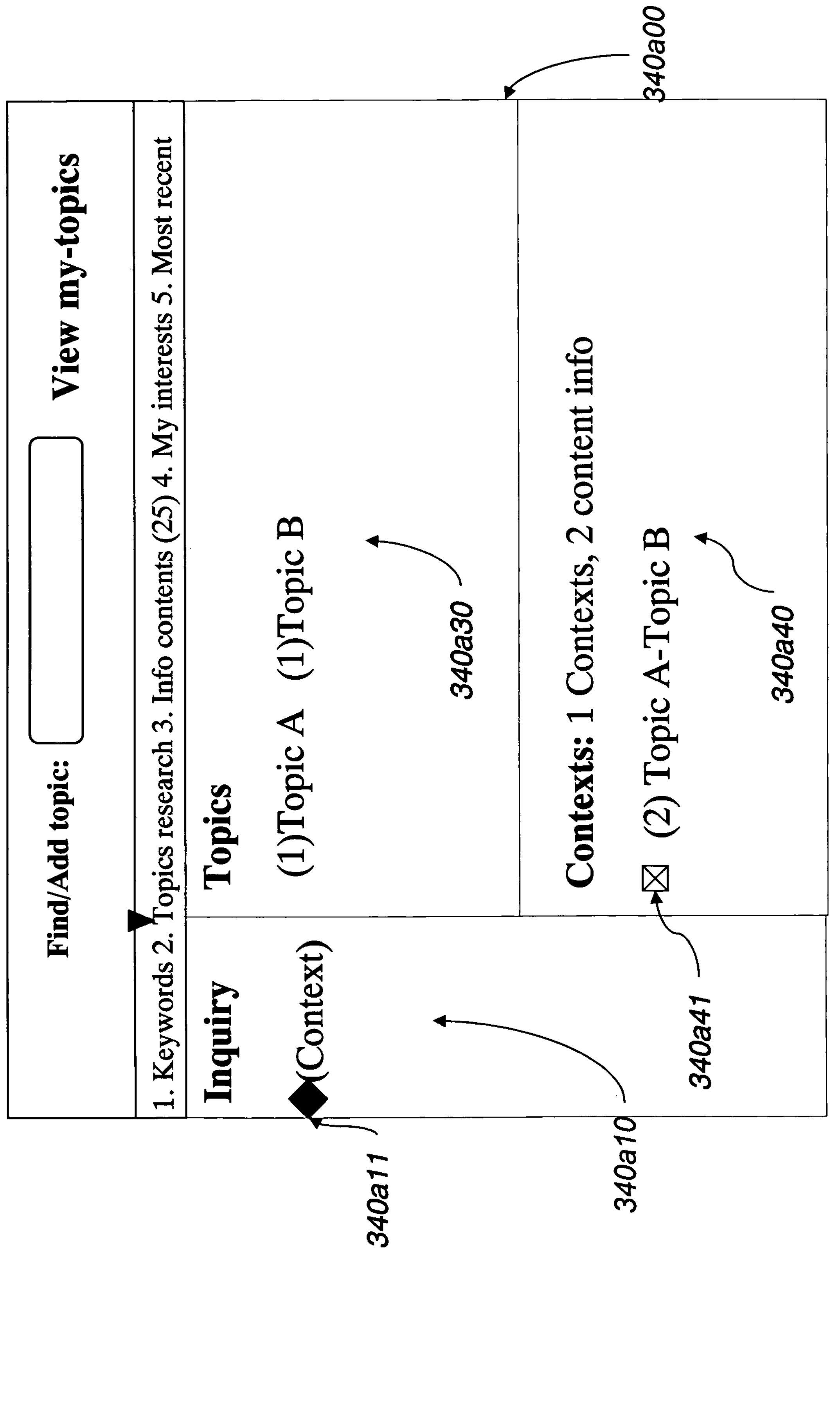

To delete a Context, submit the Context to Panel 340*a*10 as shown in FIG. 34. Because the connecting node ID is submitted to the inquiry, the Context will be the only qualified item in Panel 340*a*10. Therefore this operation may not require checking the Context checkbox. Note that the icon 340*a*11 represents the entire Context. Click on 340*a*11 then "Delete" operation to delete the connections between the Context connecting node and the rest of the members. The individual members themselves are not affected. Therefore this operation does not affect other Contexts. There will be situation that some topics or content members may become meaningless after this operation. These members will be clean up by the "house cleaning" procedure afterward.

It is convenient and habitual for users to save multiple files into one folder. The system allows users to create a folder-Context alias that the folder is in fact a representation of a set of Contexts. This "folder" icon is the GUI to manage input and output of content members related to the Context. When double clicking on the disguised folder, all the content members are shown like that of content panel 15070 in FIG. 15A or 51050 in FIG. 15B but with addition of look and feel of the conventional OS older. The content members listed are from the collection of multiple Contexts. When dropping or deleting content members (only content types) into the "folder", they automatically become the members of these Contexts (equivalent "Paste" the content members into these Context). When clicking on a content member, it opens the content member with its default-designated application just like in a folder. To create a folder-Context alias, check the checkbox of Contexts and select the mouse menu item "folder alias". The content members of the Checked Contexts are now viewable and accessible from this folder; the add or delete of content member members in this folder will replace to these Contexts as well. The Context-folder icon can be placed on the desktop or in a conventional folder-type structure. When the user double clicks this icon, it launches the crosslink database function instead of calling the traditional OS folder function. The pre-arranged topics and/or content members are submitted to the inquiry and the outcome of the related content members is shown to the user. By passing the command (and the content link) to the operating system, the user can open, copy, delete or cut a content member in this "folder" just like in a conventional folder.

Figure 35:
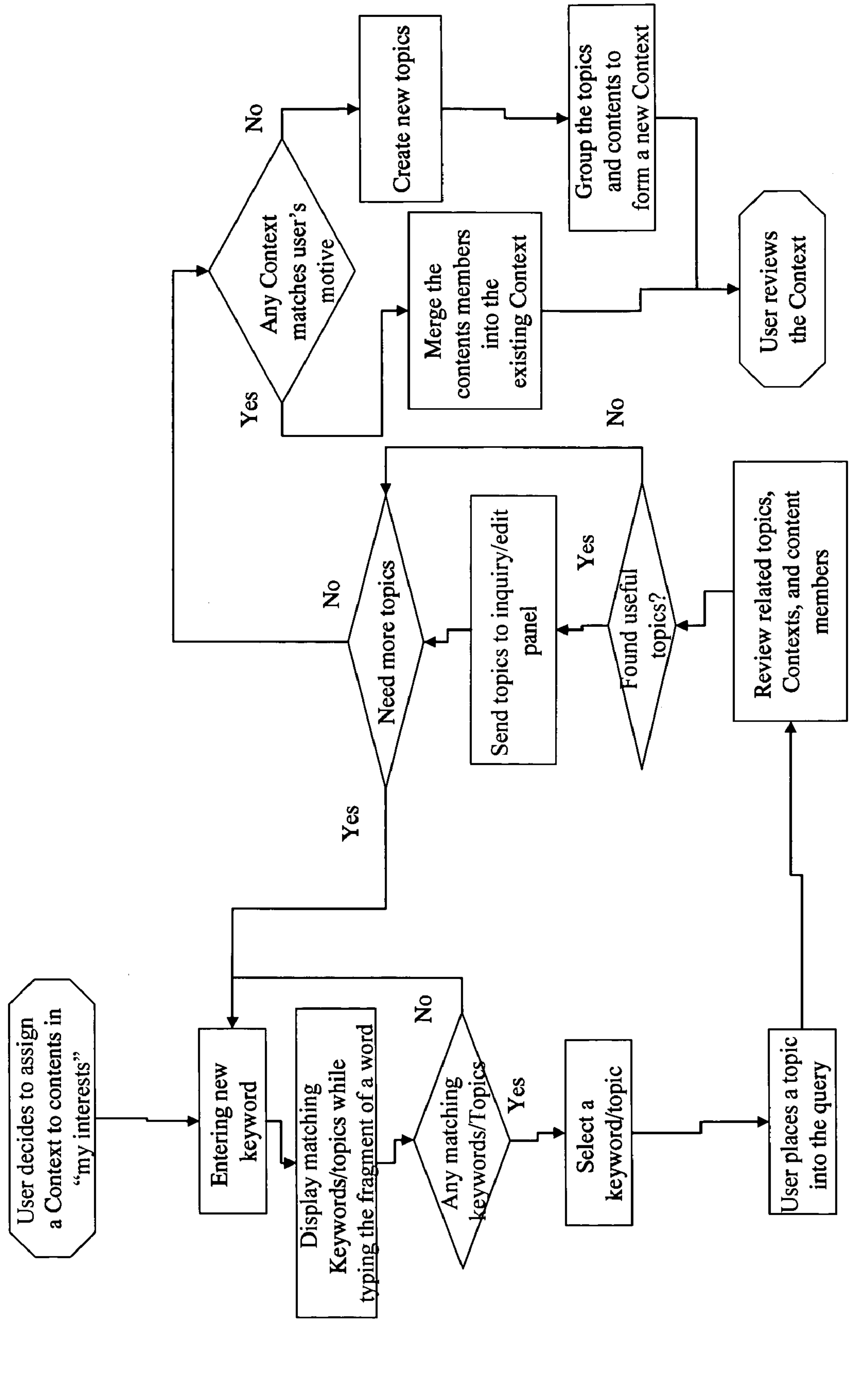
FIG. 35 is a flow chart illustrating various features of the crosslink database according to various embodiments of the present invention.

When the user collects a set of content members (from various other Contexts) into "my interests" as that shown in FIG. 16 or 18, the user often has an objective in mind. It will be beneficial to group them into a Context so this set of content members can stay grouped and be recalled in the future. To do this, check the content members then select mouse menu "Copy", all the checked content member links in 16021 are placed into the buffer. The user can select a new or identify an existing Context then "Paste" these members to that Context. A rather self explanatory flow chart for these operations is provided in FIG. 35.

When the user deletes a topic or a content member from a Context or the entire Context itself, it merely removes the connections (delete the corresponding record in Table 10010, FIG. 10) between the Context connecting node and the member. In other words, the universal ID of the topic, Context connecting node or content member and associate tables are not affected. Whenever a Context's topic members are revised, the system automatically checks whether the revised topics set are identical (same topics and same number of topics) to those of another Contexts. If yes, the content members of the revised Context are merged into the existing Context. There could be a situation that after the revision operation some keywords, Contexts or content members become meaningless. The "house cleaning routine" will remove these dead leads. To avoid the database being cluttered by meaningless data due to deletion of topics or content members, the database may routinely executes "house-cleaning" procedures or the user may initiate such execution. In addition, before displaying any keywords, topics, Contexts, or content members to the user, this procedure may be called to filter out meaningless members.

The definitions for meaningless data (members) and actions may be a combination of the following items based on application needs:

1. A keyword is not related to any topic. Action: delete the keyword record from the Keyword Table (e.g., Table 8030 in FIG. 8C);
2. A topic is not related to any Context. Action: delete all the records associate with this topic in the Topic Table (e.g., Table 8020 in FIG. 8B) and the topic's universal ID record from the Universal ID Table (e.g., Table 111 in FIG. 10A). Follow up action of checking meaningless keywords may follow.
3. A Context contains no topic (optional for certain applications). Action: Delete all the connections associate with the Context connecting node in the Connection Table (e.g., Table 110). Remove the connecting node's universal ID record from the Table (e.g., Table 111).
4. A content-information is not related to any Context. Action: Remove the content information's universal ID from the Universal ID Table (e.g., Table 111) and the associate table that records the content information (For instance, a table is used to record files path and web links).
5. A Context contains no content information (optional for certain applications). Action: Delete all the connections associating with the Context (connecting node) in the Connection Table (e.g., Table 110).

Note that the sequence of executing the actions are important for best results. It is best to clean up Context first, then topics or content members before keywords.

System Architecture Example

Figure 36A:
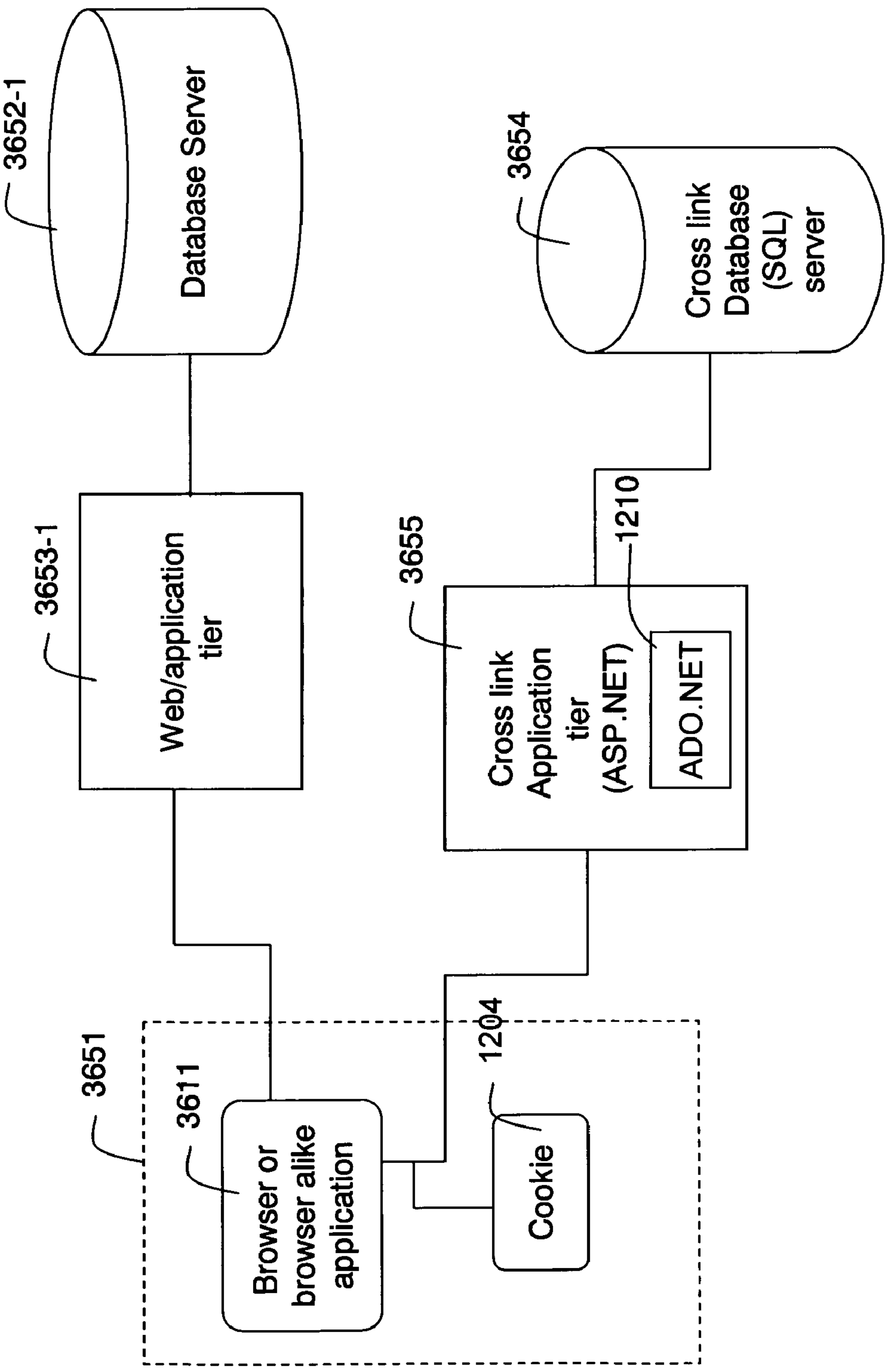
FIGS. 36A and B are a block diagram illustrating a system architecture according to various embodiments of the present invention.

To link information residing in computers scatters over the internet, an embodiment for the system architecture is shown in FIGS. 36A and B. It consists of a client 3651 and at least a sever 3652-1 or a computer 3652-2 and a database server 3654. Note that 3652 and 3654 may happen to reside in one machine. The crosslink database resides in sever 3654, where the unstructured portion of the information is handled. The element 3652 may be a conventional database server, a file server, a search engine server, a web server, an application server, an application computer that responses to inquiries, or even another crosslink database server, etc. For instance, a file is store in a file sever, where every file is classified by a conventional database according to its filename, file path, file size, creation date, and revision date, etc. In case of a web page (like the one in FIG. 17), it is stored in a web server, where every web page is a file stored in a folder structure. The web pages stores in a folder structure similar to that of a file server. In case of a conventional database, the sever link and the inquiry are stored instead of a web link or file path. In case of an application inquiry (e.g. MS Outlook), the function call to the application program interface (API) and parameters are stored. Server 3652 can also be for another crosslink database, but it will be discussed separately due to the added complexity.

Figure 36B:
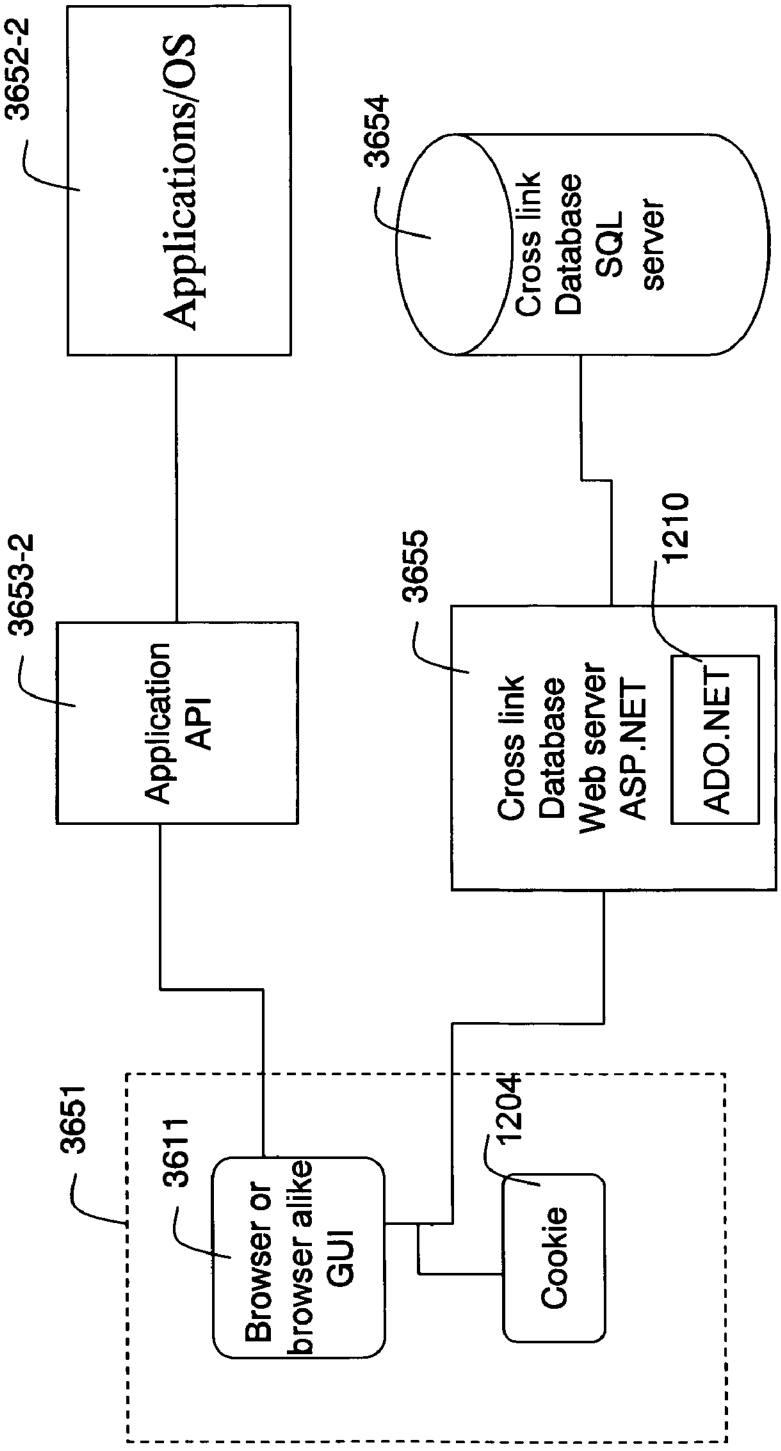

Two examples are shown in FIGS. 36A and 36B for two different architectures, where a database server is involved for the former and an application in local computer is involved for the latter. The user interacts with the GUI, which, in this example, is a web browser or browser like application 3611. In FIG. 36A, the communication between the browser 3611 and server 3652-1 (FIG. 36A) is by sending, e.g., XML and HTTP-protocol (web page) messages to the application tier 3653-1. In FIG. 36B, the communication between the browser 3611 and the application is by API 3653-2. The communication between the browser 3611 and server 3654 is by sending, e.g., XML and HTTP-protocol messages to the application tier 3655. The communication between the database servers and their application tiers is via, e.g., SQL and/or XML. For the application of cross-linking files on the user' local computer, 3654 and 3651 may be located on the same computer. It is desire for the user to launch the content information by clicking it. However, it is tricky for a browser to gain privilege for accessing files. Microsoft.Net Frame work 2.0 enables the browser like client to impersonate the browser or its browser like application (using the operating system login identity) in order to gain such a privilege. Since the server and the local PC happen to be on the same machine in this case, it addresses this issue. Implement using standard OS (none browser) GUI can eliminate a lot of this complexity but need more work in accessing data over the network.

Notebook Example

Figure 37A:
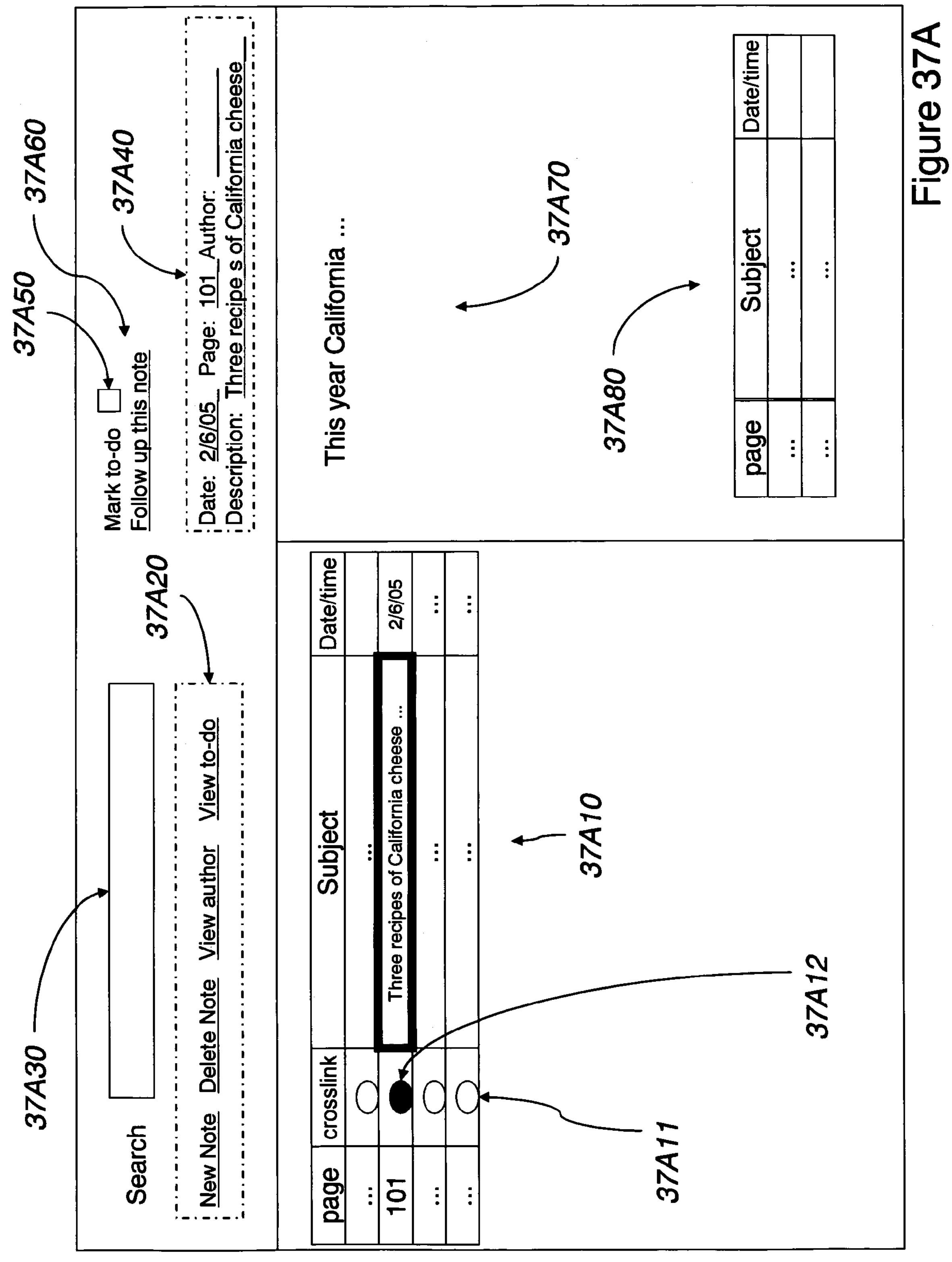
FIGS. 37A and B are user interface screens illustrating an electronic notebook that is compatible with the crosslink database according to various embodiments of the present invention.

To further facilitate the user to relate time with their information (digital content and motives), according to another embodiment of the present invention, a time stamp tool is provided. This allows the user to review chronological notes and at the same time relate the notes to the crosslink database. An embodiment system employs a conventional database table and a similar GUI as that of a conventional email tool (Microsoft Outlook, Yahoo & Google web mails). The database table consists of data fields that the user see and data fields that not visible to the user. FIG. 37A shows an embodiment of what the user sees. Table 37A10 comprises data columns for "page number", "crosslink", "subject" and "Date/time." Each record in the table represents a note page where the corresponding "message" is shown in panel 37A70. Each record also contains data fields that are not shown in table 37A10: "who," "follow-up," and "to-do." The "page number" column stores the page number just like a hard bond notebook; the "subject" column provides a brief description of the note; the "date" column stores the time of the event; the "crosslink" column stores the status of whether the note has been preciously cross-linked and the interface for the crosslink database; the "who" column stores the author or work group identity so a group of people can share notes and still posses individual ownership of their own notes. From the identity a viewing and editing privilege can be controlled. The "follow-up" column is used to connect follow-up notes together. The "message" column is used to store file path of note content that stores in individual files. The "to-do" indicates whether a note is marked as "to-do".

By default the notes are ranked in reverse chronological order. It may also be ranked by subject, or combination. When the user selects a record in this table, the message of the note is displayed in panel 37A70. The user can create new note, delete existing note, and view notes by a particular author (37A20). The user can conduct search by entering word string into field 37A30. When the user checks the checkbox 37A50, the note is registered in the to-do table When clicking "view to do" in 37A20, this note will be listed in one of the to-do list items.

Figure 37B:
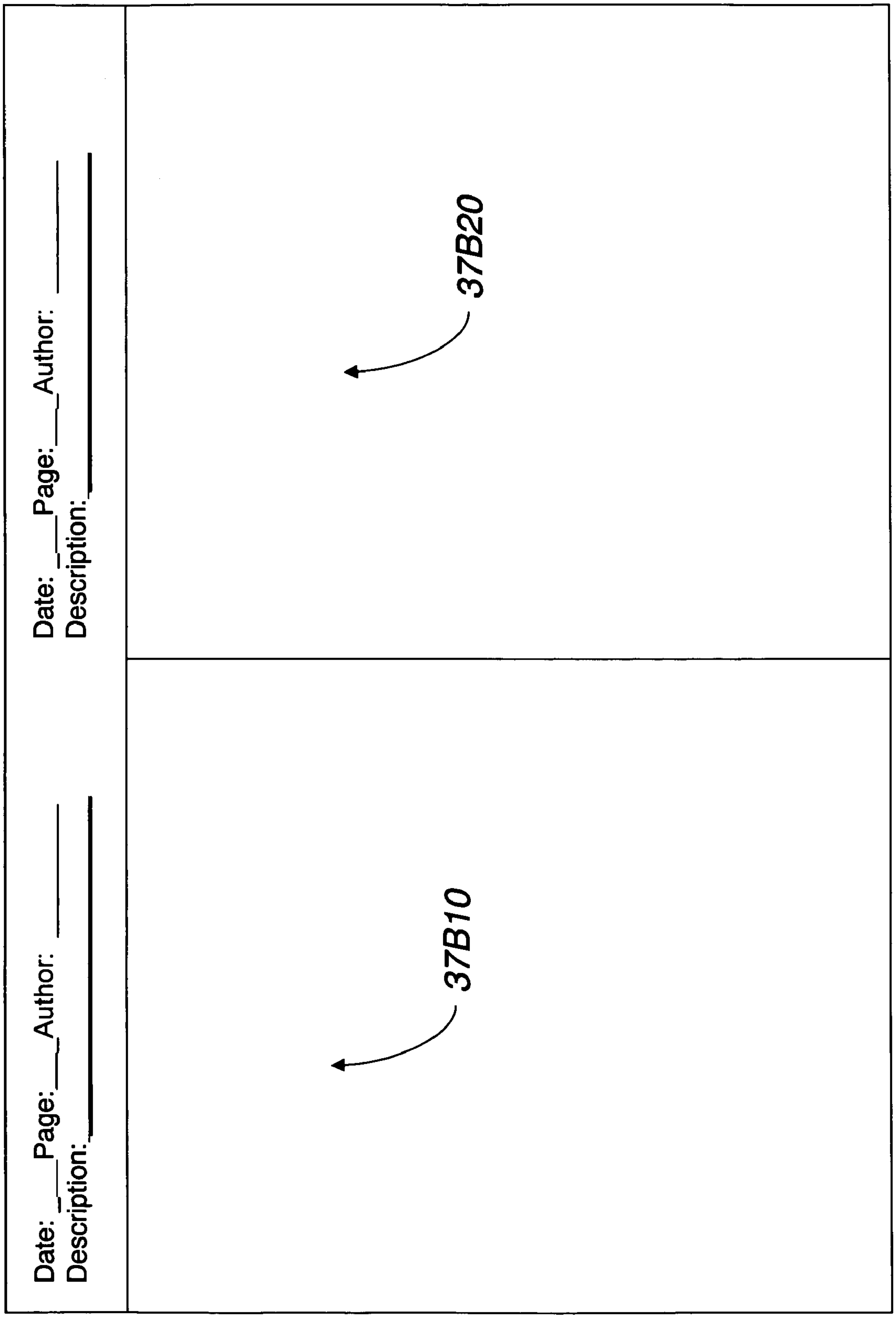
FIG. 37C shows an example of filing a note in OneNote, according to an embodiment of the invention.
FIG. 37D shows an example of an Outlook filing according to an embodiment of the invention.
FIG. 37E shows an example of a Journal filing according to an embodiment of the invention.
Figure 37:
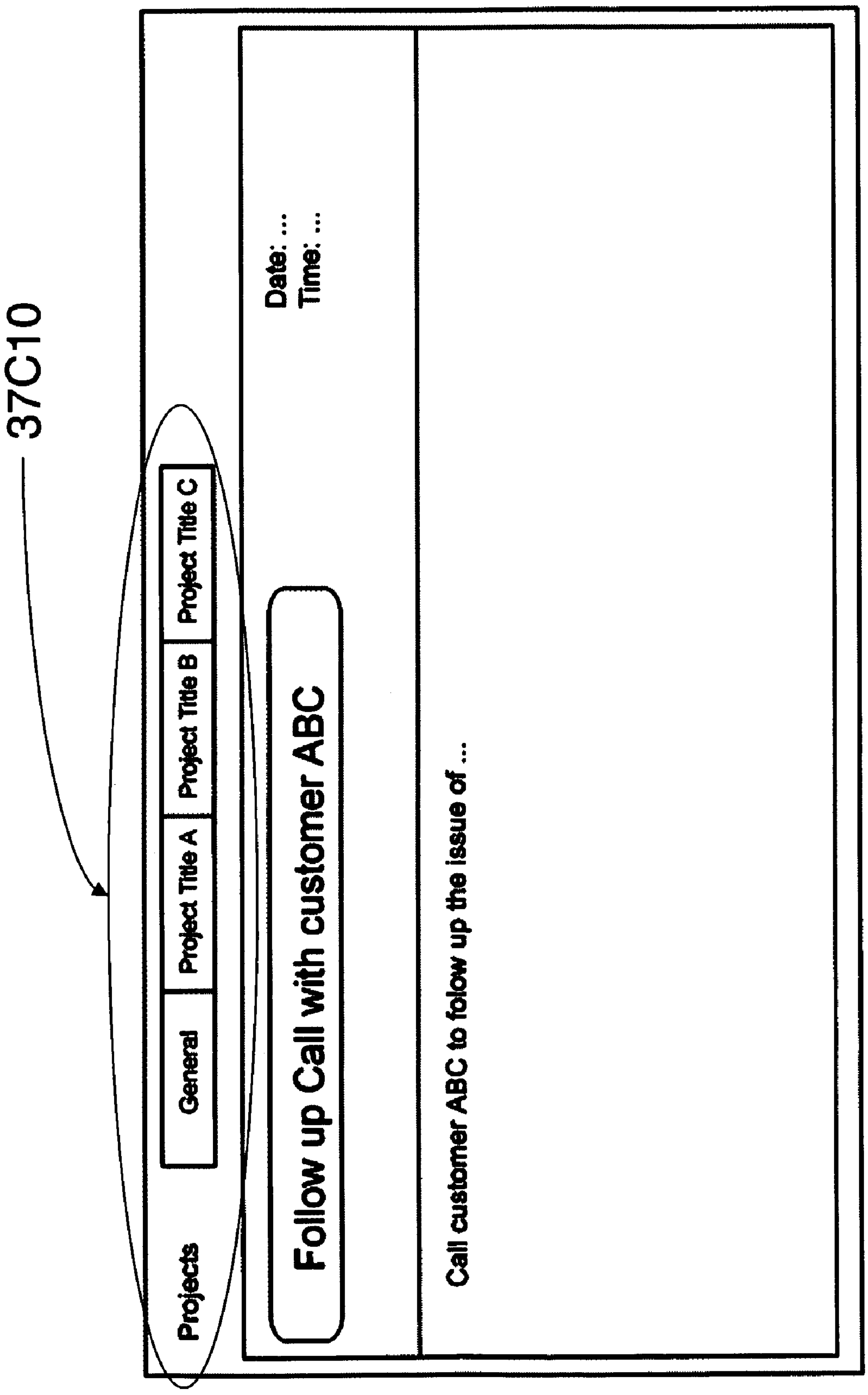
Figure 37:
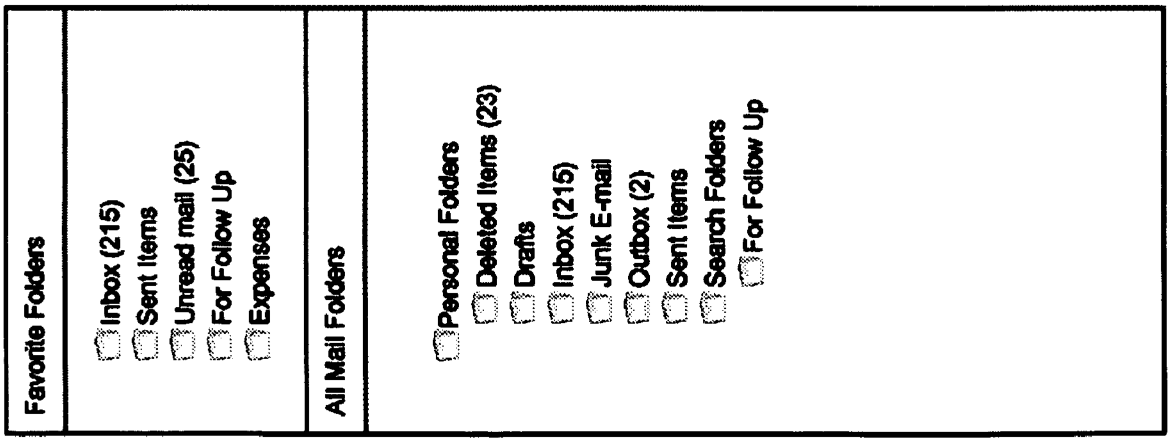
Figure 37:
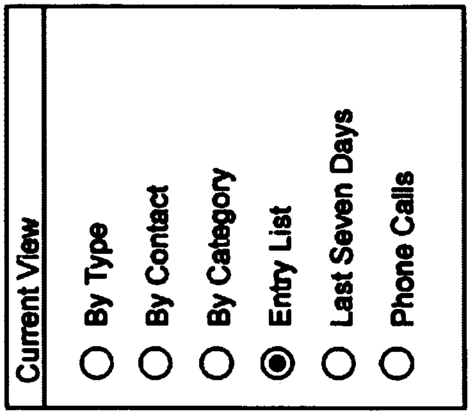

When the user clicks "follow up this note", this note is now shown in panel 37B10 and the new follow-up note can be edited in panel 37B20 (FIG. 37B). When a note has a follow-up, this note and its follow-ups are tagged with a unique follow-up ID. So when any of these notes is marked for another new follow-up, the system assigns the new note with the same follow-up ID. So when a note is selected by the user, the system checks for other notes that share the same follow-up ID in the "follow-up" column. The follow-up notes are displayed in table 37A80. This bundles up follow-up notes together so that the user may quickly go over related notes by clicking the record in Table 37A80.

An embodiment method is used to bridge between this conventional time stamp database and the crosslink database. Column 37A11 contains an icon (or a symbol). When an icon is filled or changes color(3912), it indicates that the particular note has been previously cross-linked. This reminds the user that more information is available in the crosslink database. Each note has a correspondent universal ID in Table 111 (FIG. 10A). Clicking the icon (filled or not filled) passes the note's universal ID to the crosslink database revision buffer. If this note has been cross-linked, the related topics, Contexts, and other content members are displayed. The users may crosslink this note to form a new Context or add it to existing Contexts just like handle a file. This scheme may easily application to an email tool due to the similarity between this electronic notebook and a conventional email tool.

Figure 38:
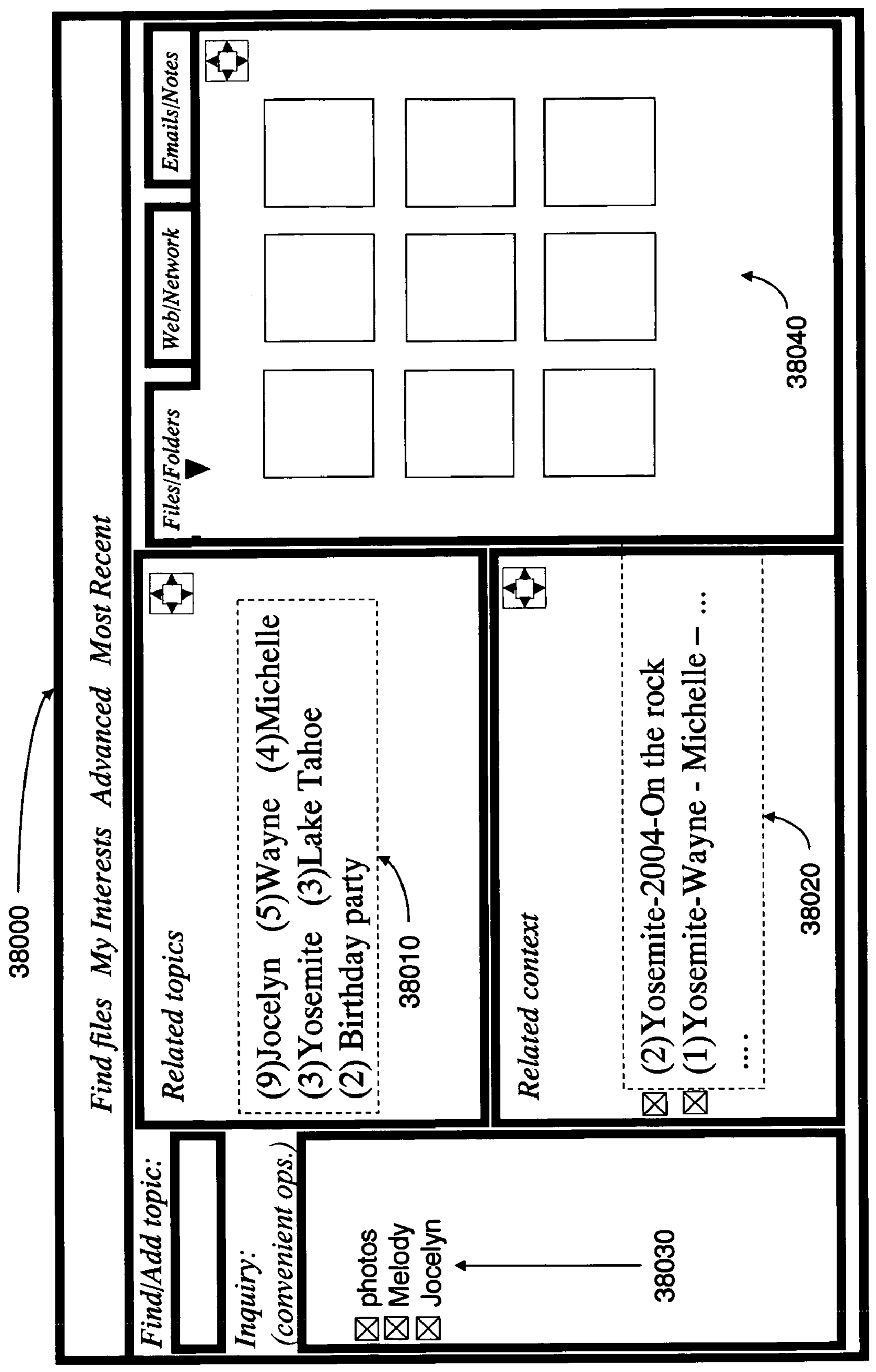
FIG. 38 is a screenshot example of an embodiment of the invention for constructing a tree structure dynamically based on the inquirer's perspective.

The free form of cross-linking the chronicle notes, emails, or some photos (photo roll by date) to topics, Contexts and other content members eliminates the need of classifying them in a rigid structure widely adopted by similar applications like Microsoft Outlook (email tool), Journal or OneNote. FIG. 37C shows the example of filing a note in OneNote. It needs to be classified into one of the project tabs or other predefined tabs (scheme of folder, tree, or tagging). For every note being generated, the user needs to have a grand vision of a project structure. For the project structure to be relevant, the user needs to articulate this structure for future notes that the user have not yet know. Similarly, an email in the Outlook application may be filed into one of the predefined folders (FIG. 37D) and tagged by a pre-define name like "follow-up" (folder, tree, or tagging). It encounters the same difficult. For the Journal application, notes is listed in a table that may be ranked by a set of predefine parameters (FIG. 37E, scheme of a conventional database). It can not be used to handle personalized, unstructured data. Many photo applications (for instance, Mac iphoto) sorts photos in rolls and ranked in reverse chronicle order just like emails in Outlook. It let the user associate folders or tags (virtual folder). Either one has an easy way to relate a record to other digital content. In contrast, the user of this invention does not encounter these difficulties. The user only needs to know the personal meaning of a note or photo and assign a set of "topics" that describes the note/photo. The database engine enables this note/photo to self-relate to other topics (where the motives may express) and other type of digital contents and self-evolve to form important topics. When inquired, it is equivalent to constructing a tree structure dynamically based on the inquirer's perspective. An example is shown in FIG. 38, where the "Photo", "Melody", and "Jocelyn" are inquired. The related topics and Contexts are listing in panels 38010 and 38020. The related photos of the checked Contexts are shown in thumb nails in panel 38040. Any photo that has "Melody" or "Jocelyn" in it will be shown as a thumb nail if all the Contexts are checked. The related topics in panel 38010 can be considered as the sub folders but its structure changes depending what is being inquired. When a new photo, for instance, was taken with "Melody" and "Wayne" in it on a "2005" "ski trip" at "Lake Tahoe," the user simply constructs a Context with the topics and the photo without consider the entire data structure. This photo can be retrieved later using any of the "topics" or the combinations thereof. It will also be integrated with other related topics that the user had forgotten. For instance, when inquire about "ski trip", the user can find "Lake Tahoe" or "Aspen Colorado" or ski trips from different years, etc. The specific description of the Context will enable the user to quickly retrieve this photo. More over, the photo can also be cross-linked with other type of information. For instance, the birth photo of an infant could be related to the birth hospital web site and the copy of birth certificate.

According to another embodiment of the present invention, the keyword, topic or the context may be highlighted and a text string may be linked with the related keywords, topics, or categories so that when a user clicks on the text string, it automatically submits the inquiry to the crosslink database system to display the results.

The implementation of the present embodiment takes the mechanism of hyperlink. In general a Hyperlink may point to a file/application path or URL of a web page/web application etc. and it may come with a set of parameters. For instance, one can construct a hyperlink points to a Microsoft Excel file and have a tag line or catchy picture for this hyperlink. One may insert the hyperlink in a Microsoft Word document. When the user clicks on the "tagline" or "catchy picture" in the document, it is equivalent to clicking on the Excel file itself icon in the folder. The OS automatically open the file with Excel application. Hyperlink also may contain a set of parameters (for instance, cells ID) that feeds Excel application. Similarly, the crosslink database may have a designated application/process in local computer or a web application over the internet. It takes in a set of parameters that may be topics, content members, Contexts and/or the combination and sends these parameters to the crosslink inquiry engine. When a hyperlink that points to this crosslink inquiry application plus a parameter set, clicking the hyperlink tag line or picture will automatically submit these parameters to the crosslink database inquiry. For instance, a hyperlink may associate "my ice cream collection" with inquiry of "ice cream" topic. When clicking this word string, the window as that of FIG. 13C pops up.

Figure 39A:
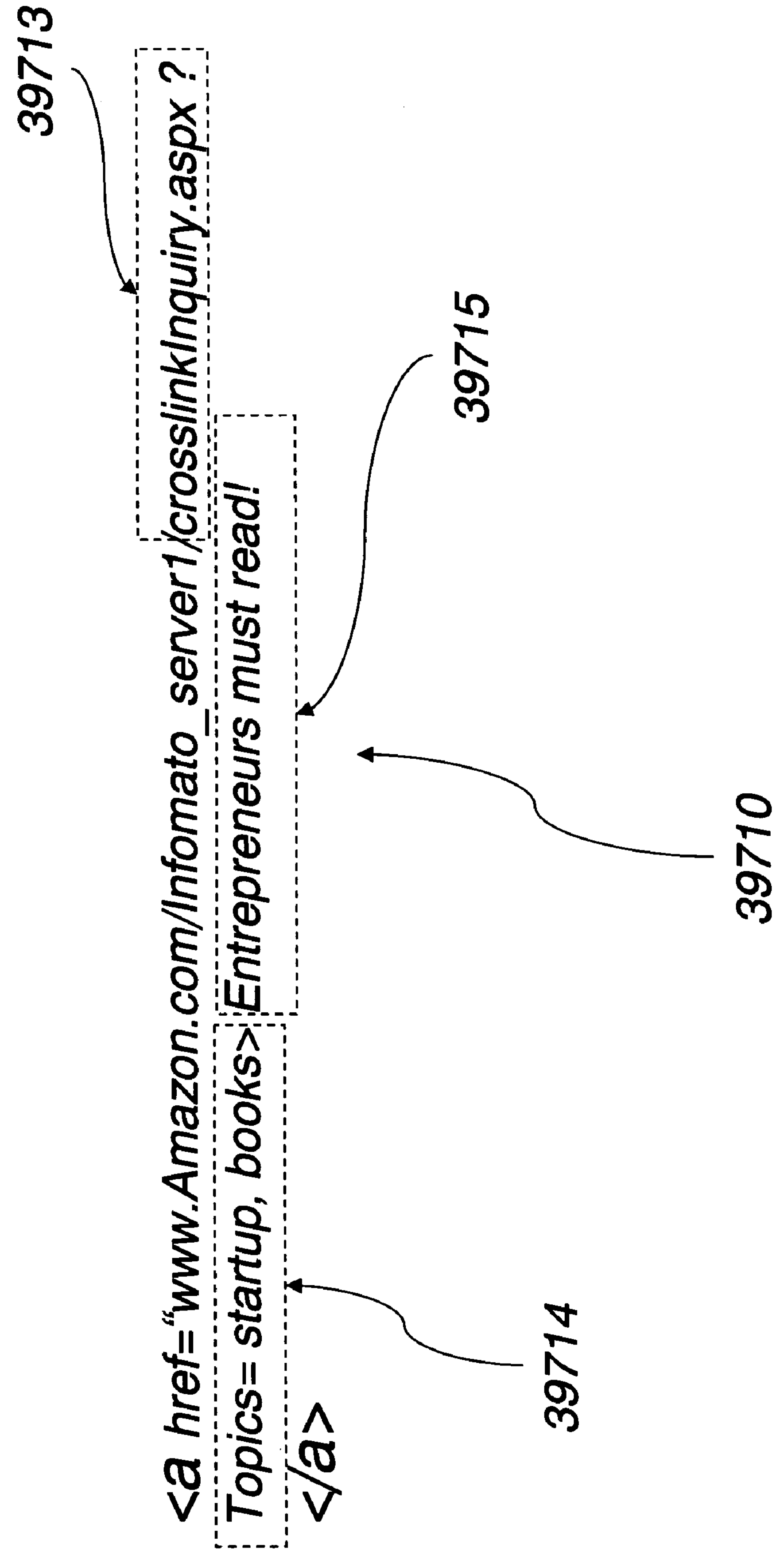
FIG. 39A illustrate an example of a content member consisting of a link to the web application server at Amazon.com and a set of parameters for feeding the server.

FIG. 39 shows a hypothetical web application example of the present invention. The html tag 39710 is embedded in a hypothetical html page of Amazon.com. A web surfer may see the tag line "Entrepreneur must read!" (39715). When the user clicks on the text string, the browser takes the "href=" and sends the topics parameters "startup" and "books" (39714) to the web application "crosslinkInquiry.aspx" (39713) residing in the directory "infomato_server1" at www.Amazon.com web server. The program "crosslInkinquiry.aspx" is a web application that interprets the parameters "startup" and "books" as topics and send it to the inquiry panel 13220 (FIG. 13C) for the crosslink database engine at www.Amazon.com or over the internet. Any related topic, Context, and content members that are related to these two topics will be displayed in a web page like that in FIG. 15B. The user may view the outcome and interact with the database via a browser.

According to another embodiment of the present invention, a set of Context may be exported out of the crosslink database to where no compatible crosslink database is available. For instance, the user may submit for an inquiry then checked Contexts of interest for export. The related topics are required to be converted into a general format so that the organization and meanings for the content members could propagate to a system which does not employ crosslink database of the present invention. One option may be to request the associated servers to deliver the content members and save it in a folder (called "export folder"). The other option is to record the content link, not the actual content itself if the content is accessible via the internet or a computer network. Next a spread sheet (or word document) file ("directory") is created and saved in the same folder. In this file, one Context in a time, in the order of how it appears in the Related Contexts panel, list out its topics then the content members' hyperlink. Each content member's description in the crosslink database is used for the tag line of the hyperlink. It may be that a content member is accessible via the internet or a computer network, the hyperlink can point to the path to the server's URL. If the content itself (instead of the link) is to be exported, the system requests the sever to deliver the content to be delivered to the export folder and points the hyperlink to this file in the export folder. Here the hyperlink file path is a relative path (between the content member and the directory file), not an absolute path, so the hyperlink continues to work after this export folder moves to a different computer. Regarding the ordering of Contexts and topics in the directory file, the same schemes used in crosslink inquiry are also applicable here. For instance, the more common a topic is among these Contexts, the higher ranking the topic is. The topics may be listed in the order according to its ranking. In case of using spread sheet for the directory file, each topic may correspond to a column. Each content member of a Context may correspond to a row. If the content member is related to a topic, a check is marked on the cell at the intersection of the content member and the topic. After the completion of the directory file and moving all the local files into the export folder, the entire folder is completed and may be exported to another system via portable storage devices or via the Internet.

According to another embodiment of the present invention, a set of Context may be exported out of the crosslink database to where another crosslink database is available. There are a few examples as follows:

1. The sending side crosslink database composes the html/XML that contains the Contexts information using tags. The receiving side crosslink database has an application that can read the html/XML file and convert it into topics, Contexts, and content members. The file is transmitting to the receiving side after privilege and authentication process.
2. The html/XML file that contains the Contexts information is attached to an email sent o the receiving side but with a unique extension. When the user double click on the file, the unique extension of the file calls up the crosslink application on the receiving side to interpret the html/XML tags and convert them into Contexts.
3. When a large volume of crosslink database is to be transmitted, the database data can be saved in a file and placed into an export folder. All the file types that are not accessible via the internet are duplicated and saved into the same folders. When restore the data on the receiving side crosslink database, the database goes over each files in the export folder and find the possible matches for the content members in the data and may have the user to confirm and save into the receiving side's computer/server. Once a file is confirmed, the link in the file table (FIG. 10B) is updated.

According to an embodiment of the present invention, information related to physical location of various data, for example paper files, tapes, CD/DVD, album, merchandise, inventory parts, drugs, vehicles, buildings, commercial billboards, maps, employee locations, etc., may be stored into the crosslink database and displayed providing added convenience to the user.

According to an embodiment of the present invention, the text string related to digital content is analyzed and compared to a set of selected topics using "fuzzy text matching". Any matching topics may be suggested to the user. The user may identify the matching topics and the corresponding text string may be highlighted.

To promote a user friendly shopping on the internet, the present invention may be applied in Web commerce where web pages and merchandise information, and methods may be organized by cross linking the information according to the present invention so that the visitors may effectively and progressively interact with the database to gain an overview of what are available from the web commerce but from the visitors' perspective before narrow down the search. A user may review the outcome of the database inquiry and gain a broader scope of the merchant's offer than the user's original scope, or refer from a related but different scope to the intended scope. The present invention may be applied to organize the selected web pages of interests. Furthermore, the present invention also allows the web visitors to exchange information over the Internet.

To implement the above mentioned applications to provide convenience to the user to visit various topics of interests on the Internet, the present invention proposes to crosslink multiple web pages of interests with topics to form contexts, link them together according to the present invention and store this information into the database associated with the web site hosts so that multiple Contexts may be linked to a single web page or a single Context may be linked to multiple web pages. The crosslink database server may monitor the frequency of a web page visited by other web surfers and rank its priority along with other qualified web pages when these web pages are presented to the users.

The user may request Contexts associated with a web page and may elect to review and/or revise, and save the Contexts of information into the crosslink database. When the user does not have an associated crosslink database, the Contexts are exported and then transmitted to the user's local display and/or storage.

The web address may be parsed to extract the word before .com, .org, .net or the alike to identify the web site, the crosslink database associate with the host automatically searches for any content members, topics, Contexts from the same web sites and present them to the users.

According to an embodiment of the present invention for effectively reducing conventional keyword search that leads to multiple irrelevant topics, commercial information related to merchandise, documents, files, maps, photos, pictures, forms, audio/video products, books, resumes, merchant contact information and products and services, customer feedback, customer's contact information and purchase history, customer service and support records, inventory, etc. and the like may be cross-linked with topics to form contexts according to the method described above, and then stored in the crosslink database and the information is associated with the website host. Thus, one or more users may link to the website host for inquiring and progressively searching the information of interests over the internet. The crosslink database server monitors the frequency of sites/information visited by the users and rank their priority compared with other sites stored in the crosslink database when these sites/information are presented to the users.

According to another embodiment of the present invention, the crosslink database may be affiliated with the publisher and the subscribers to exchange information over the Internet.

Figure 39B:
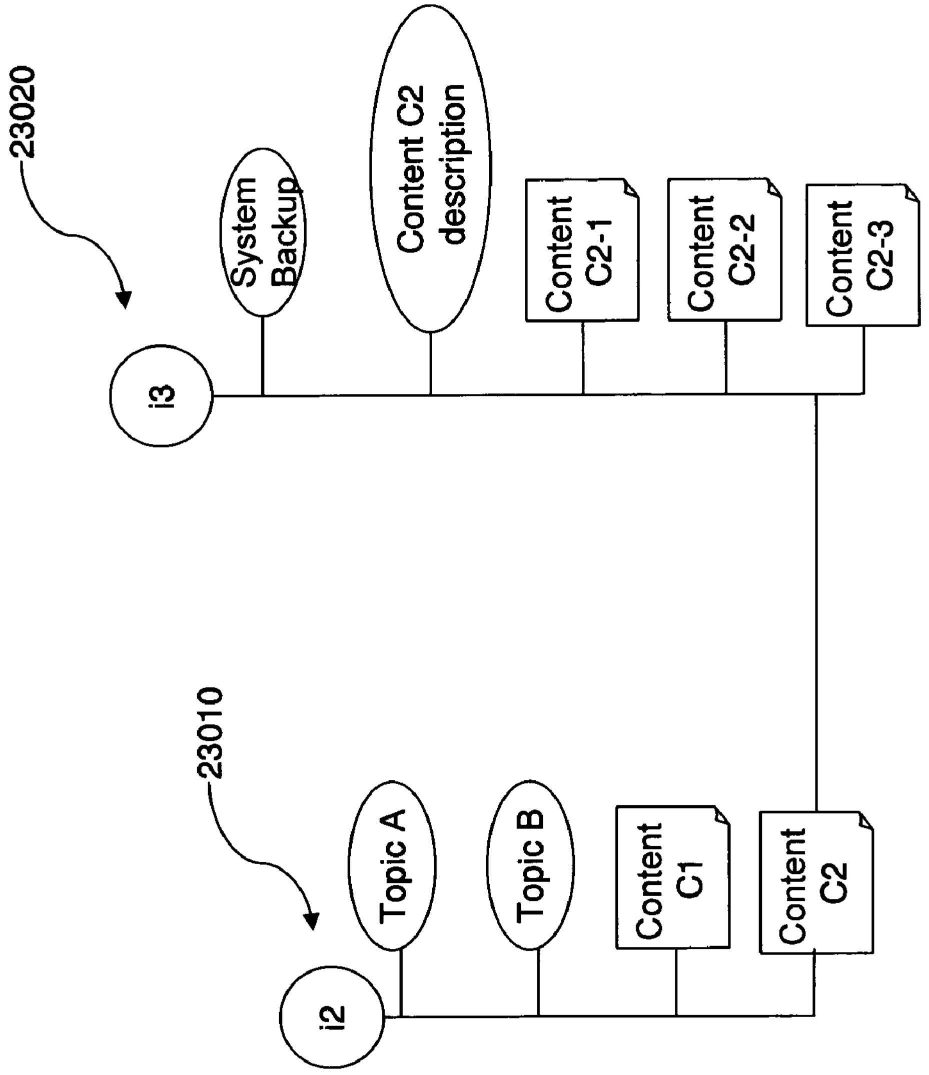
FIG. 39B is a crosslink data structure illustrating a common content member that is related to two different Contexts according to various embodiments of the present invention.

According to another embodiment of the present invention, the crosslink database may be affiliated with a web site that allows their subscribers to save their web bookmark over the Internet in the web site's crosslink database. A subscriber can login to the web site to retrieve their bookmarks that are cross-linked using the invention like Sometimes it is desirable to backup a content member so that the evolution of this content member over time can be traced. While revising with its designated application, the user can right mouse click and select "backup" from the menu items. The system automatically creates a backup copy of the content member under a filename with revision notation. For instance, "filename A.extension" becomes "filename A-1.extension". All the backup filenames are automatically cross-linked into the context with one control topic "system backup". This "system backup" control topic function similar to a regular topic except the users are not allowed to modify the term "system backup" and it ranks higher than an ordinary topic when it is qualified to be displayed. An example is shown in FIG. 39B where a context 23010 comprises a connecting node 23011, topics A and B, and content members C1 and C2. The content member C2 has been "system backed-up" four times. The backup context 23020 has been automatically generated by the system when the user decided to back up content member C2 the first time.

To review the backup of content member C2, the user follows the procedure wherein the user submits C2 to the inquiry, "System backup" control member along with content members C1 and C2 are qualified and displayed in the display panel, and both categories 23010 and 23020 are qualified and are also displayed in the display panel. As the "System backup" ranks higher than other topics (that are related to context 23020), it may be easily identified. When "System backup" is inquired, context 23020 is the only qualified context, and therefore the content member C2-1, C2-2 and C2-3 related to the context 23020 are displayed in the display panel.

Figure 40:
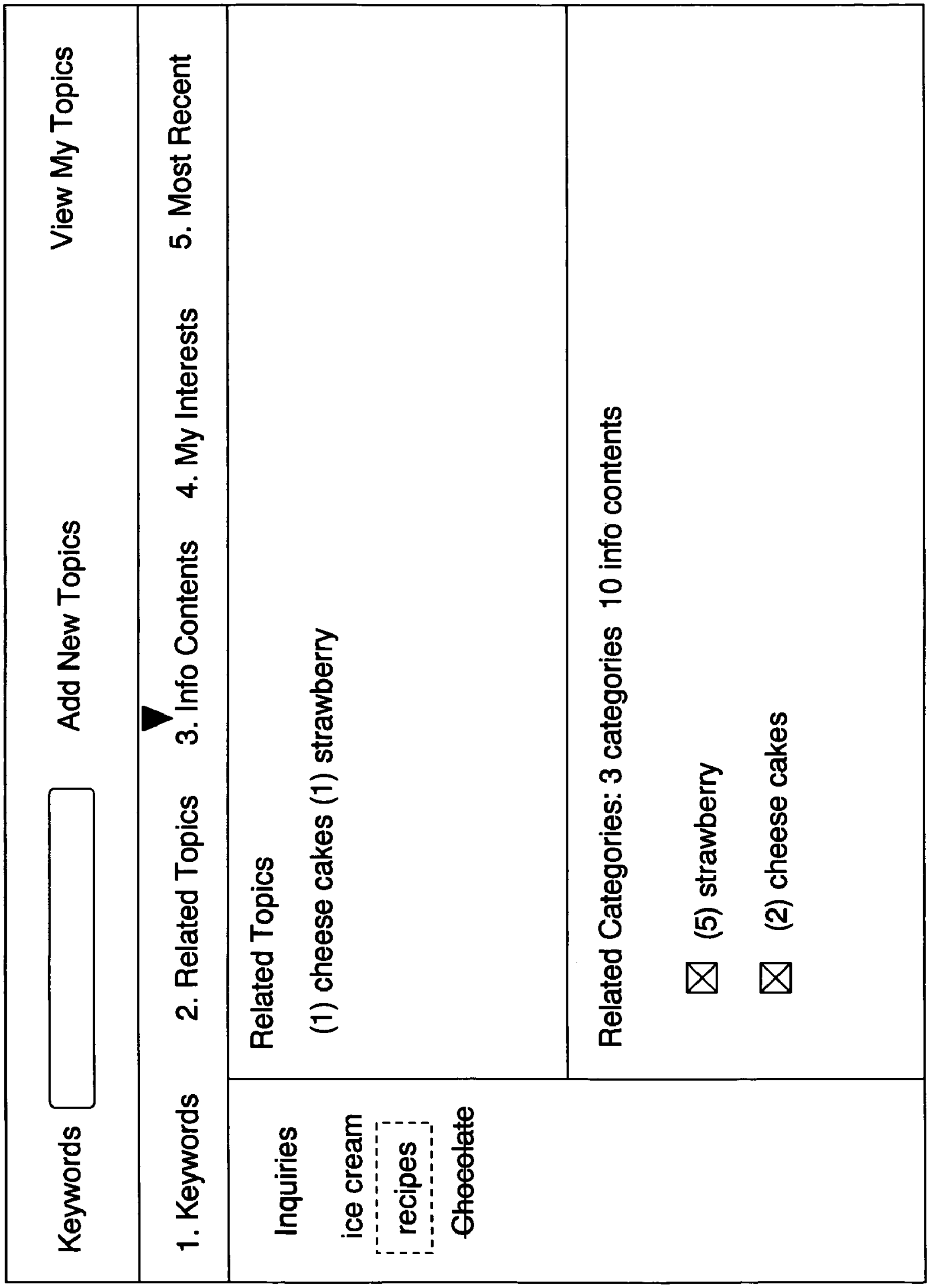
FIG. 40 depicts user interface screen to illustrate a topic being excluded from the inquiry according to various embodiments of the present invention.

To narrow down the display of the overview of information on the display, a member (topic, content member, or Context member) may be excluded from the inquiry. In other words, when a member is excluded in the inquiry, Contexts containing the excluded member may be "not interesting", and these "not interesting" Contexts are "defocus" (by not displaying, dime out, in different font or size or color, in different background color, cross-out, etc.) on the display panel. As shown in FIG. 40, to exclude the topic "chocolate" the user submits the topic "chocolate" to the inquiry, and then select a mouse menu "Exclude." This action will cross out the topic "chocolate" and "defocus" any Context containing the topic "chocolate". For implementing the exclusion action, the crosslink database engine first separates all the excluded members and non-excluded members, and identifies all the Contexts containing all the non-excluded members. It then "defocuses" any of these Contexts that containing the excluded members (chocolate topic in this case). For topics displaying in the "Related Topic" panel, only topics that are related to the Contexts that are "focus" will remain "focus." When there are more than one excluded members, the user can select an option of "OR", "AND" or "EXTENDED." When "OR" is selected, any Contexts containing at least one of the excluded members are "defocused." When "AND" is the option, any Contexts containing all of the excluded members are "defocused."

The "EXTENDED" option let the user to exclude a group of topic ("extended not interesting" group) because they are related to another group of topics ("original not interesting" group). The "extended not interesting group" is generated by submitting the "original not interesting group" to the inquiry. Any related topics from the inquiry is a member of the "extended not interesting group."

Since the Context groups a set of content members and gives specific meanings to this group, when the user is working on one of the content members (composing, reviewing, revising, etc.), it may be also desirable to simultaneously work on other content members as well. To simultaneously open the content members belonging to a Context of interest, the user may place the cursor on the Context icon and select "open content" mouse menu. Likewise, to close all the content members, the user may select on "close content" menu. Similarly, the user may minimize the windows (temporarily condense the window into an icons) or bring up the windows of open content members by selecting "minimize content" or "bring up content" mouse menu.

An advantageous embodiment of above "open content" is to open all content members that have been recently accessed. The user does not need to go over the list and open one content member in a time. The database engine can automatically opens all the content members that have been worked on within a recent time frame for the user with a simple mouse click. Alternatively, the user needs to check the content members and select "open checked content" to open only those content that are checked.

Figure 26B:
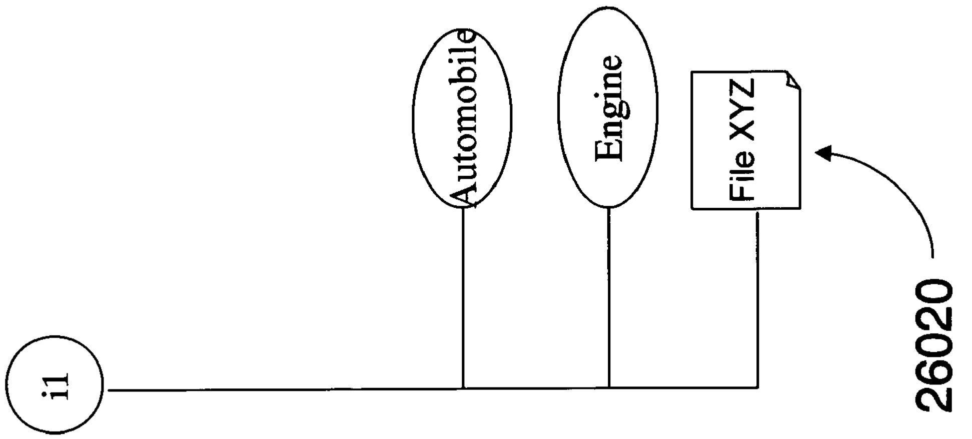
Figure 26A:
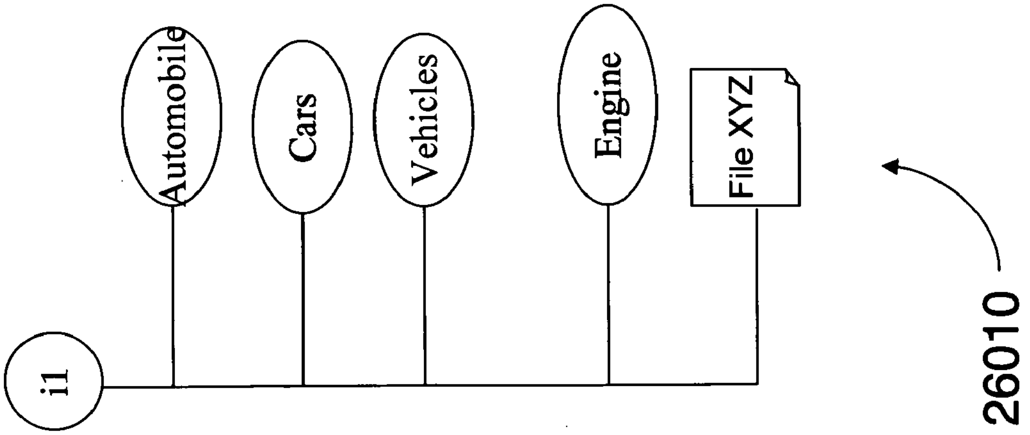

If several topics share the same meaning for a user, it is desirable for the user to enter any one of these topics and lead to the same results, as shown in FIG. 26A where the topic, "automobile" is equivalent to "cars" and "vehicles". In order for the user to find this Context via any of the three topics, a less favorable embodiment is to have the context 26010 comprising all three topics Automobile, Cars and Vehicles, and other related members such as Engine, Web XYZ. This approach however gives confusing, cluttered meaning that may irritate the user.

Another embodiment is shown in FIG. 26B, where the user sees less cluttered Context 26020 even though the Context is related to topics "cars" and "vehicles". The Context connecting node is in fact connected "cars" and "vehicles" but the connections to these two topics (recorded in Table 110, FIG. 10A ) are flagged as "invisible" in the table field (not shown in FIG. 10A). Note that these two topics may be visible in other Contexts. In other words, the user elects not to see these two topics for this specific Content when the Context is first constructed or revised. These topics will not be displayed in the Related Context panel 13330 (FIG. 13C). When the user inquires either about "cars" or "vehicles" Context 26020 is qualified for the inquiry but the user sees Context 26020 instead of 26010.

According to an embodiment of the present invention, control topics called "ID tag" can be automatically attached to a new Context when prearranged by the user. Multiple ID tags can be used at the same time. An ID tag, for instance, can represent an individual person, a project name, a group, an organization, etc. The ID tags are similar to topics but not displayed by default in Related Contexts panel. The user can turn on or off an ID tag to view or ignore a set of related topics and Contexts returned from an inquiry.

Figure 41:
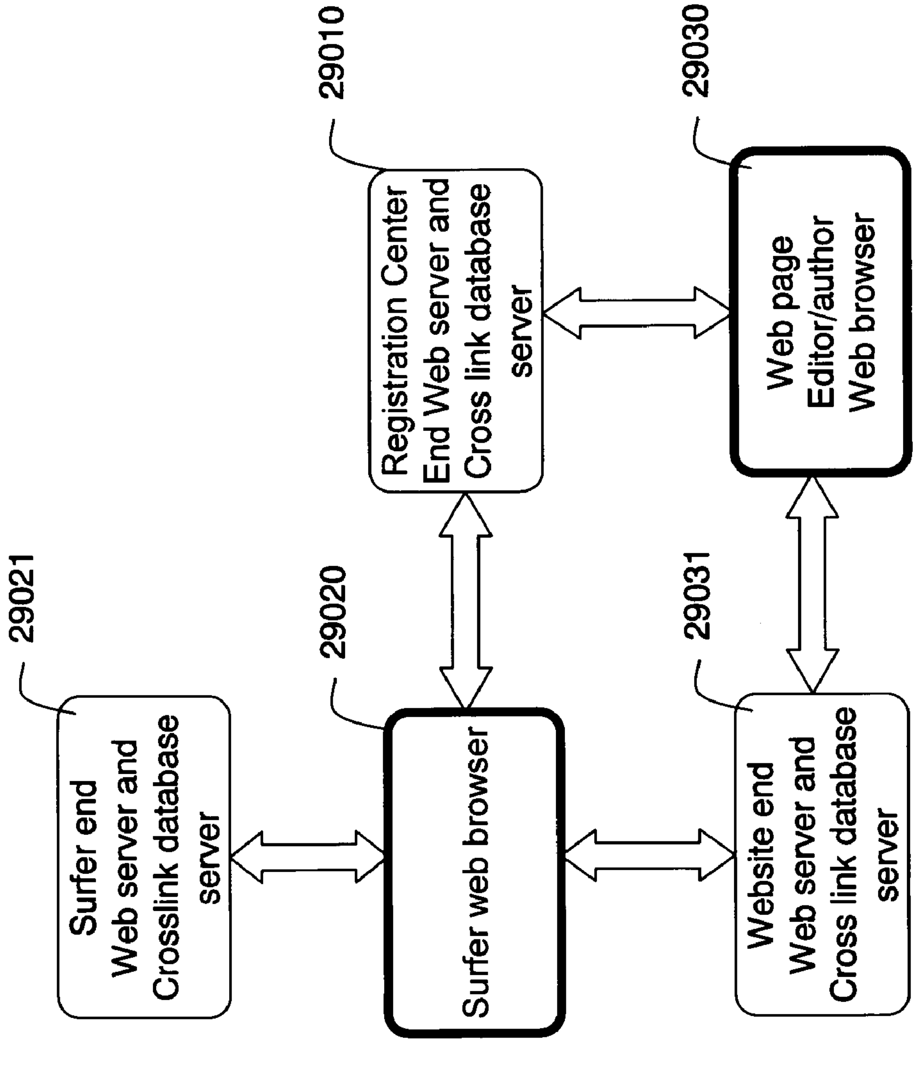
FIG. 41 is a block diagram depicting a system architecture according to various embodiments of the present invention.

Hereinafter, the application of the crosslink databases of the present invention on the Internet browsing and shopping will be described. Referring to FIG. 41, a website owner/editor 29031 may register contexts related to web pages, for example, to include their own web pages or reference web pages from other web sites, with the registration center database server 29010, so that web-surfers 29021 may discover these web pages at 29031 by submitting inquiry to crosslink database of the registration center database server 29010. However, the web page is first required to be cross-linked to the related Contexts by the various steps described hereinabove. It should be noted that when a web page/web application inquiry is cross linked into Contexts, the web address, directory, file/application name, and parameters, are stored in the cross link database. The crosslink task may be accomplished using the register center crosslink database server 29010 or the website crosslink database server 29031, if available. For the latter case, the composed Contexts are transmitted from website crosslink database server 29031 to the register center crosslink database server 29010 via the Internet.

When contexts are registered in the register center crosslink database server 29010, the submitter needs to go through a secure login system where the database engine of the registration center recognizes the account and its privilege via secure Https login. Upon authorization, the submitter is allowed to selectively access or add or revise the registered Contexts. One skilled in the art would appreciate that a regular surfer does not have the revising/editing privilege.

The web surfers may interactively submit inquiry to register center crosslink database server 29010 using steps described hereinabove. The crosslink database allows a surfer to download the related Contexts of a webpage from website crosslink database server 29031 to the surfer's personal network computer and or revise the Contexts to fit the surfer's personal preference, and then the Contexts may be saved and integrated into the personal crosslink database 29021. The saved Context now has an identity tag of the surfer instead of the website regardless of whether the Context has been revised or not.

The web page editor/author may be able to determine whether a context is a public context or private context from the right mouse button menu. Referring to FIG. 41, when the Context is uploaded from surfer personal database 29021 to the registration center database 29010, the public Contexts are available to the public, and to access the private contexts, an authorized login is required. Accordingly, the web page editor/author may be able to inquire public and or private contexts via the Internet. It should be noted that by default only the links of the content member are uploaded to the registration center database 29010, not the content themselves. To upload a content itself (not accessible otherwise) to the registration center server so that a link can be established, one need to explicitly turn on a flag associated with the content member and needs to have FTP privilege to the site directory.

Accordingly, present invention may be applied in Web commerce where web pages and merchandise information, and methods may be organized by cross linking the information according to the present invention so that the surfers may effectively and progressively interact with the cross link database to enjoy all the benefits and features of integrative, quick and progressive search described above.

According to an embodiment of the present invention, multiple document pages/web pages may be cross-linked into the database stored in an electronic device or a portable storage device and this cross-linked database may linked to the internet servers for surfers to search and access. According to an embodiment of the present invention, multiple Contexts may be linked to a single page/bookmark with which a surfer/subscriber interacts to select and access information of interests.

Accordingly, the cross link database of the present invention linked to the Internet server may allow the owner to gain privileged access to revise/update or add new information. A subscriber may link to the cross link database to enjoy all the benefits and features of integrative, quick and progressive search described above.

The present invention provides a method to narrow down search engine results. Search engines often bring in too many coincident hits. To narrow down the search results, the user may have issues of what additional topic to use. The crosslink database will supplied related topics for feeding the search engine. In one embodiment, the related topics are manually entered by the user to the search engine. In another embodiment, the related topics are automatically fed to the search engine using search engine API (for instance, Google provides software development kit) and the return results are integrated by the crosslink database engine: First primary topics are chosen by the user; the primary topics are sent to the inquiry to obtain the related topics (secondary topics); the primary topics are submitted to the search engine; the search engine returns the primary search results; from hereon the search engine only searches the primary search results; each secondary topic is submitted to the search engine; the search engine returns secondary search result for each secondary topic submission; a Context is created for the primary search topic and the secondary topic and all the secondary search results; the number of matching content members from each secondary search results are displayed with the secondary topic and this number is used for ranking the secondary topic; the user adds the secondary topics to the inquiry; the user reviews the content members.

Figure 42:
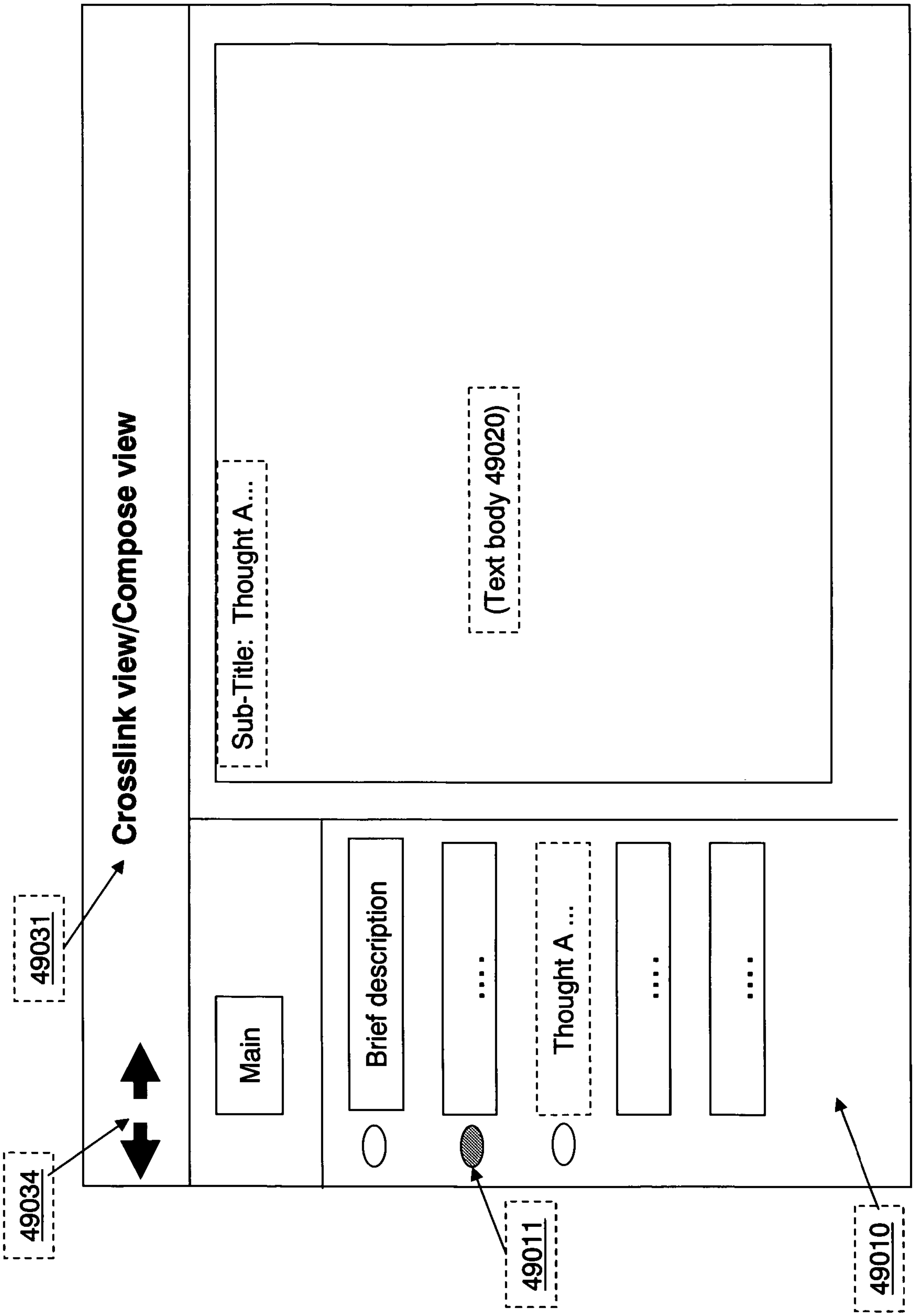
FIG. 42 depicts an embodiment of the author interface.

The present invention provides an author interface. An embodiment of the author interface is as shown in FIG. 42. The author interface comprises a panel 49010 (similar to thumbnails view in Microsoft Word) where an author can enter the brief description of the sub-document and text body (49020). Each sub-document is represented by an icon and a brief description as shown in panel 49010. Each document may consist of single or multiple paragraphs that elaborates the brief description. The order of the sub document in panel 49010 may be arranged to reflects the author's overall thought tend or in reverse chronicle order of when they were last access. To view/revise the sub-document, the author may click on the brief description. The order of the sub-document can be rearranged by drag and drop (like that of a MS Power Point slide thumbnails) a sub-document within panel 49010. An alternative to the FIG. 42 GUI is to have the view similar to that of FIG. 37A, in which the sequence of the sub document is shown in "page" column, brief description in "subject" column, icon in "crosslink" column, and latest revision time in "date/time". The order of the sub documents can be sort by "page", "subjects", or "last access time".

To crosslink a sub document, clicks on the icon (49011, FIG. 42, or a symbol) associating with the sub document. It grabs the link of this sub document and places the link into the revision buffer. The icon's function is similar to that of 37A12 (FIG. 37A). In this example, when the icon is filled, it indicates the sub-document has been previously cross-linked. The rest of the procedure for constructing, revising, or reviewing Contexts for the sub document is identical to that of a note in the time stamp tool (FIG. 37A). Besides cross-linking with other sub documents, other types of content information can also be cross-linked. For instance, a sub document may be related to motives, thoughts, reports, web pages, notes, or photos, research papers, white papers, etc. In the crosslink database, the author can construct a complex interrelated relationship between the sub-documents. In the end important topics emerged that can help the author gain overall picture. In addition, the author can quickly review or revise the flow of related sub documents that may not be in immediate sequence. The author may toggle between crosslink view (FIG. 15B) and the composer view (FIG. 42) by clicking action words 49031 or 49032. The user can also click forward and backward icon (49034) to go to previous or proceeding views/sub documents similar to that of a web page.

Figure 43:
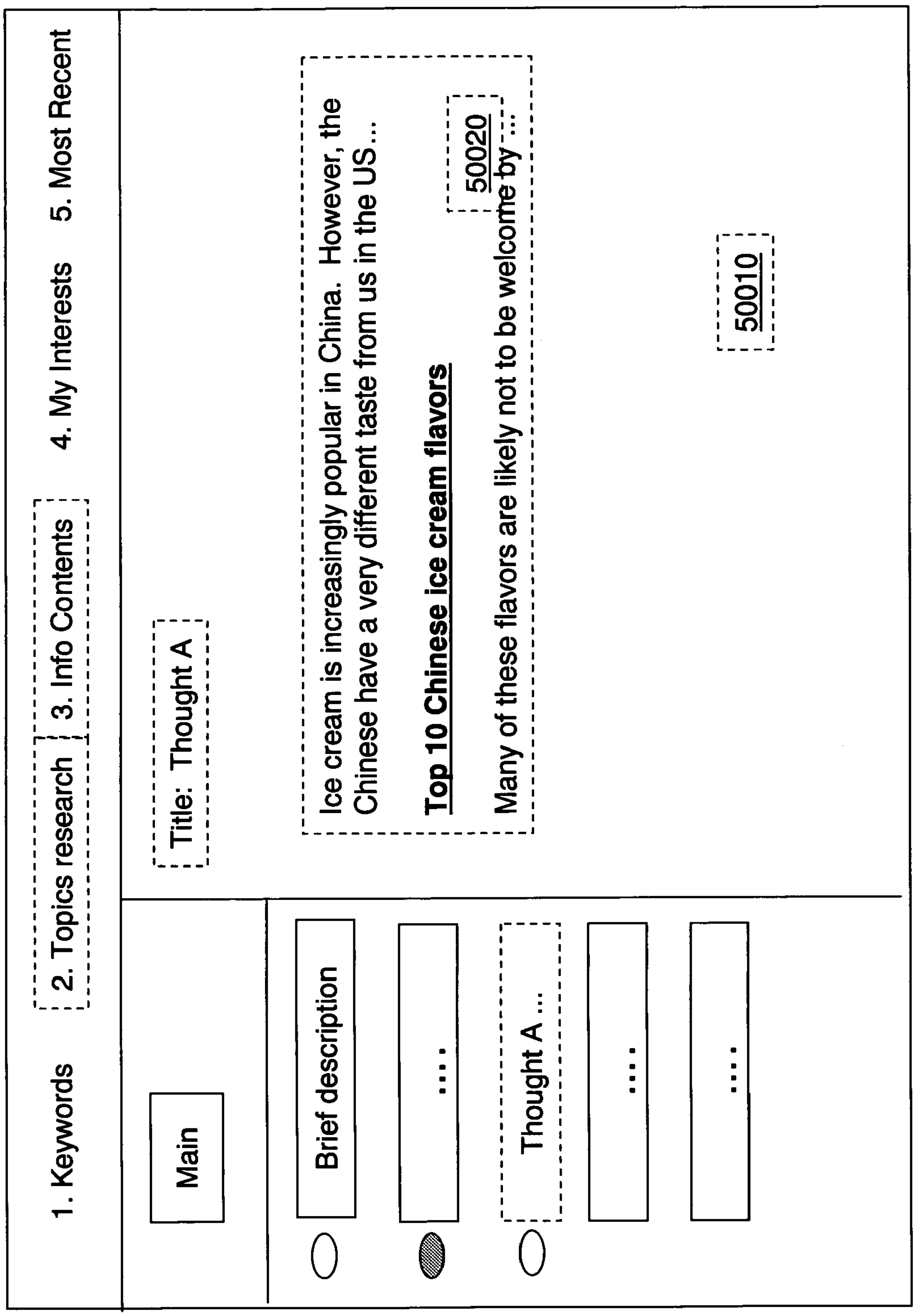
FIG. 43 depict an embodiment where an author composes the text paragraph in the main sub-document.
Figure 45A:
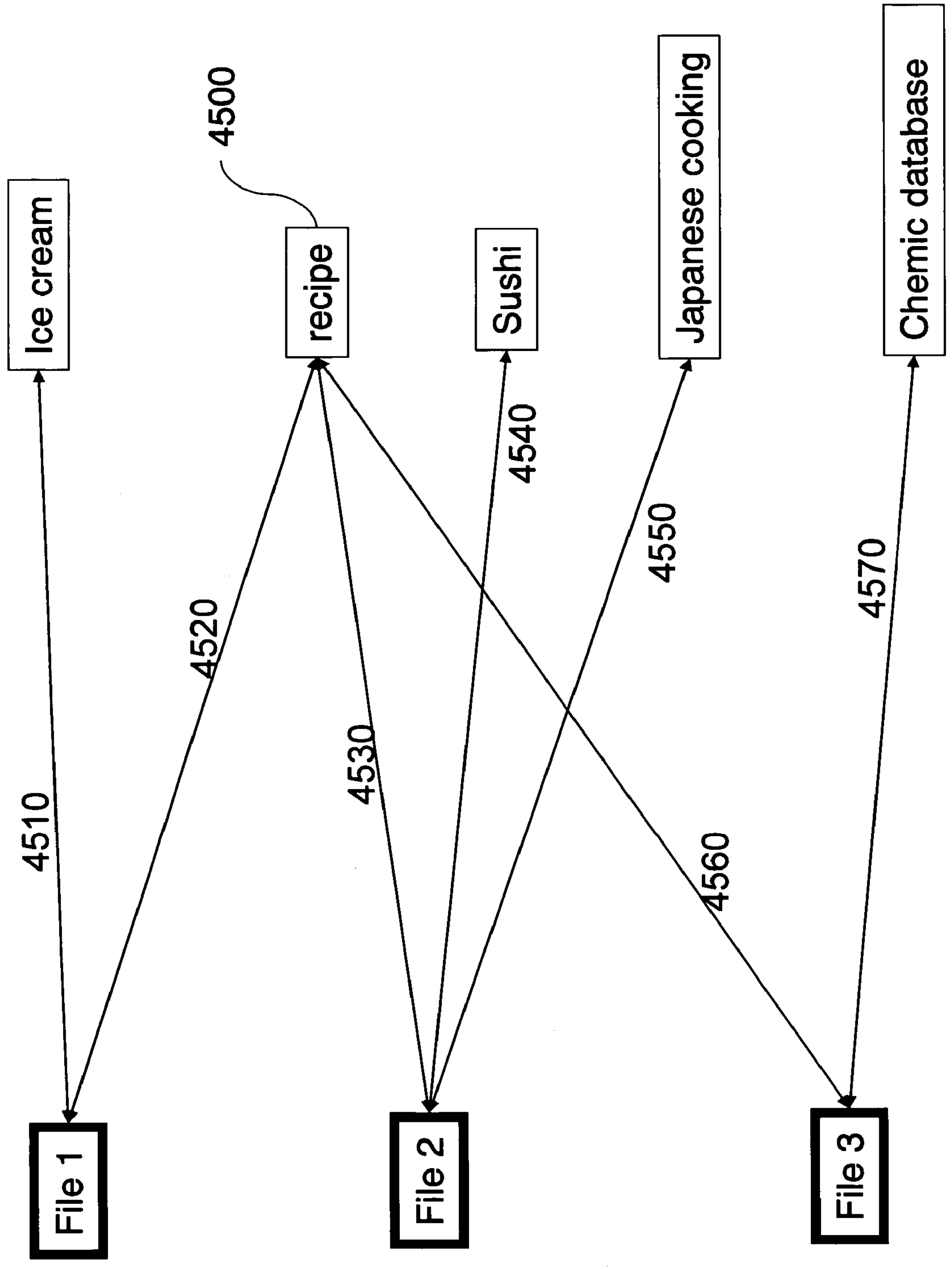
FIG. 45 illustrates how tagging technology works.

The main document is where the sub-documents weaved together. To display the main document, the author may click on "Main" button. While composing, the author may click on a sub-document and hold the mouse button while drag it to the text body. The sub-document's hyperlink is automatically inserted at the location of the cursor in the body text and the brief description of sub-document will appear as the tag line for the hyperlink (similar to the "paste as hyperlink" function in Microsoft Office Suite). An example is shown in FIG. 43, where an author composes the text paragraph in the main sub-document in which the hyperlink for the sub-document entitled "Top 10 Chinese ice cream flavors" is embedded. The sub-document's text body may be displayed on panel 50010 by clicking on the hyperlink. This brings up the sub-document (may be display in a separate panel) for the user to review or edit.

After the author completes composing the main document, the author may elect to insert all the sub-document into the main document's text body. When this happen, the crosslink will automatically do the following:

(1) Place a bookmark (maybe hidden or visible bookmark) at the location of the main documents where the beginning of each sub-document text body is inserted, (2) In the crosslink database table where each sub document file path is stored (similar to that of Tables 1021 and 1027), replace the sub document file path with the main document file path as well as the corresponding bookmark in the main document (see Microsoft Office suite for hyperlink involving bookmark). From now on the Contexts are related to the specific location of the main document instead of the sub documents. The user may choose to delete all the sub-document except the "main" document by selecting the mouse menu item "delete all sub-documents". All the topics and contexts that are not related to any bookmarks in the main document will be "meaningless" and cleaned up afterward Thus, a very structured, yet flexible composition may be constructed and with its content cross-referenced by "a smart index." The author may also elect to transmit selected Contexts so that the specific bookmarks can also be referenced by the crosslink database outside of this document. For instance, if the bookmark is related to a Context "Chinese", "ice cream" and "Top 10 flavors". Exportation of this Context will allow one not only to locate this document by these topics but also the specific location in this document. It also allows the specific portion of this document be conveniently referenced other documents.

Accordingly, present invention may be applied in book publishing where the main document is an electronic book. The "smart index" of this book used by the author to compose the book may be accompanying with the electronic book to the book subscriber. The data can be loaded into a crosslink database so the subscriber may inquire and interact with the interrelated portion of the electronic book, rich references that used by the author, and even the author's motives or state of mind while composing the book. In addition, the subscriber may revise the Contexts of the electronic book to add personal meanings and references. For instance, adding or delete topics, crosslink (or interrelate) two different electronic books, or adding personal comments/notes to a section of the book.

In summary the present invention discloses many examples of connecting information that scatters in at least 5 basic information platforms and many applications that the invention may be applied. The present invention disclose in part, a unique crosslink data structure that are used to manage the complex, interrelationship between human motives and digital content that are both structured and unstructured; the present invention also disclose methods of presenting this complex data structure in a simple, easy to understand, organized manner that fit human nature of processing information and thinking pattern, notably by relation and correlation. The present invention addresses the issues encountered in many prior arts that require humans to have a foresight for articulating data structures for data that they have not yet received or motives that are not yet matured; the present invention also address the issues in many prior arts that are difficult to restructure the data structure once human motives and digital content collection develop, evolve, and deviates from original expectations.

When humans encounter an individual information, the users of the present invention do not need to have concerns of how the receiving information fits into existing data structure. They simply express their personalized motives (meanings) based on their impressions called related topics. The related topics and the receiving information are grouped into a Context; together the underlying context meaning becomes apparent for each topic and a clear message is delivered. Context groups may be interrelated to each other by topics. The present invention disclosed methods to present information like on-the-fly decision trees that based on the users' prospective and input. The present invention disclose methods that weight topics and Context groups by how recent information was last "attended" by the user so that the user can pay attention to information that are more likely up to date or need more urgent attention. The present invention disclose methods that allow users to easily revise the complex data structure by showing what Contexts group are to be affected so the users may selectively revise only Contexts that need changes.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents. For instance, applications in auction (including online auction like "eBay.com"), customer relationship management (CRM), customer's support and services, manufacture build materials, inventory control, engineering/marketing/manufacture change order, photo managements (for instance, MS Office Picture Manager, Mac OS iPhoto application and music store, Flickr.com, Shutterfly.com, iStockPhoto.com, Photos.com, etc.), documents control and managements, music management (Mac OS iTune and music store), product directory (for instance, mcmaster.com), video management (for instance, Netflix.com), software source code management (for instance, MS source safe, Visual Studio), conference program and presentation titles, human resource management, resume/employment management (for instance, Hotjobs.com, Monster.com), enterprise resource planning (ERP), social networking (for instance, LinkedIn.com), web Blogs management (for instance, Blogger.com), etc.

What is claimed is:

1. A computer information system comprising a crosslink data structure, said cross link data structure comprising:

a plurality of connecting nodes;

a plurality of topic members;

a plurality of content members;

a plurality of linking members, each of the linking members directly connecting one of the connecting nodes to one of the topic members or to one of the content members; and a plurality of node groups, each of said node groups comprising one of the connecting nodes directly connected to at least one of the topic members or one of the content members via one of the linking members, wherein at least one of the node groups comprises a first connecting node directly connected to at least two of the topic members, the at least two topic members including a first topic member directly connected also to a second connecting node belonging to another one of the node groups.

2. The computer information system of claim 1, wherein the first connecting node also directly connects to at least two of the content members.

3. The computer information system of claim 1 wherein a combination of the topic members in each of said plurality of node groups is unique.

4. The computer information system of claim 1, wherein each of the topic members and the content members are unique.

5. The computer information system of claim 2, wherein said plurality of connecting nodes are context nodes.

6. The computer information system of claim 1, wherein each of said content members is a pointer to a digital content.

7. The computer information system of claim 6, wherein said digital content is any of: a data record in a database table, an email, a web page, an audio file, a video file, a digital file, a digital document, a digital folder, a to-do entry, a web blog, an instant message, and an application function call with a set of preset parameters.

8. The computer information system of claim 1, wherein each linking member is associated with a ranking attribute for sequencing the topic members and the content members within one of said node groups.

9. The computer information system of claim 2, wherein the computer information system further comprises a database, said database comprising: a connection data table comprising a plurality of data records, each of said records being associated with one of the plurality of linking members.

10. The computer information system of claim 9, wherein each said record in the said connection table comprises a node ID data field and an element ID data field, each said node ID data field storing identity associated with one of said plurality of connecting nodes and each said element ID data field storing identity associated with one of the topic members and the content members.

11. The computer information system of claim 9, wherein said plurality of connecting nodes are context nodes.

12. The computer information system of claim 10, further comprising a topic table, said topic table comprising a plurality of topic data records, each said topic data record being associated with one of said plurality of topic members, and each of said topic data records comprising an element ID data field and a topic data field, data stored in said element ID data field being an identity associated with data stored in the topic data field.

13. The computer information system of claim 10, further comprising a content member table, said content member table comprising a plurality of content data records, each of said content data records associated with one of said plurality of content members in said crosslink data structure; wherein each said content data record further comprises an element ID data field and a content member data field, data stored in said element ID data field is an identity associated with a pointer stored in said content member data field pointing to a digital data content.

14. The computer information system of claim 4, further comprising a plurality of keywords, each of said keywords comprising a single word, wherein each of the said plurality of topic members comprises:

a topic node;

at least one of said keywords; and at least one of topic linking member connecting said at least one keyword to said topic node, wherein each topic linking member is associated with a ranking attribute for sequencing the keywords.

15. A computer information system comprising:

a plurality of data structures, wherein at least one of said plurality of data structures is a crosslink data structure, the crosslink data structure comprising:

a plurality of connecting nodes;

a plurality of first elements of type one;

a plurality of second elements of type two;

a plurality of linking members, each of the linking members directly connecting one of said plurality of connecting nodes to one of the first elements or to one of the second elements; and a plurality of node groups, each of said node groups comprising one of said plurality of connecting nodes directly connected to at least one of said plurality of first elements or second elements via one of the linking members wherein at least one of the said plurality of node groups comprises a first connecting node directly connected to at least two of the first elements, the at least two first elements including a first element directly connected also to a second connecting node belong another one of the node groups.

16. The computer information system of claim 15, wherein the first connecting node directly connects to at least two of the second elements.

17. The computer information system of claim 16, wherein each of said node groups comprises one of said plurality of connecting nodes connected to a unique combination of the first elements.

18. The computer information system of claim 15, wherein each of said plurality of first elements and the second elements is unique.

19. The computer information system of claim 17, wherein said plurality of connecting nodes are context nodes and said plurality of first elements are topics and said plurality of second elements are content members.

20. The computer information system of claim 15, further comprising a second crosslink data structure.

21. The computer information system of claim 20, wherein at least one of said plurality of first elements or the second elements in said crosslink data structure is also an element of said second crosslink data structure.

22. The computer information system of claim 15, wherein one of said plurality of data structures is a conventional database data structure comprising at least one data table containing a plurality of data records, each of said data records being associated with a plurality of data fields.

23. The computer information system of claim 22, wherein at least one of said plurality of first elements and the second elements is associating with one of said plurality of data records in said conventional database.

24. The computer information system of claim 22, wherein at least one of said plurality of connecting nodes is directly connected to a pointer pointing to one of said plurality of data records in said conventional database.

25. The computer information system of claim 15, comprising a single computer.

26. The computer information system of claim 15, comprising a plurality of computers coupled together by a computer network.

27. The computer information system of claim 26, where in at least one of said plurality of computers is a web server.

28. The computer information system of claim 21 comprising at least one computer.

29. The computer information system of claim 21 comprising a plurality of computers coupled together by a computer network.

30. The computer information system of claim 29, wherein at least one of the said plurality of computers is a web server.

* * * * *